United States Patent
Takeda et al.

(10) Patent No.: US 10,504,210 B2
(45) Date of Patent: Dec. 10, 2019

(54) IMAGE-PROCESSING DEVICE

(71) Applicant: SHIMADZU CORPORATION, Nishinokyo-Kuwabaracho, Nakagyo-Ku, Kyoto-Shi, Kyoto (JP)

(72) Inventors: Ryo Takeda, Kyoto (JP); Hisanori Morita, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 116 days.

(21) Appl. No.: 15/312,408

(22) PCT Filed: May 18, 2015

(86) PCT No.: PCT/JP2015/064219
§ 371 (c)(1),
(2) Date: Nov. 18, 2016

(87) PCT Pub. No.: WO2015/178350
PCT Pub. Date: Nov. 26, 2015

(65) Prior Publication Data
US 2017/0091908 A1   Mar. 30, 2017

(30) Foreign Application Priority Data

May 19, 2014   (WO) .................. PCT/JP2014/063255

(51) Int. Cl.
G06T 5/00 (2006.01)
(52) U.S. Cl.
CPC .... *G06T 5/002* (2013.01); *G06T 2207/10004* (2013.01); *G06T 2207/20182* (2013.01)
(58) Field of Classification Search
CPC ............ H04N 5/23229; H04N 5/23232; G06T 5/002; G06T 5/50; G06T 2207/10121;
(Continued)

(56) References Cited

U.S. PATENT DOCUMENTS

2007/0258661 A1* 11/2007 Koshi ................ H04N 1/40068
382/298
2008/0175439 A1* 7/2008 Kurata ............... H04N 5/23248
382/107
(Continued)

FOREIGN PATENT DOCUMENTS

CN    101090456    12/2007
CN    102457753    5/2012
(Continued)

OTHER PUBLICATIONS

PCT/JP2015/064219, International Search Report and Written Opinion dated Aug. 11, 2015, 7 pages—Japanese, 2 pages—English.
(Continued)

*Primary Examiner* — Kim Y Vu
*Assistant Examiner* — Michael J Vanchy, Jr.
(74) *Attorney, Agent, or Firm* — Andrew F. Young, Esq.; Lackenbach Siegel, LLP

(57) ABSTRACT

According to the aspect of the present invention, an image processing device capable of absolutely removing noises in each frame forming a live image can be provided. Specifically, according to the aspect of the present invention, a target block T can be set in the original image $I_t$ and it is searched out where such target block T is imaged in the superimposition target image $O_{t-1}$. According to the aspect of the present invention, a tracking of the subject image is executed per block, so that reliability thereof can be extraordinarily improved compared to the conventional method searching the destination every individual pixel.

19 Claims, 50 Drawing Sheets

(58) Field of Classification Search
CPC ............ G06T 2207/20221; G06T 5/20; G06T 2207/20021; G06T 2207/20182; G06T 7/0014; G06T 7/337; A61B 6/5258; G06K 9/6289
See application file for complete search history.

(56) References Cited

U.S. PATENT DOCUMENTS

| | | | | |
|---|---|---|---|---|
| 2012/0169900 A1* | 7/2012 | Numata | ............... | H04N 19/433 348/231.99 |
| 2014/0363087 A1* | 12/2014 | Tico | ........................ | G06T 5/003 382/195 |

FOREIGN PATENT DOCUMENTS

| | | |
|---|---|---|
| CN | 102592259 | 7/2012 |
| JP | H1-314477 | 12/1989 |
| JP | H7-079956 | 3/1995 |
| JP | H7-154651 | 6/1995 |
| JP | 2007-235319 | 9/2007 |
| JP | 2010-131371 | 6/2010 |
| JP | 2011-217294 | 10/2011 |
| JP | 2013-157755 | 8/2013 |

OTHER PUBLICATIONS

PCT/JP2014/063255, International Search Report, dated Aug. 19, 2014, 3 pages—Japanese, 2 pages—English.
Chinese Pat. Appln. No. 201580025751.1, Notification of Reasons for Refusal dated Nov. 28, 2018, 10 pages—English, 11 pages—Chinese.

* cited by examiner

Original Image It

Reference Image It-1

Search area setting processing

FIG. 6A
Original Image It
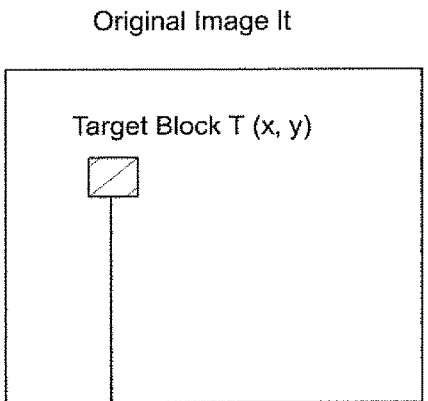
Target Block T (x, y)
FIG. 6C
Reference Image It-1
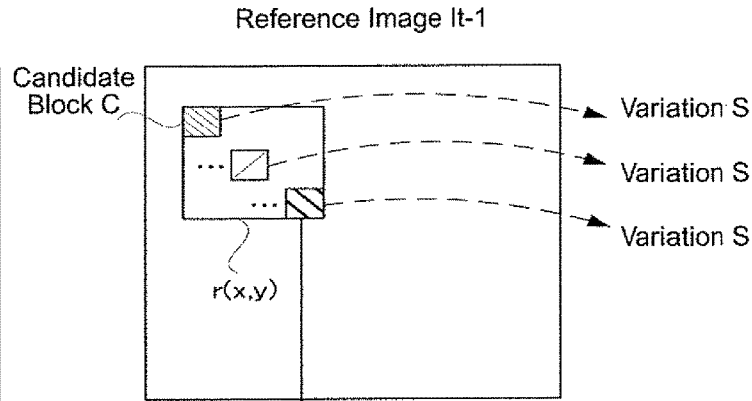
Candidate Block C
Variation S
Variation S
Variation S
r(x,y)
Variation $S = \sum_{i=0}^{24} |T_i - C_i|$
FIG. 6B
Pixel arrangement in target block T(x,Y)
| T0  | T1  | T2  | T3  | T4  |
|-----|-----|-----|-----|-----|
| T5  | T6  | T7  | T8  | T9  |
| T10 | T11 | T12 | T13 | T14 |
| T15 | T16 | T17 | T18 | T19 |
| T20 | T21 | T22 | T23 | T24 |
FIG. 6D
Pixel arrangement in candidate block C
| C0  | C1  | C2  | C3  | C4  |
|-----|-----|-----|-----|-----|
| C5  | C6  | C7  | C8  | C9  |
| C10 | C11 | C12 | C13 | C14 |
| C15 | C16 | C17 | C18 | C19 |
| C20 | C21 | C22 | C23 | C24 |

Original Image It

Target Block T (x, y)

Search processing →

Reference Image It-1

Destination Block R(x,y)

| v(1,1) | v(2,1) | v(3,1) | v(4,1) | v(5,1) | v(6,1) |
|--------|--------|--------|--------|--------|--------|
| v(1,2) | v(2,2) | v(3,2) | v(4,2) | v(5,2) | v(6,2) |
| v(1,3) | v(2,3) | v(3,3) | v(4,3) | v(5,3) | v(6,3) |
| v(1,4) | v(2,4) | v(3,4) | v(4,4) | v(5,4) | v(6,4) |
| v(1,5) | v(2,5) | v(3,5) | v(4,5) | v(5,5) | v(6,5) |
| v(1,6) | v(2,6) | v(3,6) | v(4,6) | v(5,6) | v(6,6) | mv

Superimposition Target Image Ot-1

Superimposition Target Image Ot-1

Superimposition target block recognition

Superimposition Target Block G(m,n)

Original Image It

Target Block (m,n)

Superimposing processing

Fusion Block F(m,n)

Image generation processing (First half)

Superimposed Image St

Superimposed Image St

Division processing
⟶
(Second half of image generation processing)

Noise Reduction Image Ot

FIG. 13A
FIG. 13B
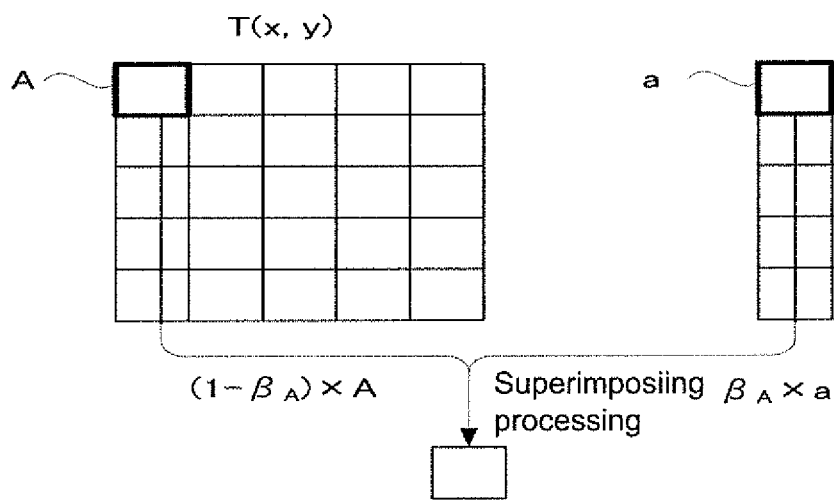
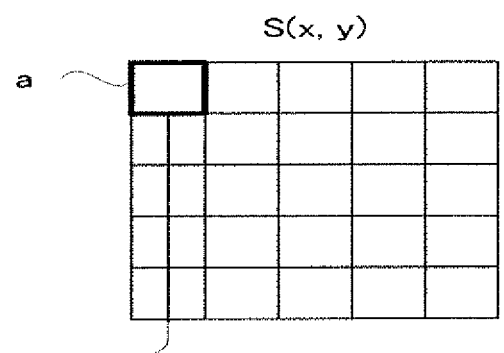

*FIG. 14*

| $\beta_A$ | $\beta_B$ | ... | | |
|---|---|---|---|---|
| | | | | |
| | | | | |
| | | | | |
| | | | | |

$T\beta(x, y)$

Original Image It

Superimposition Target Image Ot-1

Original Image It

Reference Image It-1

Search processing

Original Image It

Variation S(R)x,y

Reference Image It-1

Same location

Variation calculation
(Pre-preparation for vector editing processing)

Variation S(O)x,y

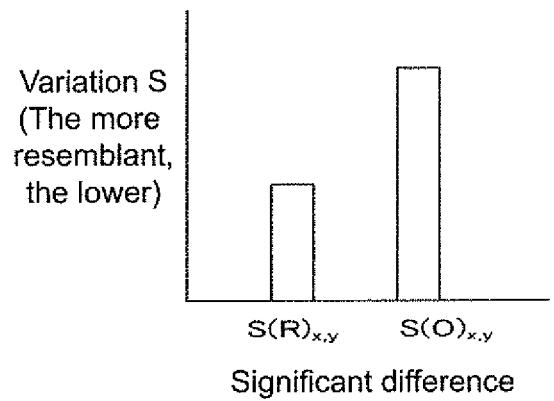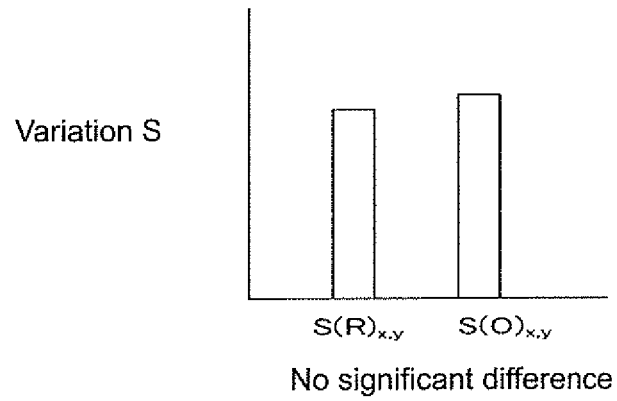
*FIG. 20A* — Significant difference
*FIG. 20B* — No significant difference

*FIG. 21A*  *FIG. 21B*
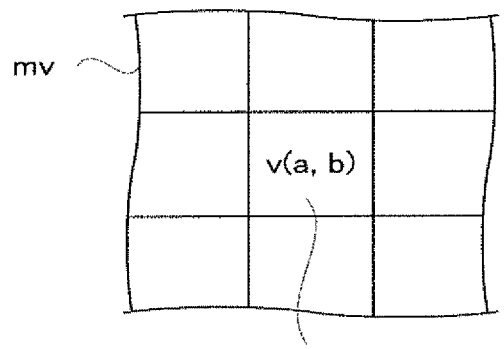
Vector obtained
by the vector calculation
element using BT, BR
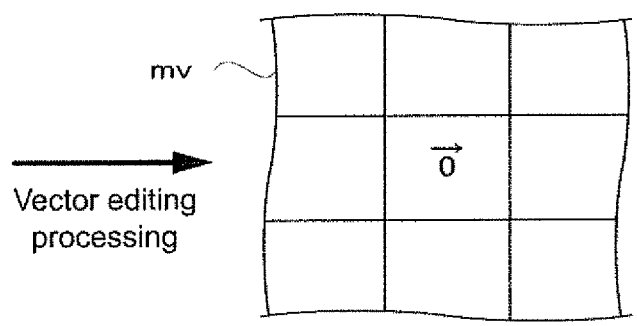

Original Image It

Reference Image It-1

Original Image It

Reference Image It-1

When fusion blocks are 2 x 2

4 fusion blocks multiply
superimpose onto on pixel

When fusion blocks are 3 x 3

9 fusion blocks multiply
superimpose onto on pixel

FIG. 34A
Original Image
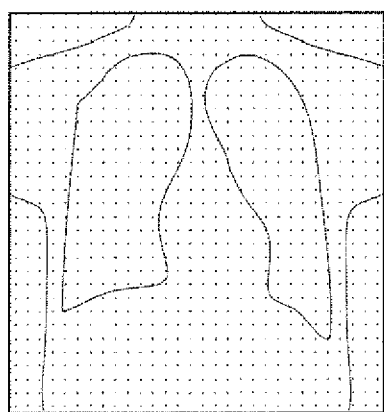
FIG. 34B
Reference Image
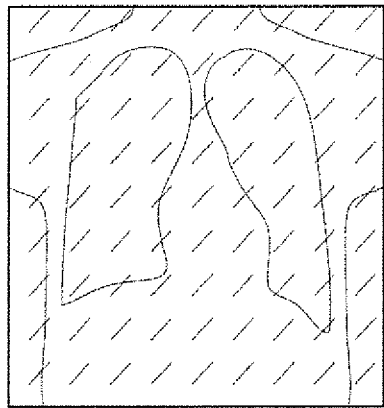
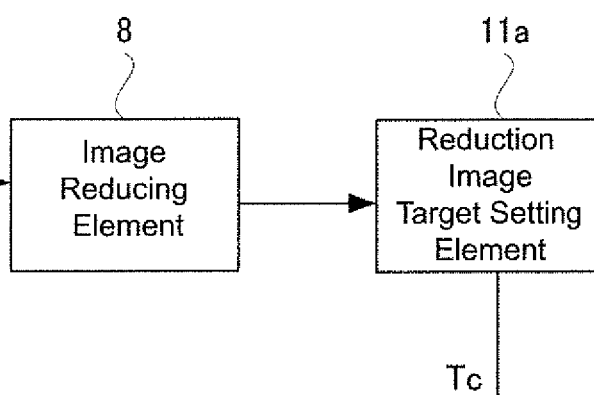
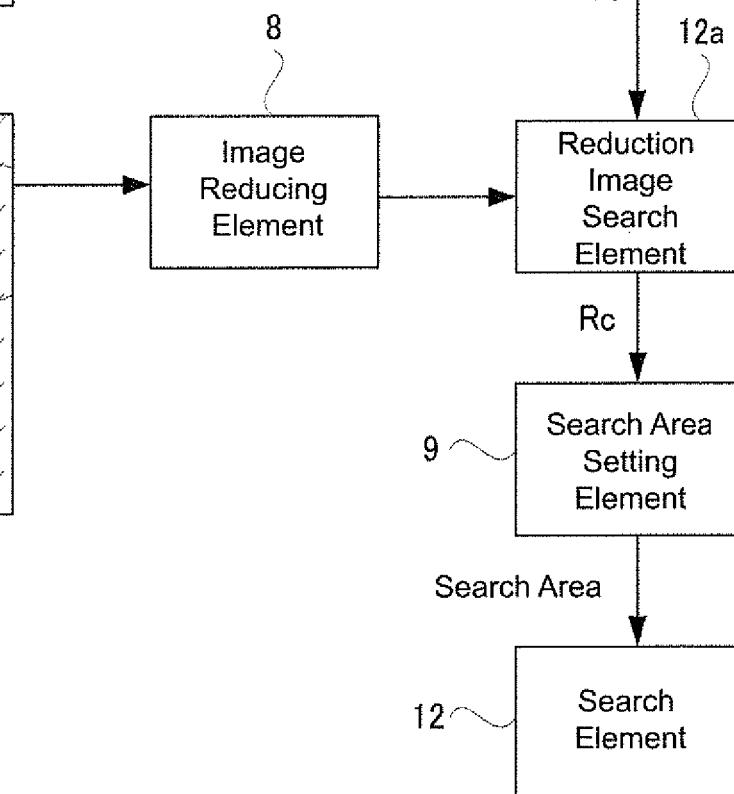

FIG. 40
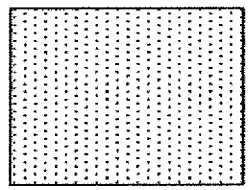
Target Block T
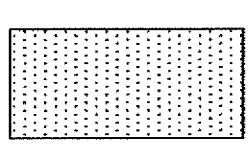 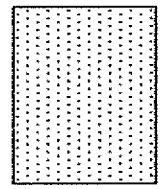 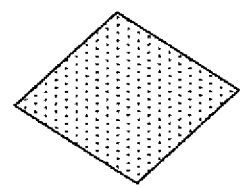
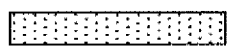
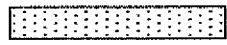
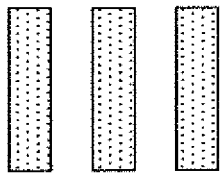 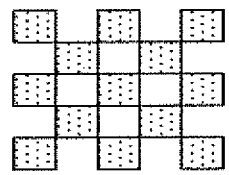

Defect vector v(3,3)

*FIG. 47A*   *FIG. 47B*   *FIG. 47C*
Original Image
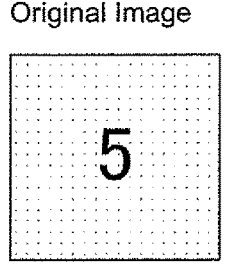
Reference Image
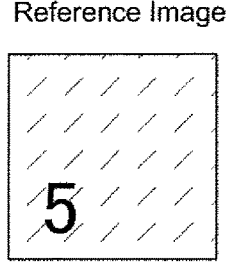
Superimposition Target Image
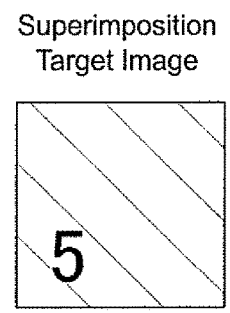

Original Image

IMAGE-PROCESSING DEVICE

CROSS REFERENCE TO RELATED APPLICATIONS

This application relates to and claims priority as a national phase § 371 from Ser. No. PCT/JP2015/064219 filed May 18, 2015, the entire contents of which are incorporated herein by reference; which in turn claims priority from Ser. No.: PCT/JP2014/063255 filed May 19, 2014.

FIGURE SELECTED FOR PUBLICATION

FIG. 3

BACKGROUND OF THE INVENTION

Technical Field

The present invention relates to an image processing device to eliminate noise superimposed on a radiation image and particularly relates to the image processing device so as to improve quality of the image of each frame forming a live image.

A medical facility equips a radiation imaging device to acquire the radiation image. Some radiographic devices can continuously image the radiation image and then output the results as a video. Such video can be called as a live image (e.g., refer to Patent Document 2).

The live image is obtained by irradiating a low-dose radiation to a subject, so that the S/N ratio thereof is inferior to the S/N ratio for static imaging (spot imaging) and a lot of noises can be included therein. A radiographic imaging device equips an image processing device that reduces such noise. Such image processing device can structurally provide the noise reduction image having the S/N ratio improved by superimposing multiple continuous frames with time.

A recursive filter is applied as a method to generate a noise reduction image. According to the recursive filter, a noise reduction image formed by superimposing the live image frame each other is stored in memory to be as a superimposition target image. And when a new live image frame is input, the new live image and the superimposition target image are superimposed to form the new noise reduction image that is also stored in addition. Since then, every time when the new frame is input, an operation to superimpose the stored noise reduction images each other is executed and generates the noise reduction image corresponding to the frame one after the other. Such recursive filter operation may be called as a circuit addition process.

Meanwhile, the live image is a video catching the movement of the subject. Accordingly, if the images are simply superimposed each other, a noise reduction image of which the subject images are as if doubled. Because the imaged position and shape of the subject are different each other between two images. In addition, since the level of misalignment between the subject's images per se varies depending on the portion of the image, even if one frame is just shifted relative to another frame to superimpose, doubling of the images cannot be prevented. The subject image of the live image has a portion at which the images between frames are the same each other and a portion at which the images do not coincide. The same portions are simply just superimposed to provide noise reduction. However, the different portions provide a misaligned image of the subject.

Therefore, according to the conventional aspects, a variety of devices is adopted to prevent such image doubling.

For example, according to the aspect of Patent Document 1, the superimposing aspect is changed every pixel forming an image. Specifically, the portion in which the variation of the pixel values between the frame and the superimposition target image is sever (images do not coincide) is processed to succeed the pixel value of the frame as-is. If such portions are simply superimposed, the images are most likely doubled. And the portion in which the variation of the pixel values between the frame and the superimposition target image is not much (images coincide) is processed to superimpose the frame and the superimposition target image.

In addition, according to the aspect of Patent Document 2, the aspect of superimposing is changed every pixel considering not only the difference of pixel values between images but also an amount of noise imaged into the image. Accordingly, the area in which more noise in the frame is imaged is selectively subject to the noise reduction process. Then, preventing doubling images and reducing the noise can be brought in reality at the same time.

And according to the aspect of Patent Document 3, the place of the superimposition target image, corresponding to each pixel in the frame, is examined by an image analysis and then an operation to superimpose the pixel in the frame and the corresponding pixel in the superimposition target image thereto are executed. Accordingly, the structure in the frame and the structure in the superimposition target image can be superimposed while aligning each position. Accordingly, it has been considered that prevention of doubling images and reduction of noise should be surely performed.

RELATED PRIOR ART DOCUMENTS

Patent Document

Patent Document 1: JP Patent Published H7-154651
Patent Document 2: JP Patent Published H7-079956
Patent Document 3: JP Patent Published H1-314477

ASPECTS AND SUMMARY OF THE INVENTION

However, there are following problems in the conventional aspects.

Specifically, according to the conventional aspects, the images cannot be accurately superimposed.

According to the aspects of Patent Document 1, 2, almost no noise reduction can be achieved relative to the area at which an image doubling takes place by superimposing in the frame. Because such area has been waived to be subject to process to reduce noise due to the image doubling. Therefore, according to the aspects of Patent Documents, noise in the frame cannot be eliminated completely.

In addition, it seems no concern remained as to the aspect of Patent Document 3 at all. However, according to the aspect of Patent Document 3, error recognition of the corresponding pixel takes place often because a pixel of the superimposition target image, corresponding to the pixel in the frame, is searched by comparing one pixel of the superimposition target image relative to one pixel in the frame one at a time. Under such circumstance, each image may not be superimposed correctly, so that no noise reduction image having a high visual recognition can be obtained.

Considering such circumstances, the purpose of the present invention is provide an image processing device that can remove absolutely noises in each frame.

Means for Solving the Problem

The present invention comprises the following structures to solve the above problem.

Specifically, an image processing device of the present invention is the image processing device capable of processing a noise reduction relative to an image generated by continuously imaging a subject that comprises: a target setting means that sets a target block consisting of an attention pixel and periphery pixels of the attention pixel from pixels forming an original image imaging the subject; a search means that searches out a destination block most resembling the target block in the reference image imaging the subject imaged at a different time from the time when the original image was imaged thereat; a superimposing means that generates a fusion block by superimposing a superimposition target block, which is in the same location of the destination block, in the superimposition target image having the subject image in the same location of the reference image, to the target block in the original image; and an image generation means that generates a noise reduction image in which noises imaged in the original image are reduced by superimposing one after the other fusion blocks in the image along with setting one after the other target blocks while changing the location of the attention pixel, wherein the image generation means is operative to allow the location of the fusion block in the noise reduction image to be the same as the location of the target block in the original image.

[Action and Effect] According to the aspect of the present invention, an image processing device capable of removing absolutely noises in each frame forming a live image can be provided. Specifically, according to the aspect of the present invention, a target block can be set in the original image and it can be searched out where in the superimposition target image such target block is imaged. In such way, if a destination of the target block is searched out in the superimposition target image, each image can be superimposed each other while tracking the subject image in the original image in the superimposition target image, so that the subject can never be imaged double due to superimposing.

In addition, according to the aspect of the present invention, such tracking of the subject image is executed per block, so that reliability can be extraordinarily improved compared to the conventional method searching every individual pixel.

In addition, according to the above image processing device, the image generation means generates the noise reduction image by dividing the pixel value in the image by the integrating number, which indicates how many times the fusion blocks are added relative to the certain pixel following addition while overlapping the fusion blocks.

[Action and Effect] The above aspects illustrate the more specific aspects of the present invention. Specifically, if the pixel value of the pixel in the image is divided by the integrating number, which indicates how many time the fusion blocks are added following addition while overlapping the fusion blocks, the noise reduction image having higher reliability can be generated.

It depends on that the respective pixels forming the noise reduction image are the results of superimposing the target blocks and the superimposition target blocks. The same image as the subject image imaged in the target blocks should be imaged in the superimposition target block, but if the search means misrecognizes the destination block, a case in which the inappropriate area as the superimposition target block among the superimposition target images may be selected into the superimposition target block takes place considerably. According to the above aspect, each pixel forming the noise reduction image is not constructed based on one superimposition target block. Specifically, each pixel is formed by multiply superimposing the different superimposition target blocks. Accordingly, if misrecognition takes place relative to the superimposition target block, an effect on the noise reduction image is limited. The superimposition target block relative to misrecognition is just one of the numbers of multiply superimposed superimposition target blocks.

According to the above aspect, following addition of the fusion blocks, the noise reduction image is generated by dividing the pixel value in each image by the integrating number of the fusion blocks, so that the pixel value level of the noise reduction image is almost the same as the level of the original image.

In addition, according to the above image processing device, it is more preferable that an imaging processing device further comprises: the superimposing means that superimposes pixels of the target block in the original image and corresponding pixels of the superimposition target block in the superimposition target image by weighting individually every pixel forming the fusion block, and weighting of superimposition is changed so that the superimposition target block cannot be gradually succeeded by the fusion block in accordance with increase of the absolute value of the difference between the pixel value of the pixels belonging to the target block and the pixel value of the corresponding pixels of the superimposition target block or the destination block.

[Action and Effect] The above aspects illustrate the more specific aspects of the present invention. If the superimposing means superimposes pixels of the target block in the original image and corresponding pixels of the superimposition target block in the superimposition target image by weighting individually every pixel forming the fusion block, and weighting of superimposition is changed so that the superimposition target block cannot be gradually succeeded by the fusion block in accordance with increase of the absolute value of the difference between the pixel value of the pixels belonging to the target block and the pixel value of the corresponding pixels of the superimposition target block or the destination block, the superimposition of the area at which the motion of the subject image in the original image is heady can be minor. In such way, doubling of subject image in the noise reduction image can be further absolutely prevented.

In addition, according to the above image processing device, it is more preferable that the superimposing means that superimposes the target block in the original image and the superimposition target block in the superimposition target image by weighting individually every generation of the fusion block, and weighting of superimposition is changed so that the superimposition target block cannot be gradually succeeded by the fusion block in accordance with increase of the absolute value of the difference between the pixel value of the pixels in the target block and the pixel value in the superimposition target block or the destination block.

[Action and Effect] The above aspects illustrate the more specific aspects of the present invention. According to the method of changing weighting every pixel, the time needed for imaging processing is too long. If weighting of superimposition is changed so that the superimposition target block cannot be gradually succeeded by the fusion block in accordance with increase of the absolute value of the difference between the pixel value in the target block and the pixel value in the superimposition target block or the destination block, changing of weighting is executed per block, so that the imaging processing can be performed much faster.

In addition, according to the above image processing device, it is more preferable that an imaging processing device further comprises: an editing means that sets an identical location block in the location of the target block in the reference image and overwrites the destination block searched out by the search means so as to become the identical location block if the destination block is not significantly similar to the target block compared to the identical location block.

[Action and Effect] The above aspects illustrate the more specific aspects of the present invention. With regard to both the target block in the original image and the identical location block in the reference image, if the subject image imaged in both blocks does not shift or the subject image per se is not imaged therein, it is guaranteed that the identical location block is more or less similar to the target block. Accordingly, when the fusion block is generated, visual recognition may be rather better when the area corresponding to the target block in the superimposition target image is superimposed as-is than when the area corresponding to the target block searched out from the superimposition target image by the search means is superimposed.

According to the above aspect, under a predetermined condition, if the search result by the search means is discarded and the area corresponding to the target block in the superimposition target image is superimposed as-is, the superimposition target block recognized as shifted despite originally no-shift because of resemblance of the target block is never superimposed to generate the fusion block, so that the visual recognition of the noise reduction image can become much better.

In addition, according to the above image processing device, a superimposition target image a1 can be a noise reduction image acquired when an image imaged prior to an original image is image-processed and a reference image b1 can be the image imaged prior to the original image.

In addition, according to the above image processing device, a superimposition target image a1 can be a noise reduction image acquired when an image imaged prior to imaging an original image is image-processed and a reference image b2 can be a noise reduction image corresponding to the image imaged prior to imaging the original image.

In addition, according to the above image processing device, a superimposition target image a2 can be an image imaged prior to imaging an original image is image-processed and a reference image b1 can be the image imaged prior to imaging the original image.

In addition, according to the above image processing device, a superimposition target image a2 can be an image imaged prior to imaging an original image and a reference image b2 can be a noise reduction image corresponding to the image imaged prior to imaging the original image.

[Action and Effect] The image processing device according to the aspect of the present invention can be brought into reality for a selected variety of aspects. Such high selectivity may contribute to increase flexibility of an image processing.

In addition, according to the above image processing device, it is more preferable that a search means is operative based on two modes including an accuracy priority mode that searches a destination block relative to attention pixel over a large area of a reference image, and a velocity priority mode that searches the destination block relative to attention pixel different from attention pixel which are targets to be processed by the accuracy priority mode based on the search result of the accuracy priority mode in a narrow area of the reference image; wherein the velocity priority mode searches the destination block over the area enclosing the predicted location that is a predicted area of the destination location of the attention pixel currently being a search target in the reference image, based on the locational relationship between the attention pixel which are the target to be processed by the accuracy priority mode and the pixels of the destination in the reference image of the attention pixel found by the search due to the accuracy priority mode.

[Action and Effect] The above aspects illustrate the more specific aspects of the present invention. According to the above aspect, the search means performs searching on the attention pixel limited in the original image based on the accuracy priority mode that is accurate but takes a long time. The center of the destination block found by such mode must represent exactly the destination of the attention pixel. Accordingly, when tried to find where pixels in the periphery of the attention pixel in the original image are, the pixel therefor must be in the periphery of the pixels of the destination in the reference image of the attention pixel. Then, when searching for the pixels in such periphery is executed, only the periphery of the destination is searched therefor. Such mode is the velocity priority mode. According to such aspects, the search means can be operative to provide a search operation having both high speed and accuracy.

In addition, according to the above image processing device, it is more preferable that an imaging processing device provides that the area of the superimposition target block relative to the superimposing means can be set as narrower than the area of the target block and the destination block.

[Action and Effect] According to the above aspect, the superimposition target block can be determined by evaluating the outer area than the superimposition target block, so that generation of a fusion block F can be executed with higher reliability.

In addition, according to the above image processing device, it is more preferable that the area of the superimposition target block relative to the superimposing means can be set as broader than the area of the target block and the destination block.

[Action and Effect] According to such operation, a noise reduction image in which more noise are removed can be generated. Because if the fusion block F is large, the number of multiply superimposed pixels increases when the noise reduction image is generated.

In addition, according to the above image processing device, it is more preferable that the image processing device further comprise: an image reducing means that reduces the original image and the reference image to generate an reduced original image and the reduced reference image; a reduced image target block setting means that sets an attention pixel from pixels forming the original image and a reduced original image target block which is a target block in the reduced original image; a reduced image search means that search out a destination block in the reduce reference image most resembles the reduced original image target block among the reduced reference images; and a search area setting means that sets up the search area that is an area in which the search means searches the destination block in the reference image based on the location in the reference image corresponding to the location of the destination in the reduced reference image.

[Action and Effect] According to such aspects, the destination block R can be more accurately searched out in the reference image. According to the above aspect, a pattern shift in the original image can be roughly understood by actually using the reduced image. The use cost for using the reduced image is not so high. And then, if understood that the pattern of the target block in the original image is shifted to where in the reference image, the destination block can be accurately understood as if the destination block is being searched in the broad area of the reference image.

In addition, according to the above image processing device, the search means can determine resemblance relative to each rotated candidate block when the most similar destination block to the target block is searched among candidate blocks for the destination block in the reference image.

[Action and Effect] According to the above aspect, even if the image rotates between the original image and the reference image, the destination can be adequately calculated.

In addition, according to the above image processing device, the target block setting means can set enclave target blocks.

In addition, according to the above image processing device, the target block setting means can set the target block excluding a part of the periphery pixels enclosing the attention pixel.

[Action and Effect] According to the above aspect, a calculation cost due to the search means can be lowered. Because the number of pixels subject to calculation is smaller than the number thereof in the case of searching by using the target block filled with pixels.

In addition, according to the above image processing device, it is more preferable that the search means searches out the destination block among respective images of plural reference images which are different each other, and the superimposing means generates the fusion block by superimposing respective target blocks, corresponding to each block of the destination blocks searched out in each reference image, to the target blocks in the original image.

In addition, according to the above image processing device, it is more preferable that an imaging processing device further comprises: a search means that searches out the destination block among respective images of plural reference images which are different each other; and the superimposing means generates the plural fusion blocks by superimposing respective target blocks, corresponding to each block of the destination blocks searched out in each reference image, to the target blocks in the original image, and generates the final fusion block by superimposing the plural fusion blocks each other.

[Action and Effect] According to the above aspect, the noise can be reduced based on the plural superimposition target images, so that a higher noise removing effect can be expected.

In addition, according to the above image processing device, it is more preferable that an imaging processing device further comprise: an editing means that executes an edition to change the destination block corresponding to the target block so that the destination of such pixels can be in-place in the location which is the location shifted the same distance and in the same direction relative to the shift of the periphery pixels, when the destination in the reference image relative to respective pixels of each pixel forming the original image is recognized by understanding to where the attention pixel shifted in the reference image relative to the respective target blocks based on the locational relationship between the target block and the destination block output from the search means.

[Action and Effect] According to the above aspect, the superimposition target block relative to the superimposition target image can be more accurately authenticated.

In addition, according to the above image processing device, it is more preferable that an imaging processing device further comprise: a search means that searches out plural destination blocks in the reference image which are different each other; and the superimposing means generates the plural fusion blocks by superimposing respective superimposition target blocks, corresponding to each block of the plural destination blocks searched out in each reference image, to the target blocks in the original image, and generates the final fusion block by superimposing the plural fusion blocks each other.

[Action and Effect] According to the above aspect, the noise can be reduced based on the plural superimposition target blocks, so that a higher noise removing effect can be expected.

In addition, according to the above image processing device, it is more preferable that an imaging processing device further comprise: a search means that can authenticate, on a priority basis, the candidate block close to the location in the reference image corresponding to the target block in the original image as the destination block, when the most resembling destination block to the target block is searched out from candidate blocks for the destination block in the reference image.

[Action and Effect] According to the above aspect, the more realistic search for a target block can be performed.

In addition, according to the above image processing device, it is more preferable that an imaging processing device further comprise: an image generation means that generates a noise reduction image by adding fusion blocks being overlapped while weighting so as to image the higher variation level of the fusion block, the thinner to be in the noise reduction image, based on the variation level indicating the degree of difference between the patterns imaged in the target block, which is origin of the fusion block, and the destination block.

[Action and Effect] According to the above aspect, the fusion block F failed to be superimposed never strongly affects the noise reduction image.

In addition, according to the above image processing device, it is more preferable that an imaging processing device further comprise: a target setting means that is operative to distinguish the pixel setting the pixels in the original image as the attention pixel and the pixel not-setting and then work.

[Action and Effect] According to the above aspect, the calculation cost for generation operation of the fusion block F can be lowered.

Effect of the Invention

[Action and Effect] According to the aspect of the present invention, an image processing device capable of removing absolutely noises in each frame forming a live image can be provided. Specifically, according to the aspect of the present invention, a target block can be set in the original image and it can be searched out where in the superimposition target image such target block is imaged. According to the aspect of the present invention, such tracking of the subject image is executed per block and an erroneous tracking is corrected feeding back the plural tracking results relative to one pixel, so that reliability can be extraordinarily improved compared to the conventional method searching out the destination every individual pixel.

The above and other aspects, features and advantages of the present invention will become apparent from the following description read in conjunction with the accompanying drawings, in which like reference numerals designate the same elements.

BRIEF DESCRIPTION OF THE DRAWINGS

FIG. 6A, 6B, 6C, 6D are schematic diagrams illustrating an operation of the search element according to the aspect of the Embodiment 1.

FIG. 8 is a schematic diagram illustrating a vector map according to the aspect of the Embodiment 1.

FIG. 13A, 13B are schematic diagrams illustrating an operation of the weighting setting element according to the aspect of the Embodiment 1.

FIG. 14 is a schematic diagram illustrating an operation of the weighting setting element according to the aspect of the Embodiment 1.

FIG. 20A, 20B are schematic diagrams illustrating an operation of the vector editing element according to the aspect of the Embodiment 1.

FIG. 21A, 21B are schematic diagrams illustrating an operation of the vector editing element according to the aspect of the Embodiment 1.

FIG. 34A, 34B are schematic diagrams illustrating a structure according to the aspect of the alternative Embodiment 1.

FIG. 40 is a schematic diagram illustrating a structure according to the aspect of the alternative Embodiment 1.

FIG. 47A, 47B, 47C are schematic diagrams illustrating a structure according to the aspect of the alternative Embodiment 1.

DETAILED DESCRIPTION OF THE PREFERRED EMBODIMENTS

Figure 1:
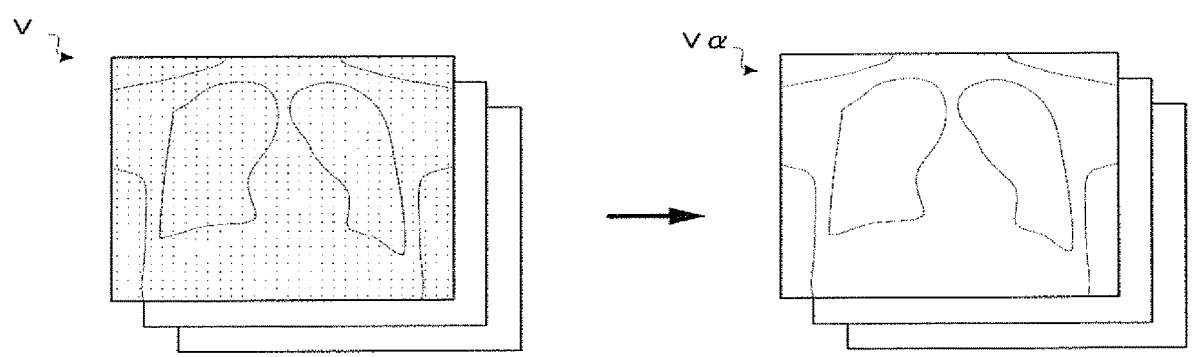
FIG. 1 is a schematic diagram illustrating a brief overview of the image processing device according to the aspect of the Embodiment 1.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

Hereafter, the inventor sets forth the best mode of the Embodiment of the present invention. An X-ray of the Embodiment is the radiation of the present invention. An image processing device according to the aspect of the present invention performs a noise reduction processing relative to an image generated by continuously imaging a subject.

Embodiment 1

The inventor sets forth Embodiment of an image processing device 10 of the present invention. The image processing device 10 of the present invention is a device that is used to reduce the noise of the live image. The live image imaging is a kind of X-ray imaging and the purpose thereof is to provide imaging with the fluoroscopic images as a video so that the live images can be the video. With regard to such live image imaging, since the subject is exposed to an X-ray for a long time, X-ray dose administered for imaging is controlled relatively lower so as to suppress the radiation exposure dose to the subject. Accordingly, the live image is liable to include a lot of noises because of the inferior S/N ratio thereof.

Once the live image V is input to the image processing device 10 of the present invention, referring to FIG. 1, the noise reduction video Vα, of which the noise is reduced, is output from the live image V. At this time, the image processing device 10 executes an image processing every frame forming the live image so that noise can be reduced from each frame and can generate the noise reduction video Vα by connecting the time-series live images in order. The image processing that the image processing device 10 executes is to reduce the noise on the frame by offsetting noises, which appear randomly on each frame, by superimposing a certain frame and the frame imaged one before the certain frame. In such way, the noises illustrated as plural dot-lines on the live image V in FIG. 1 are reduced, so that the noise reduction video Vα having improved visibility can be generated.

Figure 2:
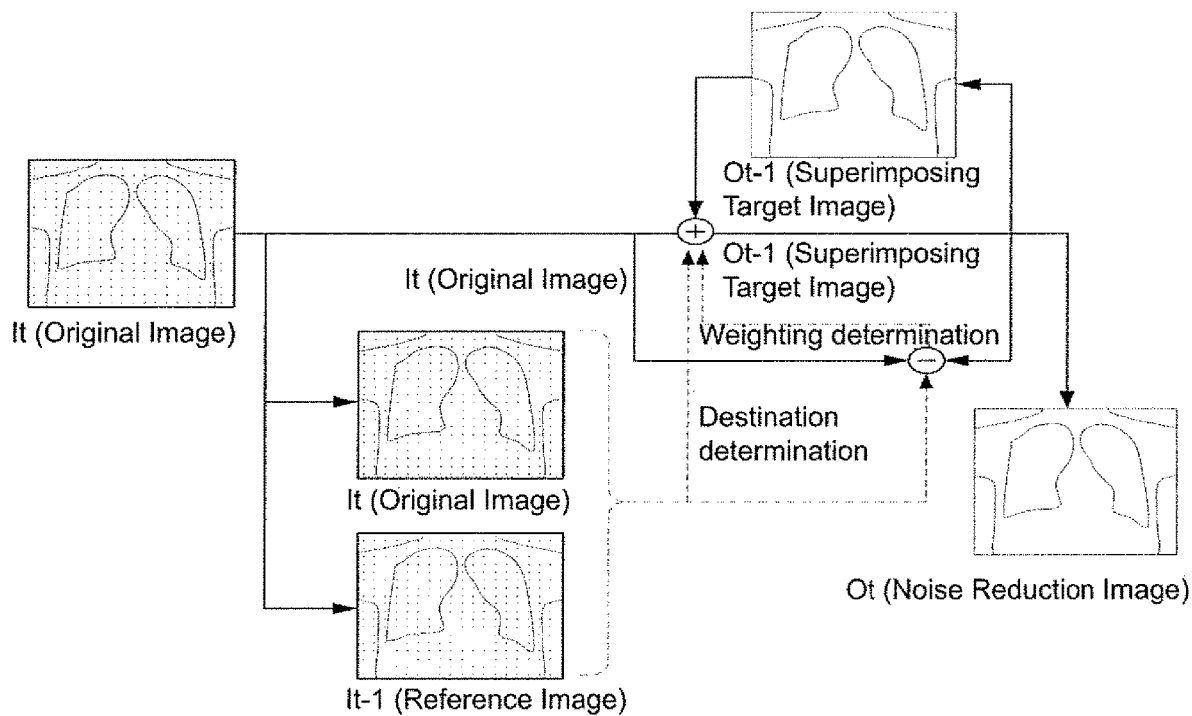
FIG. 2 is a schematic diagram illustrating a brief overview of the image processing device according to the aspect of the Embodiment 1.

FIG. 2 is illustrating a brief overview of the image processing device 10 according to the aspect of the Embodiment 1. A live image V is structured by connecting frames imaged continuously. FIG. 2 is illustrating the aspect in which the noise reduction frame is output when the frame imaged at the number of frames is input. Hereafter, the number t frame is specified as an original image $I_t$ and the frame obtained by performing a noise reduction processing on the number t frame is specified as a noise reduction image $O_t$. Further, hereafter, unless specified, the illustration is as to the noise reduction processing on the original image.

An image processing device 10 has a structure given performing a noise reduction processing every time when a frame is generated. FIG. 2 is illustrating the aspect of performing an imaging processing on the number t−1 frame, but the image processing device 10 actually performs a noise reduction processing on the number t frame prior to the operation referring to FIG. 2. The number t−1 frame is specified as a reference image $I_{t-1}$ and the frame obtained by performing an image processing on the number t−1 frame is specified as a superimposition target image $O_{t-1}$. Such superimposition target image $O_{t-1}$ is just an intermediate image at this time when the processing on the original image $I_t$ is performed, but when the imaging processing is performed on the number t−1 frame, the superimposition target image $O_{t-1}$ is treated as an noise reduction image $O_{t-1}$ output from the image processing device 10.

Referring to FIG. 2, it is understandable that when the imaging processing is performed on the number t frame, the superimposition target image $O_{t-1}$ is superimposed to such frame, which is the original image $I_t$, to generate the noise reduction image $O_t$. However, the image processing device 10 are not just superimposing both images and is operative to superimpose while determining the superimposing aspect by comparing the original image $I_t$ and the reference image $I_{t-1}$. A methodology of determining according to such aspect is the most characteristic feature of the present invention and is carried out by a target setting element 11 and a search element 12 and the vector calculation element 13, as described later. Such specific operations are described later. In addition, the target setting element 11 corresponds to the target setting means of the present invention and the search element 12 corresponds to the search means.

Figure 3:
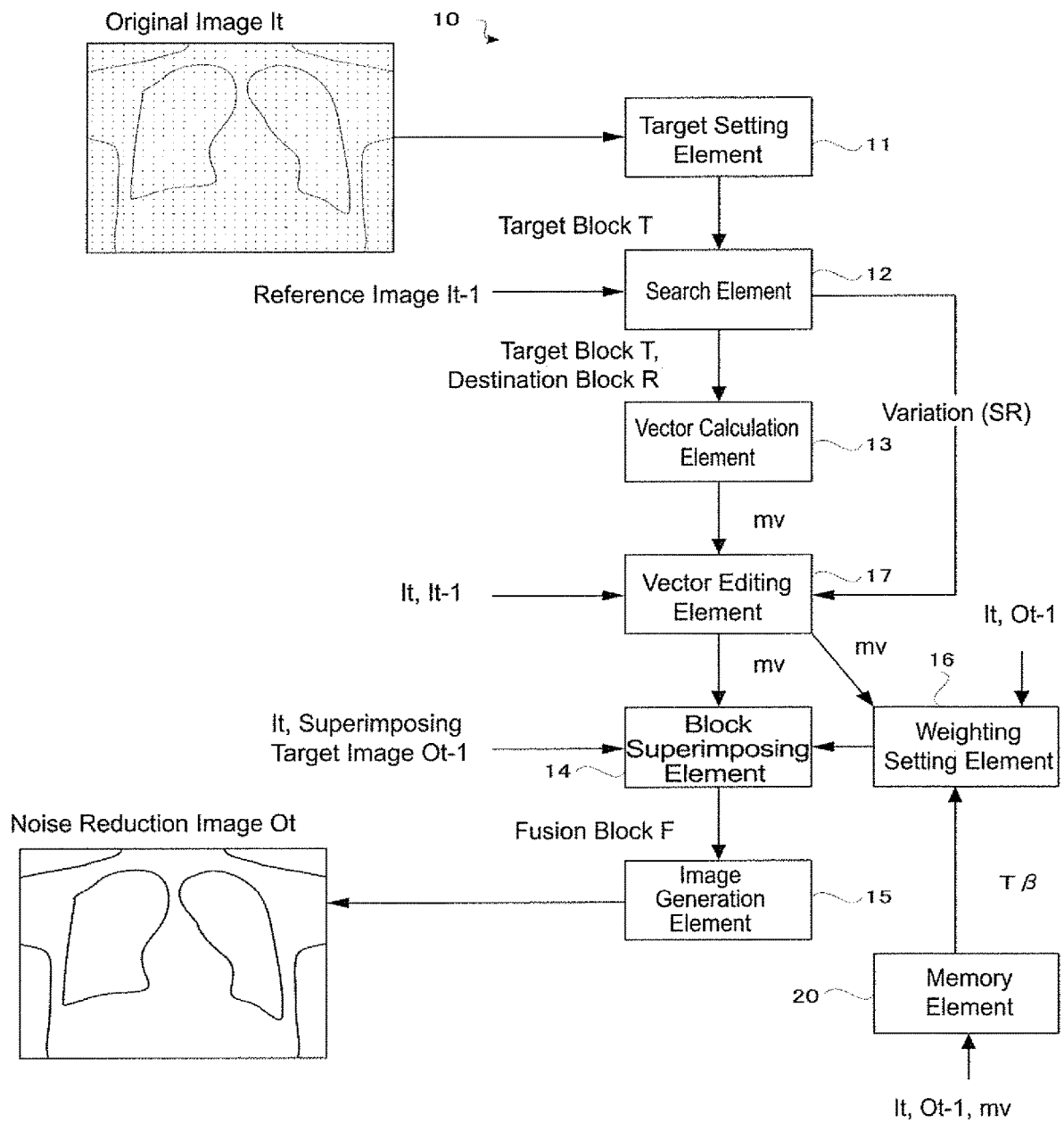
FIG. 3 is a functional block diagram illustrating the total structure of the image processing device according to the aspect of the Embodiment 1.

FIG. 3 is a functional block diagram illustrating the structure of the image processing device 10. Hereafter, the inventor sets forth each element structuring an image processing device 10.

[Operation of the Target Setting Element 11]

Figure 4:
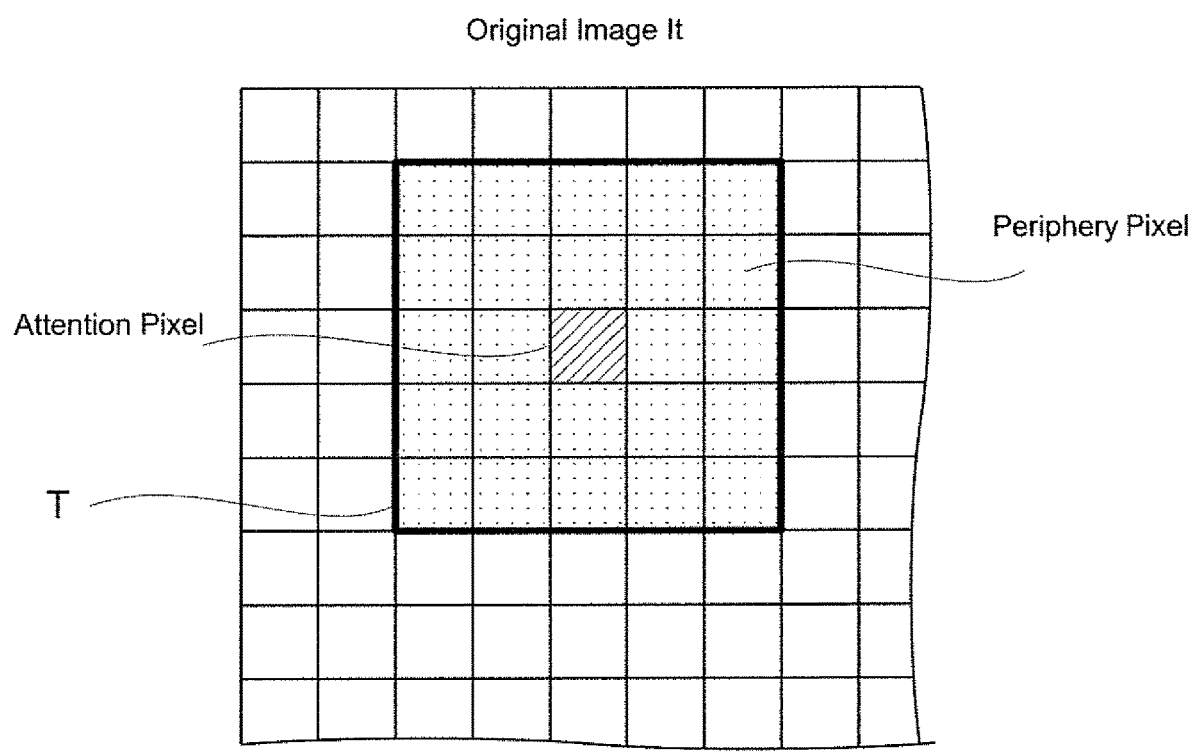
FIG. 4 is a schematic diagram illustrating an operation of a target setting element according to the aspect of the Embodiment 1.

Referring to FIG. 3, an original image $I_t$ is input to a target setting element 11. Referring to FIG. 4, the target setting element 11 specifies one of pixels forming the original image $I_t$ as an attention pixel. And pixels in the periphery of the attention pixel are set as periphery pixels. And a block of pixels consisting of the attention pixel and the periphery pixels is set as a target block T. According to the Embodiment referring to FIG. 4, the target block T is represented as a square including 5 pixels vertically and 5 pixels horizontally. One pixel located in the center among the pixels forming the target block T is the attention pixel and 24 pixels therearound are the periphery pixels.

[Operation of the Search Element 12]

Figure 5A:
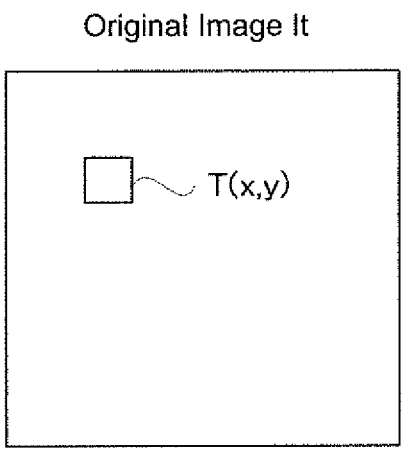
FIG. 5A, 5B are schematic diagrams illustrating an operation of the search element according to the aspect of the Embodiment 1.
Figure 5B:
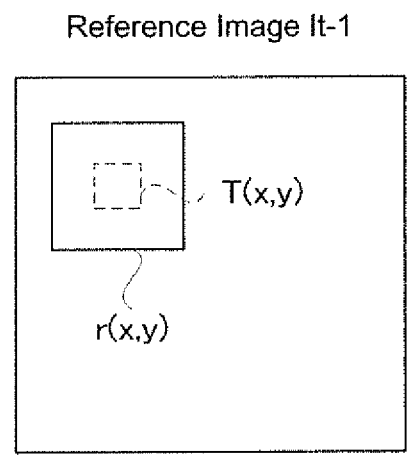

A search element 12 searches out a destination block R most resembling the target block T among reference images imaging the subject imaged at a different time from the original image $I_t$. The inventor sets forth further detail about the search element 12. The data showing the target block T, the data indicating the location of the attention pixel corresponding to the target block T, the original image $I_t$, and the reference image $I_{t-1}$ are sent out to the search element 12. FIG. 5 is illustrating the aspect in which the search element 12 sets the search area r relative to the target block T in the reference image $I_{t-1}$. The search element 12 sets a rectangular area larger than the target block T of which center is a location corresponding to the target block T in the reference image $I_{t-1}$, as the search area r. Referring to FIG. 5, the target block corresponding to the attention pixel (x, y) is T(x, y) and the search area corresponding to the target block T(x,y) is the search area R(x,y).

The extent of the search area r is specified by the setting value that the search means 12 holds. The extent of the search area can be the same regardless the location of the attention pixel. However, relative to the attention pixel in place at the edge of the original image $I_t$, a part of the area, which is set up by the setting value, can be out of the reference image $I_{t-1}$ so that the search area r can be narrow thereby.

The search element 12 searches out a pattern resembling the image imaged in the target block T(x, y) in the original image $I_t$ in the search area r(x, y) in the reference image $I_{t-1}$. In such way, the search element 12 executes the pattern search in the limited search area r, so that the search operation can be done in a short period of time.

FIG. 6 is specifically illustrating the pattern matching operation executed by the search element 12. Referring to FIG. 6, the search element 12 calculates an absolute value of the subtraction result of the pixel values of the respective pixels in the same location in the candidate block C and the target block T and the total value of the absolute value calculated for the respective pixels, when an attention is paid to the candidate block C having the same form and the same size as the target block T belonging to the search area r and each center of the candidate block C and the target block T is superimposed. Such total value is a variation S(C) indicating how much each block is different from the other. Referring to FIG. 6, such variation S(C) represents the larger, the more different the images imaged in the respective blocks are and S(C)=ρ|Ti−Ci| is complete. Ti is each pixel value of pixels forming the target block T and C1 is each pixel value of pixels forming the candidate block C. The i indicates the location of the respective pixels in each block.

The search element 12 calculates the variation S(C) corresponding to each candidate block C while changing the location of the candidate block C in the search area r(x, y). Referring to the right side of FIG. 6, the aspect in which the plural variations S(C) are obtained while the candidate block C is shifting from upper left to bottom right in the search area r(x,y) is illustrated.

The search element 12 selects the candidate block C having a minimum variation from each candidate block C and specifies such candidate block C as the pattern most resembling the image imaged in the target block T is imaged therein. When specifying, the search element 12 is applying the principle in which the more resemblant the pattern of the candidate block C is each other, the lesser the variation S(C) become. Given both patterns are completely the same, the variation S(C) is zero and no other pattern than such pattern can exist.

The search element 12 determines that the candidate block C most resembling the target block T(x, y) is the destination block R((x, y)) and sends the data indicating the location in the image of each block to a vector calculation element 13.

[Operation of the Vector Calculation Element 13]

Figure 7A:
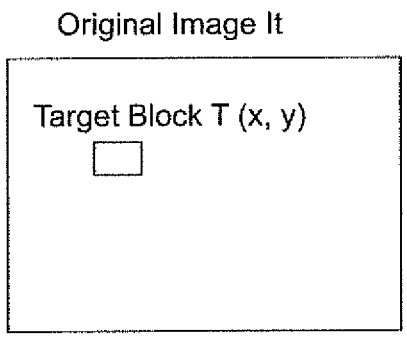
FIG. 7A, 7B, 7C are schematic diagrams illustrating an operation of the vector calculation element according to the aspect of the Embodiment 1.
Figure 7B:
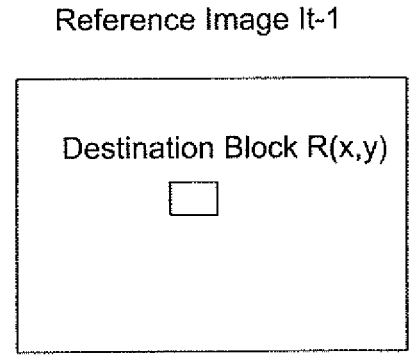
Figure 7C:
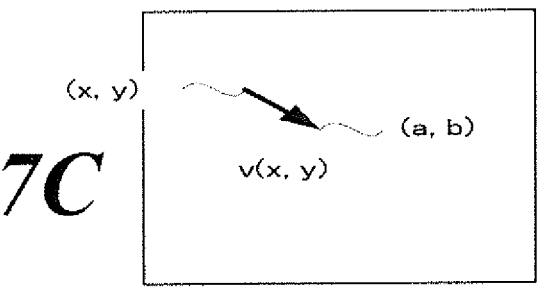

The vector calculation element 13 calculates a vector v(x, y) indicating the shifting state of the target block T((x, y)) based on the search result executed by the search element 12. The data indicating the location of the target block T(x, y), which is the search element 12 outputs to the vector calculation element 13, is the location of the attention pixel in the center of the target block T. The location of the attention pixel is specifically a coordinates (x, y). And the data indicating the location of the destination block R(x, y), which the search element 12 outputs to the vector calculation element 13, is the location of the pixel in the center of the destination block R. The location of such center pixel is (a, b). The vector calculation element 13 calculates the vector v(x, y) having the start location (x, y) and the end location (a, b). Such vector v(x, y) is the vector corresponding to the attention pixel located at the location (x, y) in the original image $I_t$. FIG. 7 is illustrating the aspect in which the vector calculation element 13 calculates the vector v(x, y) relative to the target block T(x, y).

[Generation of the Vector Map mv]

According to the above illustration, the operation of each element 11, 12, 13 relative to the attention pixel located at the location (x, y) in the original image $I_t$ is set forth. The attention pixel is just one of pixels forming the original image $I_t$. For example, a vector v(x+1, y) corresponding to the pixel (x+1, y) adjacent to the right side of the attention pixel (x, y) should be in the original image $I_t$. According to the aspect of the Embodiment 1, a vector corresponding to all pixels forming the original image $I_t$ can be calculated. Accordingly, the above operation of each element 11, 12, 13 is repeated the same number of times as the number of pixels forming the original image $I_t$.

Accordingly, each vector corresponding to the respective pixels forming the original image $I_t$ can be calculated. Such vector is indicating that the block in the 5×5 original image $I_t$ surrounding the start location of the vector has shifted to where in the reference image $I_{t-1}$. The original image It and the reference image $I_{t-1}$ are originally obtained by an X-ray imaging the subject continuously, so that both can be similar but the location imaged thereof is different each other. In addition, the images imaged in both images are not in the relationship as if both images has shifted simply in one direction and shifted to the right, shifted to the left or not shifted, so that the shifting direction and the shifting distance vary depending on the portion of the image. According to the aspect of the present invention, such complicated shifting aspect is acquired by calculating the vector indicating the shifting aspect of the image per pixel. Such vector is indicating the attention pixel and the destination of the block surrounding therearound, but from convenient sake, can be deemed indicating the destination of the attention pixel.

As it can be understandable that the same number of vectors as the pixels forming the original image $I_t$ can be calculated. Referring to FIG. 8, for the convenient for illustration, such vectors are collectively represented as a vector map mv. Such vectors are arranged following the arrangement of pixels to which each vector correspond. Instead of the vector map mv, a table and so forth can be applied to control each vector.

[Operation of a Block Superimposing Element 14]

The vector map mv, the original image $I_t$ and the superimposition target image $O_{t-1}$ are output to the block superimposing element 14. The purpose of the block superimposing element 14 is to reduce a noise component imaged in the target block T by superimposing a superimposition target block G to each target block T. The block superimposing element 14 corresponds to the superimposing means of the present invention.

Figure 9A:
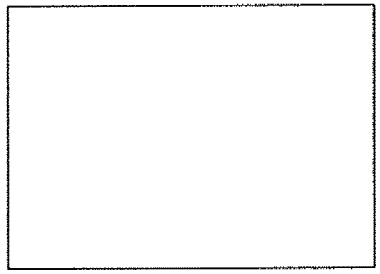
FIG. 9A, 9B, 9C, are schematic diagrams illustrating an operation of the block superimposing element according to the aspect of the Embodiment 1.
Figure 9B:
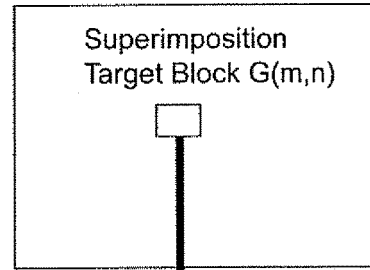
Figure 9C:
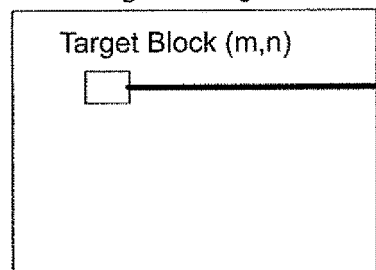

FIG. 9 is illustrating an aspect in which the block superimposing element 14 is executing the block superimposing processing on the pixel located at the location (m, n) in the original image $I_t$. The target block T(m, n) corresponds to such pixels coincides with the area 5×5 in height and width having the center (m, n). The block superimposing element 14 first figures out the target block T(m, n) in the original image $I_t$. And the block superimposing element 14 figures out the location to which the target block T(m, n) has shifted in the superimposition target block $O_{t-1}$ referring to the vector v(m, n) belonging to the vector map mv and figures out the superimposition target block G(m, n) corresponding to the destination. And the target block T(m, n) and the superimposition target block G(m, n) are superimposed to form a fusion block F(m, n). The center of the superimposition target block G(m, n) is not limited to the location (m, n).

Here it is necessary to pay attention that the image used when the vector map mv was calculated is not the same as the image to which the vector map mv was applied. Specifically, from the calculation standpoint, the vector map mv is indicating how the original image $I_t$ has shifted to be imaged in the reference image $I_{t-1}$. Accordingly, the vector map mv is seemingly not related to the superimposition target image $O_t\_1$ at all.

Nevertheless, the vector map mv has been used when the superimposition target block G was searched out from the superimposition target image $O_{t-1}$. It is questionable whether the block superimposing element 14 can search out a block resembling the target block T by such operation or not.

The superimposition target image $O_{t-1}$ is originally a noise reduction image $O_{t-1}$ corresponding to the original image $I_{t-1}$. The noise reduction image $O_{t-1}$ is generated by superimposing the original image $I_{t-1}$ and the superimposition target image $O_{t-2}$. However, the subject images imaged in both images are different each other. Under considering such condition, the noise reduction image $O_{t-1}$ is generated by fragmenting the superimposition target image $O_{t-2}$ and then superimposing such fragmented image to the original image $I_{t-1}$. Accordingly, the same subject image imaged in the original image $I_{t-1}$ is imaged in the noise reduction image $O_{t-1}$. The main difference between two images is whether noises are taken or not and the imaged subject images are the same.

Therefore, if the vector map mv generated based on the reference image $I_{t-1}$ is applied to the superimposition target image $O_{t-1}$ when the processing is performed on the original image block similar to the target block T in the original image $I_t$ can be found in the superimposition target image $O_{t-1}$.

In such scenario, it seems better that the vector map mv is generated by using the superimposition target image $O_{t-1}$. Needless to say, such method may be applicable. However, it is preferable that an equivalent image to the original image $I_t$ is used to understand the shift of the target block T. The superimposition target image $O_t\_1$ is inappropriate for search processing because the noise removal processing has been already performed thereon and therefore such image cannot be deemed equivalent to the original image $I_t$. Therefore, according to the aspect of the Embodiment 1, the vector map mv is generated by using the reference image $I_t$.

According to the above illustration, the operation of the block superimposing element 14 relative to the pixel located at the location (m, n) in the original image $I_t$ is set forth. Such pixel is just one of pixels forming the original image $I_t$. For example, a fusion block F(m+1, n) corresponding to the pixel (m+1, n) adjacent to the right side of the pixel (m, n) should be in the original image $I_t$. According to the aspect of the Embodiment 1, fusion block corresponding to all pixels forming the original image $I_t$ are calculated. Accordingly, the above operation of the block superimposing element 14 is repeated the same number of times as the number of pixels forming the original image.

In addition, when the target block T(m, n) and the superimposition target block G(m, n) are superimposed, a predetermined weighting can be applied. Specifically, the setting value for weighting can be adjusted so as to image the target block T(m, n) twice darker than the superimposition target block G(m, n) in the fusion block F(m, n). In such case, additions of both blocks T and G, which are repeatedly executed, are completed with the same weighting. In such way, the block superimposing element 14 generates a fusion block F by superimposing a superimposition target block G, which is in the same location of the destination block R, in the superimposition target image $O_{t-1}$ having the subject image in the same location of the reference image $I_{t-1}$, to the target block T in the original image $I_t$.

[Operation of the Image Synthesis Element 15]

Figure 10A:
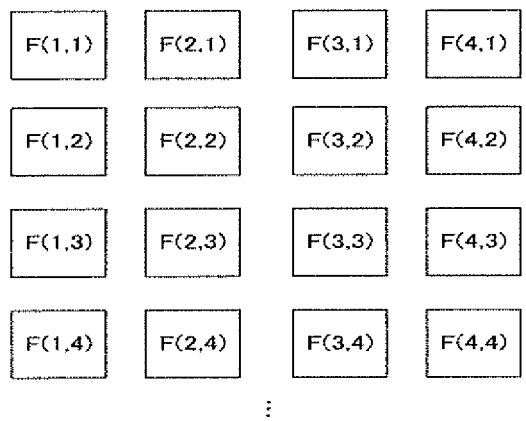
FIG. 10A, 10B are schematic diagrams illustrating an operation of the image generation element according to the aspect of the Embodiment 1.
Figure 10B:
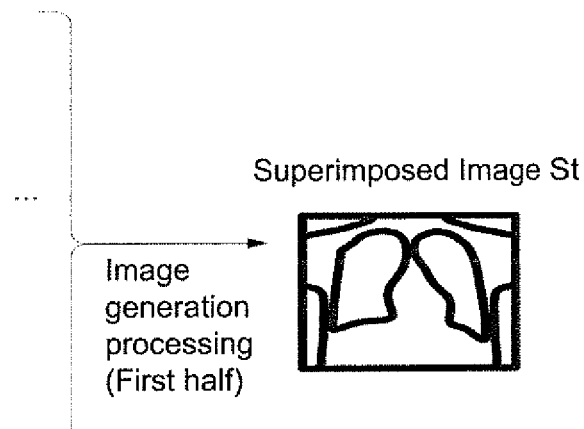

FIG. 10 is illustrating the plural fusion blocks F generated by the block superimposing element 14. The data indicating such fusion blocks F are output to the image generation element 15 with the data indicating the locations of the fusion blocks F. The image generation element 15 corresponds to the image generation means of the present invention.

Referring to FIG. 10, the image generation element 15 generates a superimposition image St having the same as the image size of the original image $I_t$ by superimposing each fusion block F. The inventor sets forth the method of superimposing the fusion blocks F at this time. A fusion block F(x, y) is formed with 25 pixels arranged in the 5×5 rectangle and the center pixel a is at the location (x, y). The image generation element 15 arranges the fusion blocks F(x, y) at the location (x, y) of the superimposition image St. Accordingly, the center pixel a is arranged at the location (x, y) of the superimposition image St. As well, the image generation element 15 arranges the fusion block F(x+1, y) at the location (x+1, y) of the superimposition image St.

At this time, the fusion block F(x, y) and the fusion block F(x+1, y) are overlapped each other. The image generation element 15 executes superimposing by adding the pixels relative to such overlapped portion.

Figures 11A, 11B:
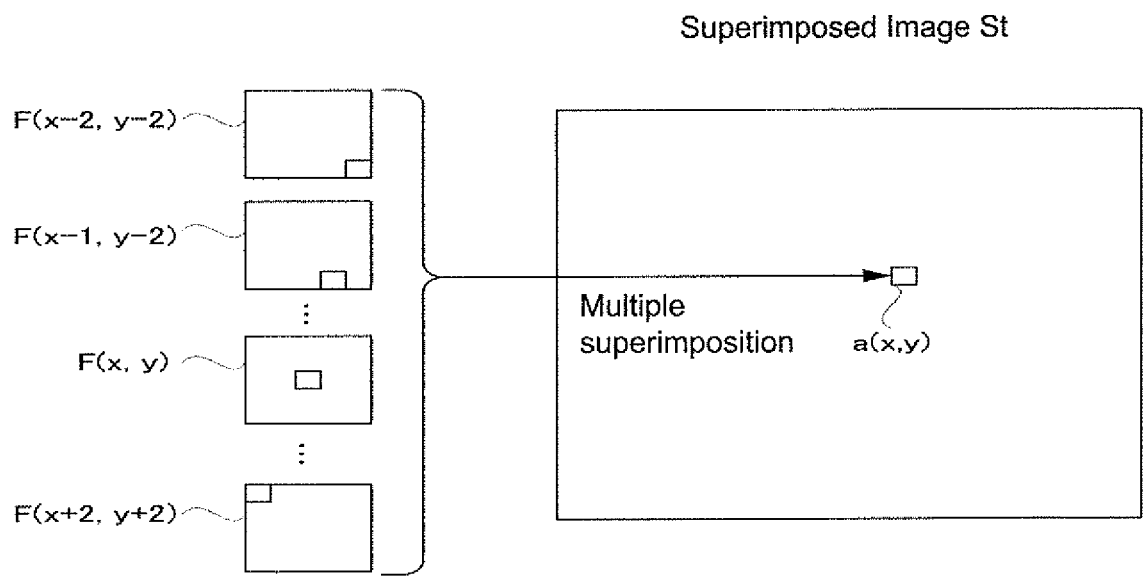
FIG. 11A, 11B are schematic diagrams illustrating an operation of the image generation element according to the aspect of the Embodiment 1.

In such scenario, it is questioned how many fusion blocks are superimposed in the pixel a at the location (x, y) of the superimposition image St. A fusion block F is formed with 25 pixels. Referring to FIG. 11, the fusion block F having the pixel a may have the pixel a at the bottom right, at the next left to the bottom right, or at the upper left corner. Further generally speaking, the pixel a appears in any 25 kinds of fusion blocks F(x+m, Y+n) represented when −2≤m≤2, −2≤n≤2 are complete. Any such fusion blocks F are superimposed in the superimposition image St, so that 25 fusion blocks F are multiply superimposed in the pixel a of the superimposition image St.

Such superimposition image St is far away from the original image $I_t$. Specifically, the pixel value thereof is approximately 25 times higher than the original image $I_t$.

The fusion block F is per se an image fragment having an equivalent pixel value to the original image $I_t$. The pixels forming the superimposition image St are formed by superimposing 25 fusion blocks F, so that the pixel values are approximately 25 times.

Figure 12A:
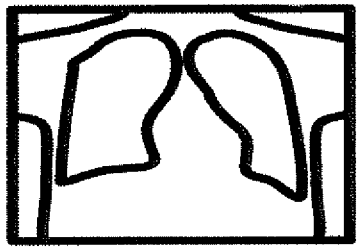
FIG. 12A, 12B are schematic diagrams illustrating an operation of the image generation element according to the aspect of the Embodiment 1.
Figure 12B:
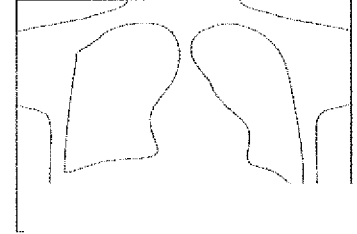

Then, referring to FIG. 12, the image generation element 15 performs the dividing processing on the superimposition image St, so that the level of the pixel is cut to the similar level of the original image $I_t$. In addition, the number of superimposition of the fusion block F may be less than 25 at the edge of the superimposition image. Accordingly, the image generation element 15 executes the dividing processing on the superimposition image St while changing every pixel based on the superimposing state map indicating how many fusion blocks F can be superimposed depending on the location of the superimposition image St. Nevertheless, the image generation element 15 executes the dividing processing by 25 on majority pixels of the pixel located at the center of the superimposition image St.

The image following the dividing processing is a noise reduction image $O_t$ indeed. Such noise reduction image $O_t$ is an image as the noise in the original image $I_t$ is removed therefor and is output from an image processing device 10 as a frame forming the noise reduction video Vα. In addition, the noise reduction image $O_t$ is the superimposition target image when the noise reduction processing is performed on the original image $I_{t+1}$. The reference image $I_t$ relative to such noise reduction processing is the same as the original image $I_t$ referring to FIG. 2.

The inventor sets forth the reason why the complete noise reduction image $O_t$ is, imaging the same as the subject image of the original image $I_t$. The noise reduction image $O_t$ is formed by superimposing the original image $I_t$ and the superimposition target image $O_{t-1}$. The subject image imaged in the original image $I_t$ and the subject image imaged in the superimposition target image $O_{t-1}$ are not completely the same image and partially out of positional alignment. The image processing device 10 corrects the state out of positional alignment to superimpose both images. Specifically, when the fusion block F is formed, the state out of positional alignment between the original image $I_t$ and the superimposition target image $O_{t-1}$ is corrected. In fact, the superimposition target image $O_{t-1}$ is superimposed to the noise reduction image $O_t$ as the imaged image is corrected so as to correspond to the original image $I_t$.

On the other hand, from the original image $I_t$ standpoint, a processing by the image processing device 10 forms once fine fragments and then just recovers one image therefrom. Accordingly, the noise reduction image $O_t$ is the image as only noise components are removed from the image imaged in the original image $I_t$ and the subject images imaged in both images are the same. Such fact is the reason why the same subject image is imaged in the superimposition target image $O_{t-1}$ and the original image $I_{t-1}$.

In such way, the image generation element 15 generates a noise reduction image $O_t$ in which noises imaged in the original image $I_t$ are reduced by superimposing one after the other fusion blocks F in the image along with setting one after the other target blocks while changing the location of the attention pixel. At this time, the image generation element 15 is operative to let the location of the fusion block F in the noise reduction image $O_t$ be the same as the location of the target block in the original image $I_t$.

In such way, the image generation element 15 generates the noise reduction image $O_t$ the noise imaged in the original image $I_t$ is reduced by performing an operation, in which the fusion blocks F are arranged as the location of the attention pixel in the fusion block F is the same as the original image $I_t$, on the different attention pixel. The image generation element 15 generates the noise reduction image $O_t$ by dividing the pixel value of the pixel in the image by the integrating number indicating how many times the fusion blocks F are added relative to a certain pixel following addition while overlapping the fusion blocks F.

[Other Elements]

The above illustrations are basic operations of the image processing device according to the aspect of the present invention. In addition to the above operations, the structure of the present invention can add an operation to perform an imaging processing for a variety of purposes. Accordingly, the following weighting setting element 16 and a vector editing element 17 can be activated as needed or not be activated corresponding to necessity case by case.

(Weighting Setting Element 16)

The weighting setting element 16 is related to the block superimposing element 14 when the block superimposing element 14 superimposes the target block T in the original image $I_t$ and the superimposition target block G in the superimposition target image $O_{t-1}$. Such weighting setting element 16 outputs a setting value that changes the superimposing aspect every target blocks T to the block superimposing element 14. The block superimposing element 14 executes superimposing in the different aspect every target block T.

Specifically, when the weighting setting element 16 is not operative, the block superimposing element 14 is operative to superimpose the superimposition target blocks G with the same darkness relative to all target blocks T by superimposing both blocks G based on the constant weighting. If the weighting setting element 16 is operative, the block superimposing element 14 is operable to superimpose the superimposition target blocks G darker relative to certain target block T and superimpose the other target blocks T thinner than the superimposition target blocks G.

A plurality of methodologies is available for the operation of such weighting setting element 16. Hereinafter, the inventors illustrate each methodology of the present invention in detail.

(Methodology to Change Weighting Per Operation of the Weighting Setting Element 16)

FIG. 13 is illustrating the case in which the weighting setting element 16 is operative with the methodology by which the weighting is changed per pixel. Referring to FIG. 13, the aspect in which the pixel a in the upper left end of the superimposition target block G(x, y) is superimposed to a pixel A in the upper left end of the target block T(x, y) at the location of (x, y) in the original image $I_t$. At this time, the block superimposing element 14 receives a weighting setting $β_A$ corresponding to the pixel A in the target block T(x, y) from the weighting setting element 16 and executes an superimposing operation by which the pixel upper left end of the fusion block F(x, y) is the sum of the pixel A×(1−$β_A$) and the pixel a×$β_A$. Given $β_A$ is 0, a fusion block F' is formed without adding the pixel a of the superimposition target block G(x, y) to the pixel A of the target block T(x, y) at all. In addition, given $β_A$ is 0.5, a fusion block F' is formed by adding the pixel a of the superimposition target block G(x, y) and the pixel A of the target block T(x, y) under the same intensity. Specifically, along with increase of β, the superimposition of the pixel a of the superimposition target block G is gradually intensified. In such way, with regard to the noise reduction image $O_t$ generated based on the formed fusion block F, the superimposition target image $O_{t-1}$ should be superimposed darker or lighter from portion to portion.

The weighting setting element 16 sends the setting value β, corresponding to some pixels of the target block T which the block superimposing element 14 is going to superimpose, to the block superimposing element 14 referring to a table in which each pixel in the target block T and the setting value β are related each other. Accordingly, the number of tables is the same as the number of the target block T. No common table is used between the target blocks T.

Some pixels A in the original image $I_t$ are belonging to the target block T(x, y). When the target block T(x, y) and the superimposition target block G are superimposed, the pixel A and the pixel a are superimposed each other. The setting value of weighting of such superimposition is $\beta_A$. Such $\beta_A$ is determined by the pixel value of the pixel A and the pixel value of the pixel a, as set forth later. Further, such pixels A are also belonging to the target block T(x−1, y). When the target block T(x−1, y) and the superimposition target block G(x−1, y) are superimposed, some pixels in the superimposition target image $O_{t-1}$ are superimposed to the pixel A. It is not guaranteed that such superimposed pixels are the same as the pixels a in advance. The search element 12 search out individually the respective target blocks T because the search result of the target block T(x, y) and the search result of the target block T(x−1, y) are independent each other.

In some case, a pixel α in the superimposition target block G(x−1, y) different from the pixel a has been superimposed to the pixel A. The pixel a and the pixel α are different pixels each other, so that each pixel value is different in many cases. When the target block T(x−1, y) and the superimposition target block G(x−1, y) are superimposed, the pixel A and the pixel α are superimposed each other. The setting value of weighting of such superimposition is $\beta_\alpha$, which is determined by a pixel value of the pixel A and a pixel value of the pixel α. That means that when the target blocks T are different even if the same pixel A is superimposed, the setting value β may be different. Accordingly, the setting value β must be calculated every target block T. Each setting value β relative to one pixel A is calculated the same number of times as the target block T one by one.

Figure 14:
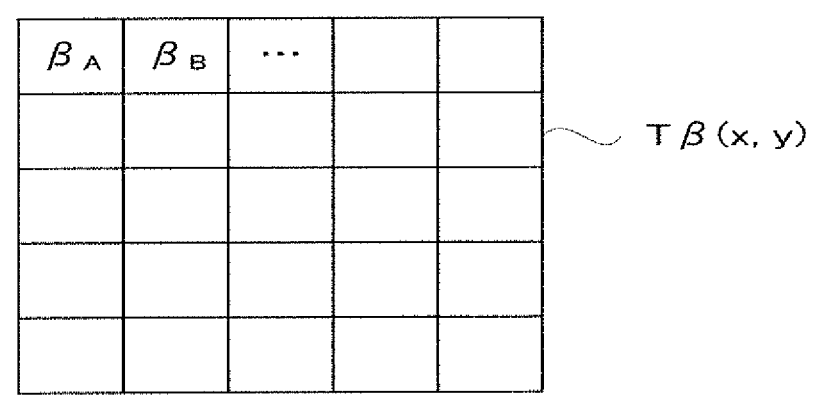

FIG. 14 is illustrating a table Tβ(x, y) of the setting value β referred by the weighting setting element 16 when the target block T(x, y) receives a superimposing processing. Eigen-setting values $\beta_A$, $\beta_B$, ... of some pixel A, B, ... are arrayed in such table Tβ(x,y). Such table Tβ(x,y) is stored in the memory element 20.

Figure 15:
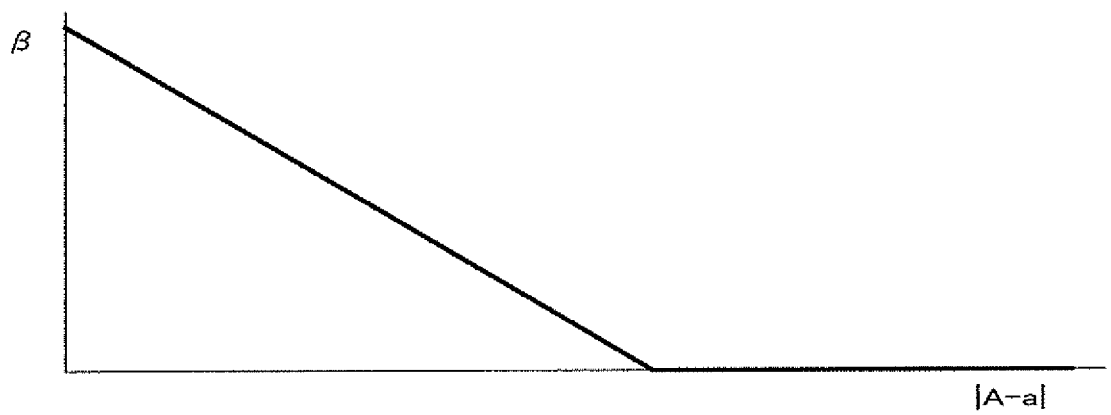
FIG. 15 is a schematic diagram illustrating an operation of the weighting setting element according to the aspect of the Embodiment 1.

The weighting setting element 16 generates the table Tβ(x,y) before the block superimposing element 14 takes an operation related to block superimposing. The inventor sets forth the method of generation of the table Tβ(x,y). FIG. 15 is illustrating the relationship between an absolute value |A−a| of the pixel value difference referred when the weighting setting element 16 generates the table Tβ(x,y) and the weighting setting value β. The data indicating such relationship is stored in the memory element 20.

The absolute value |A−a| is a benchmark indicating how different each pixel is. The difference between pixels is big when such absolute value is high, and the pixel A is different from the pixel a.

It is apparent from FIG. 15 that according to the relationship between the absolute value |A−a| and β, the smaller absolute value |A−a| is, the larger β is set. The small absolute value |A−a| means that the pixel A in the target block T and the pixel a in the superimposition target block G are resemble each other. Specifically, it can be deemed that the subject images appeared in both pixels are resembling, so that even if the pixel a is superimposed to the pixel A in rather dark mode, no image doubling takes place.

According to the aspect of the present invention, in such case, β is set as large so as to remove assuredly a noise in the pixel A.

The large absolute value |A−a| means that the pixel A in the target block T and the pixel a in the superimposition target block G are different each other. Specifically, the subject images appeared in both pixels are different, so that if the pixel a is superimposed to the pixel A in rather dark mode one by one, as results, the subject images are imaged double in the obtained noise reduction image $O_t$. Therefore, according to the aspect of the present invention, in such case. 13 is set as smaller so as to prevent doubling of the subject image.

According to such method of changing weighting per pixel, the block superimposing element 14 acquires weighting setting value β from the weighting setting element 16 and superimposes the pixel of the target block T in the original image $I_t$ and the corresponding pixel of the superimposition target block G in the superimposition target image $O_{t-1}$ with individual weighting per pixel forming the fusion block F. Weighting of superimposition is changed so that the superimposition target block G cannot be gradually succeeded by the fusion block F in accordance with increase of the absolute value of the difference between the pixel value of the pixel belonging to the target block T and the pixel value of the corresponding pixel in the superimposition target block.

According to the above aspect, the weighting setting element 16 is using the pixel value of the pixel belonging to the superimposition target block G in the superimposition target image $O_{t-1}$ to set the setting value β, but the pixel value of the pixel belonging to the destination block R in the reference image $I_{t-1}$ instead of the superimposition target block G can be applied to set the setting value β.

(Operation of the Weighting Setting Element 16: Methodology to Change Weighting Per Block)

Figure 16A:
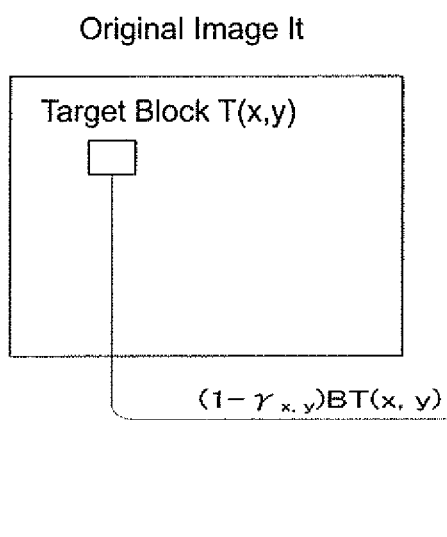
FIG. 16A, 16B are schematic diagrams illustrating an operation of the weighting setting element according to the aspect of the Embodiment 1.
Figure 16B:
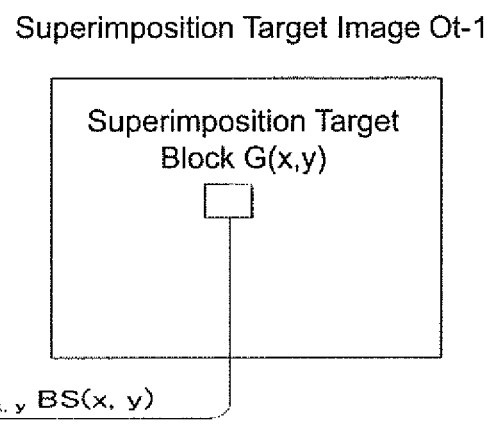

According to the above methodology, weighting of superimposition is changed per pixel. The present invention is not limited to such aspect. FIG. 16 is illustrating the case in which the weighting setting element 16 is operative with the methodology by which the weighting is changed per block. Referring to FIG. 16, the aspect in which the superimposition target block G(x, y) is superimposed to the target block T(x, y) at the location of (x, y) in the original image $I_t$. At this time, the block superimposing element 14 receives a weighting setting value $\gamma_{x,y}$ corresponding to the target block T(x, y) from the weighting setting element 16 and executes an superimposing operation by which the fusion block F(x, y) is the sum of the target block T×(1−$\gamma_{x,y}$) and the superimposition target block G×$\gamma_{x,y}$.

Given $\gamma_{x,y}$ is 0, a fusion block F' is formed without superimposing the superimposition target block G(x, y) to the target block T(x, y) at all. In addition given $\gamma_{x,y}$ is 0.5, a fusion block F' is formed by superimposing the superimposition target block G(x, y) and the target block T(x, y) under the same intensity. Specifically, along with increase of γ, the superimposition of the superimposition target block G is gradually intensified.

The weighting setting element 16 sends the setting value γ, corresponding to the target block T which the block superimposing element 14 is going to superimpose, to the block superimposing element 14 referring to a table in which the target block T and the setting value γ are related each other. In such way, with regard to the noise reduction image $O_t$ generated based on the formed fusion block F, the superimposition target image $O_{t-1}$ should be superimposed darker or lighter from portion to portion.

Figure 17:
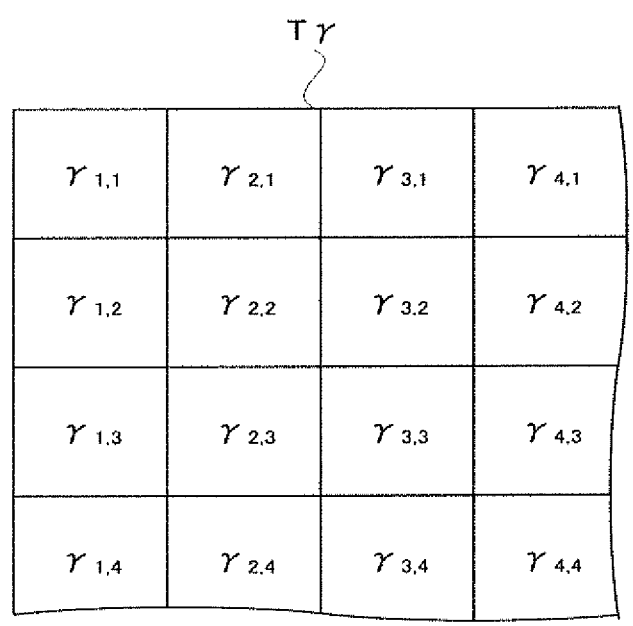
FIG. 17 is a schematic diagram illustrating an operation of the weighting setting element according to the aspect of the Embodiment 1.

FIG. 17 is illustrating a table Tγ(x, y) of the setting value γ referred by the weighting setting element 16. Eigen-setting values γ(a, b) of some target block T(a, b) are arrayed in such table Tγ. Such table Tγ) is stored in the memory element 20.

Figure 18:
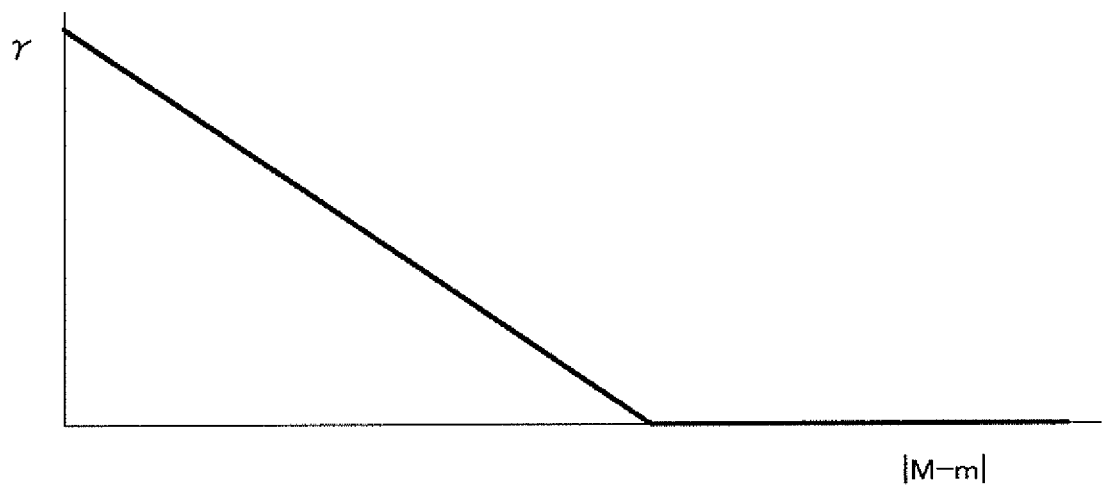
FIG. 18 is a schematic diagram illustrating an operation of the weighting setting element according to the aspect of the Embodiment 1.
Figure 19A:
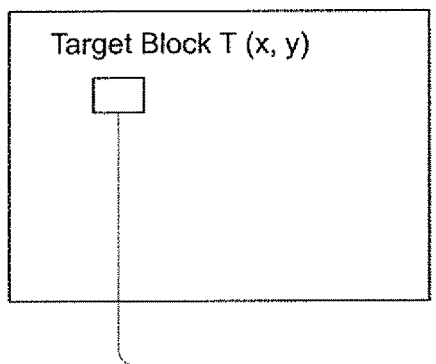
FIG. 19A, 19B, 19C, 19D are schematic diagrams illustrating an operation of the vector editing element according to the aspect of the Embodiment 1.
Figure 19B:
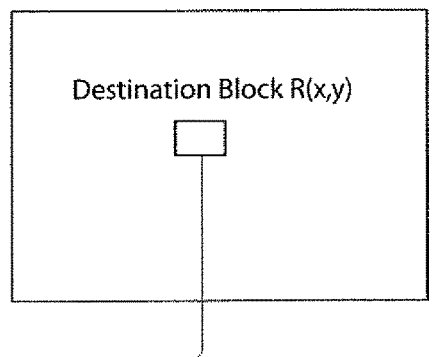
Figure 19C:
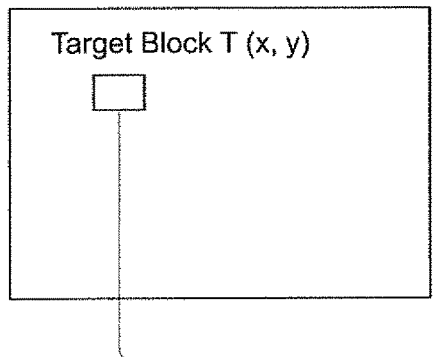
Figure 19D:
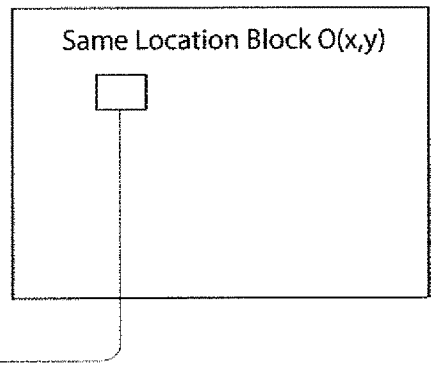

The weighting setting element 16 generates the table Tγ before the block superimposing element 14 takes an operation related to block superimposing. The inventor sets forth the generation method of the table Tγ. A pixel in the center of the target block T(x, y) at the location of (x, y) in the original image $I_t$ is a representative pixel M and a pixel in the center of the superimposition target block G(x, y) is a representative pixel m. FIG. 18 is illustrating the relationship between an absolute value |M−m| of the representative pixel value difference referred when the weighting setting element 16 generates the table Tγ and the weighting setting value γ. The data indicating such relationship is stored in the memory element 20.

The absolute value |M−m| is a benchmark indicating how different the representative pixel of the target block T and the representative pixel of the superimposition target block G are each other. When such absolute value is high, the difference between the representative pixels is great and the representative pixel M is different from the representative pixel m. When the weighting setting element 16 acquires the weighting setting value γ(a,b) relative to some target block T(a, b), the absolute value $|M-m|_{a,b}$ of the superimposition target block G(a, b) is used. Specifically, according to the relationship referring to FIG. 18, the weighting setting element 16 reads out the weighting setting value γ corresponding to the absolute value $|M-m|_{a,b}$ and the read-out weighting setting value γ is set as a setting value $γ_{a,b}$ corresponding to the target block T(a, b).

It is apparent from FIG. 18 that according to the relationship between the absolute value |M−m| and γ, the smaller absolute value |M−m| is, the larger γ is set. The small absolute value |M−m| means that the target block T and the superimposition target block G are resemble each other. Specifically, it can be deemed that the subject images appeared in both pixels resemble each other, so that even if the superimposition target block G is superimposed to the target block T in rather dark mode, no image doubling takes place. According to the aspect of the present invention, in such case, γ is set as large so as to remove assuredly a noise in the target block T.

The large absolute value |M−m| means that the target block T and the superimposition target block G are different each other. Specifically, it can be deemed that the subject images appeared in both pixels are different, so that even if the superimposition target block G is superimposed to the target block T in rather dark mode, an image doubling takes place. Therefore, according to the aspect of the present invention, in such case, γ is set as smaller so as to control doubling of the subject image.

In such way, the noise element is absolutely obscure in some portion of the generated noise reduction image $O_t$ because the superimposition target image $O_{t-1}$ is superimposed in the rather dark mode and the image doubling is obscure in the other portion because the superimposition target image $O_{t-1}$ is superimposed in the rather lighter mode. Accordingly, if the weighting setting element 16 is included, the noise reduction image Ot providing a much superior visual recognition can be acquired.

According to such method of changing weighting per block, the block superimposing element 14 acquires a weighting setting value γ from the weighting setting element 16 and superimposes the target block T in the original image $I_t$ and the superimposition target block G in the superimposition target image $O_{t-1}$ with individual weighting every time forming the fusion block F. Weighting of superimposition is changed so that the superimposition target block G cannot be gradually succeeded by the fusion block F in accordance with increase of the absolute value |M−m| of the difference between the representative pixel value in the target block T and the representative pixel value in the superimposition target block G.

According to the above aspect, the weighting setting element 16 is using the pixel value of the pixel belonging to the superimposition target block G in the superimposition target image $O_{t-1}$ to set the setting value γ, but the pixel value of the pixel belonging to the destination block R in the reference image instead of the superimposition target block G can be applied to set the setting value γ.

According to the aspect of the present invention, an operation in addition to the weighting setting element 16 can be performed. Hereafter, the inventor sets forth the structure of a vector editing element 17 in association with a formation of a vector map mv. The vector editing element 17 corresponds to the editing means of the present invention.

(Operation of the Vector Editing Element 17)

The vector map mv is a map formed from vectors indicating to where the target block T in the original image $I_t$ shifted in the reference image $I_{t-1}$. The subject image does not change between the reference image and the superimposition target image $O_{t-1}$, so that the vector map mv indicates the destination of the target block T in the superimposition target image $O_{t-1}$. However, such vector map mv has the following problems.

Specifically, the vector map mv is generated by selecting the most resemble the target block T in plural candidate block C and determining definitely as the destination block R corresponding to the target block T. Accordingly, if the superimposition target block G corresponding to the destination block R is superimposed to the target block T, the noise in the target block T may become even more visible. Such phenomena take place more often when many noise components distribute particularly in the original image.

The search element 12 forces to searches out a block resembling the target block T from candidate block C. If terrific noises are imaged in the target block T, the search element 12 tries to search out such noise pattern from inside of the reference image. Then, the search element 12 determines a candidate block C most resembling pattern of the noise component imaged in the target block T as the destination block R. The vector map mv contains even the result obtained by selecting forcibly the destination block R in such way.

Accordingly, if the search element 12 forcibly selects the destination block R, the destination block R may be selected because the imaged noise component resembles the noise component in the target block T in some cases. In such cases, if both blocks are superimposed, the respective noise components enhance each other as results and each noise becomes even more visible. Such phenomenon in which the noise enhances each other may take place when the S/N ratio in the original image $I_t$ is low or when the subject image is not imaged in the target block T other than the portion in which the noise component in the original image $I_t$ appears strongly.

The vector editing element 17 searches out a vector having an attention pixel of the target block T in the vector map mv as the start point and the center of the destination block R unmeaningly resembling the target block T as the end point to compensate the drawback of the search element 12 and edits the vector map mv by changing such vector to a zero vector.

The vector editing element 17 validates each vector forming the vector map mv by using the original image $I_t$ and the reference image $I_{t-1}$. FIG. 19 is illustrating the aspect in which the vector editing element 17 validating some vector at the location of (x, y) of the vector map mv. The vector editing element 17 first acquires a variation $S(R)_{x,y}$ between the target block T(x, y) and the destination block R(x, y) from the search element 12. The upper side of FIG. 19 is illustrating schematically the calculation aspect of the variation $S(R)_{x,y}$.

Next, the vector editing element 17 determines a block having the same size and the same form as the target block T in which the location of (x, y) in the reference image It−1 is the center thereof. Such block is the block in the same location as the target block T in the original image $I_t$ relative to the reference image $I_{t-1}$ and is now referred as the same location block O(x, y). If such same location block O rather than the destination block R is used to generate the fusion block F, the image quality of the noise reduction image $O_t$ may be improved in some cases. Because if the superimposition target block G corresponding to the destination block R is superimposed to the target block T, as set forth above, the noise component imaged in each block may enhances each other in some cases. In such cases, if the blocks in the superimposition target image $O_{t-1}$, which is located in the same location as the target block T, are superimposed to generate the fusion block F, the noise component imaged in each block is appropriately erased. The noise component imaged in a video is always fluctuating, so that the pattern of the noise component imaged in the specific portion of each frame varies with time and cannot be the same. The problem is how it is determined whether the same location block O is applied to generate the fusion block F or not. The vector editing element 17 performs such determination by using the variations S(R) and S(O).

The vector editing element 17 calculates a variation S(O)x,y between the target block T(x, y) and the same location block O(x, y). Accordingly, S(O)=Σ|Ti−Oi| is complete. Ti is each pixel value of pixels forming the target block T and $O_i$ is each pixel value of pixels forming the candidate block C. The i indicates the location of the respective pixels in each block. The lower side of FIG. 19 is illustrating schematically the calculation aspect of the variation $S(O)_{x,y}$.

The vector editing element 17 compares the variation $S(R)_{x,y}$ relative to the destination block R(x, y) and the variation $S(O)_{x,y}$ relative to the same location block O(x, y). In fact, the same location block O(x, y) is the candidate block C when the search element 12 searches out the destination block R. Such same location block O(x, y) was previously the candidate block C which was most resembling the target block T(x, y), but eventually as a matter of fact, the same location block O(x, y) has not been selected as the most resembling. Accordingly, when the same location block O(x, y) and the destination block R(x, y) are in the different locations, the variation S(R)x,y is always smaller than the variation $S(O)_{x,y}$.

The issue is whether the variation S(R)x,y is significantly smaller than the variation $S(O)_{x,y}$ or not. The FIG. 20B is illustrating the case in which the variation S(R)x,y is significantly smaller than the variation $S(O)_{x,y}$. The same location block O(x, y) is considered as the first candidate block when it is examined where the target block T(x, y) is in the reference image $I_{t-1}$. The original image $I_t$ and the reference image $I_{t-1}$ are imaged continuously, so that the subject image in the original image $I_t$ should not shift so far away in the reference image $I_{t-1}$. The fact that the destination block R(x, y) is more significantly resembling the target block T(x, y) than the same location block O(x, y) means that the selection reliability of the destination block R(x, y) can be high.

In contrast, as illustrated in the right side of FIG. 20B, the fact that when the variation S(R)x,y resembles the variation S(O)x,y, the destination block R(x, y) is not significantly resembling the target block T(x, y) than the same location block O(x, y) means that the selection reliability of the destination block R(x, y) can be low.

Specifically, the vector editing element 17 determines that the reliability of the vector in the location of (x, y) in the vector map mv is high when variation S(O)x,y/variation S(R)x,y is higher than the predetermined value, and the reliability of the vector is low when variation S(O)x,y/variation S(R)x,y is the same as or lower than the predetermined value.

Figures 22A, 22B, 22C:
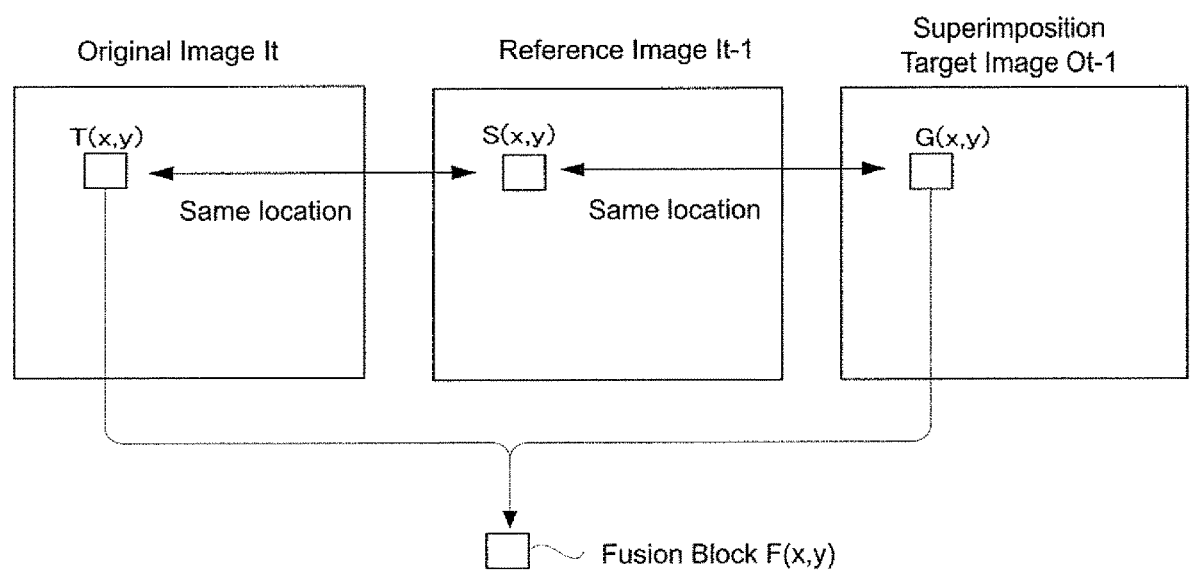
FIG. 22A, 22B, 22C are schematic diagrams illustrating an effect of the vector editing element according to the aspect of the Embodiment 1.

The vector editing element 17 validates, as set forth above, all vectors in the vector map mv and the vector v(a, b) having low reliability performs an edition in which the vector map mv is changed to the zero vector as illustrated in FIG. 21. Accordingly, referring to FIG. 22, with regard to the location of (a, b) where the vector was overwritten, the superimposition target block G(x, y) in the superimposition target image $O_{t-1}$ is in the same location as the target block T in the original image $I_t$ by the block superimposing element 14.

Specifically, according to the image processing device of the present invention, the vector editing element 17 superimposes the block in the superimposition target image $O_{t-1}$ corresponding to the same location as the target block T in the original image $I_t$ to the target block T when a block significantly resembling the target block T is not found in the reference image $I_{t-1}$. Accordingly, turbulence of the noise reduction image $O_t$ that takes place when the block unmeaningly resembling the target block T in the superimposition target image $O_{t-1}$ is superimposed to the target block T can be prevented.

The block in the superimposition target image $O_{t-1}$ corresponding to the same location as the target block T in the original image $I_t$ is guaranteed relative to resemblance thereof to some degree. Because the original image $I_t$ and the reference image $I_{t-1}$ imaging the subject image imaged into the superimposition target image $O_{t-1}$ are continuous images (photos). In contrast, when a block resembling the target block T is searched out from plural candidate blocks, the variation is compared. In such method, the variation is just used as a benchmark of resemblance, so that if a superimposition of blocks is executed relying only on such benchmark, the likelihood of that an error takes place is high. Then, according to the aspect of the present invention, when the variation S(R) is not smaller enough than the variation S(O), it is avoided to definitively determine that the destination block R resembles the target block T. According to the aspect of the present invention, in such case, the block in the superimposition target image $O_{t-1}$ corresponding to the same location as the target block T is set as a target so that the overall reliability of the noise reduction image $O_t$ can be increased while avoiding a big error.

In such way, the vector editing element 17 sets the same location block O in the location of the target block T in the reference image It−1 and overwrites the vector map mv, which is an output from the search means, so that the destination block R searched out by the search element 12 can become the same location block O when the destination block does not significantly resemble the target block compared to the same location block O.

Each element 11, 12, 13, 14, 15, 16, 17 can be brought into reality by CPU executing a variety of programs. Each element 11, 12, 13, 14, 15, 16, 17 can be brought into reality by an individual processing device carrying out each.

[Action and Effect] As set forth above, according to the aspect of the present invention, an image processing device 10 capable of removing absolutely noises in each frame forming a live image V can be provided. Specifically, according to the aspect of the present invention, a target block T can be set in the original image $I_t$ and it can be searched out where in the superimposition target image $O_{t-1}$ such target block T is imaged. In such way, if a destination of the target block T is searched out in the superimposition target image $O_{t-1}$, each image can be superimposed each other while tracking the subject image in the original image $I_t$ in the superimposition target image $O_{t-1}$, so that the subject can never be imaged double due to superimposing.

In addition, according to the aspect of the present invention, such tracking of the subject image is executed per block and an erroneous tracking is corrected feeding back the plural tracking results relative to one pixel, so that reliability can be extraordinarily improved compared to the conventional method searching out the destination every individual pixel.

In addition, according to the above aspect, the pixel value of the pixel in the image is divided by the integrating number, which indicates how many times the fusion blocks are added following addition while overlapping the fusion blocks F. In such way, more reliable noise reduction image $O_t$ can be generated.

The inventor sets forth the rationale therefor. It depends on that the respective pixels forming the noise reduction image $O_t$ are the results of superimposing the target block T and the superimposition target block G. The same image as the subject image imaged in the target blocks T should be imaged in the superimposition target block G, but if the search element 12 erroneously determines the destination block R, the case in which the inappropriate area as the superimposition target block G among the superimposition target images $O_{t-1}$ may be selected into the superimposition target block G takes place considerably.

According to the above aspect, each pixel forming the noise reduction image $O_t$ is not formed based on one superimposition target block G. Specifically, each pixel is formed by multiply superimposing the different superimposition target blocks G. Accordingly, if an erroneous determination takes place relative to the superimposition target block G, an effect on the noise reduction image $O_t$ is limited. The superimposition target block G relative to the erroneous determination is just one of the numbers of multiply superimposed superimposition target blocks G.

According to the aspect of the present invention, following addition of the fusion blocks F, the noise reduction image is generated by dividing the pixel value in each image by the integrating number of the fusion blocks F, so that the pixel value level of the noise reduction image is almost the same as the level of the original image $I_t$.

In addition, if the block superimposing element 14 superimposes the target block T in the original image $I_t$ and corresponding pixels of the superimposition target block G in the superimposition target image $O_{t-1}$ by weighting individually every pixel forming the fusion blocks F, and weighting of superimposition is changed so that the superimposition target block cannot be gradually succeeded by the fusion blocks F in accordance with increase of the absolute value of the difference between the pixel value of the pixels belonging to the target block T and the pixel value of the corresponding pixels of the superimposition target block G, the superimposition of the superimposition target image $O_{t-1}$, at which the motion of the subject image in the original image $I_t$ is heavy, can be minor. In such way, doubling of subject image in the noise reduction image can be further absolutely prevented.

According to the method of changing weighting every pixel, the time needed for imaging processing is too long. If weighting of superimposition is changed so that the superimposition target block G cannot be gradually succeeded by the fusion block F in accordance with increase of the absolute value of the difference between the pixel value in the target block T and the pixel value in the superimposition target block G, changing of weighting is executed per block, so that the imaging processing can be performed much faster.

In addition, the vector editing element 17 can provide the following effects. With regard to both the target block T in the original image and the same location block in the reference image, if the subject image imaged in both blocks does not shift or the subject image per se is not imaged in both blocks, it is state-wise guaranteed that the same location block in the reference image LA more or less resembles the target block T. Accordingly, when the fusion block F is generated, visual recognition may be rather better when the area corresponding to the target block T in the superimposition target image $O_{t-1}$ is superimposed as-is than when the block corresponding to the target block T searched out from the superimposition target image $O_{t-1}$ by the search element 12 is superimposed.

According to the above aspect, under a predetermined condition, if the search result by the search element 12 is discarded and the area corresponding to the target block T in the superimposition target image $O_{t-1}$ is superimposed as-is, the superimposition target block G determined as shifted despite originally not-shifted because of resemblance of the target block T is never superimposed to generate the fusion block F, so that the visual recognition of the noise reduction image can become much better.

The present invention is not limited to the above structure and further following alternative Embodiment can be implemented.

(A) According to the above aspect, a similar search operation is executed relative to the respective target block T forming the original image $I_t$, but the present invention is not limited to such aspect. Specifically, the destination block R is searched out relative to some target block T and then such previous search result can be applied for the following search of the target block T.

Figure 23A:
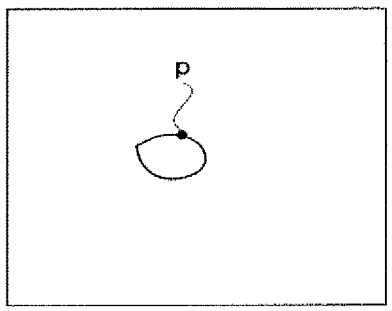
FIG. 23A, 23B, 23C are schematic diagrams illustrating a structure according to the aspect of the alternative Embodiment 1.
Figure 23B:
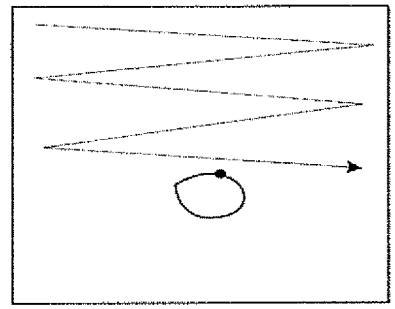
Figure 23C:
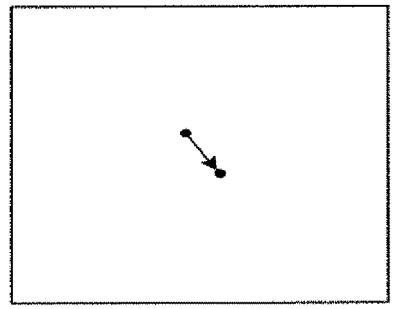

FIG. 23 is illustration an operation according to the aspect of the present alternative Embodiment. The target setting element 11 sets the target block T as a pixel p, one of pixels forming the original image $I_t$, is an attention pixel. The search element 12 performs searching the target block T e.g., the allover reference image $I_{t-1}$ as the search area r. In such way, the destination of the target block T in the reference image $I_{t-1}$ can be absolutely found. The determination method of the pixel r is not particularly limited. For example, the location of the pixel p can be pre-set or an operator can select. In addition, a characteristic point is extracted by a differential processing and such point can be the pixel p. Further, a region of the subject, e.g., a part of bone and so forth, which is a noticeable point in the image, can be the pixel p.

Figure 24A:
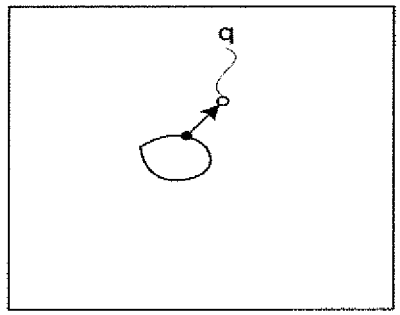
FIG. 24A, 24B are schematic diagrams illustrating a structure according to the aspect of the alternative Embodiment 1.
Figure 24B:
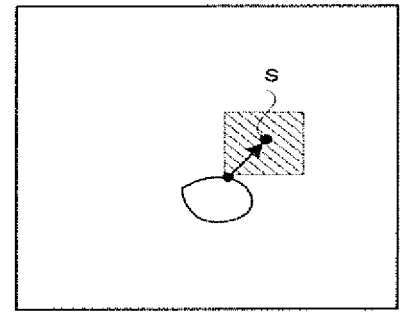

FIG. 24 is illustrating a state in which the target block T is set as the pixel q near by the pixel p is the attention pixel and a destination of such block is being searched out in the reference image $I_{t-1}$. In such case, the search element 12 first determines how the pixel q is away from the pixel p in the original image $I_t$. At this time, the pixel q is kx away therefrom in the width direction and ky away therefrom in the length diction.

The destination of the pixel q should be around the pixel s which is kx away from the destination of the pixel p in the reference image $I_{t-1}$ in the width direction and ky away therefrom in the length direction. When the search element 12 searches out the target block T from the reference image $I_{t-1}$ as the pixel q is the attention pixel, searching will not be executed the allover image and while setting the search area r as the pixel s is the center thereof, searching will be executed in such area.

Specifically, the search element 12 according to the aspect of the alternative Embodiment is operative based on two modes including an accuracy priority mode, by which the search element 12 searches the destination block R relative to some attention pixel in the broad area of the reference image $I_{t-1}$ and the velocity priority mode, by which the search element 12 searches the destination block R relative to the attention pixel different from the attention pixel which was the processing target of the accuracy priority mode in the narrow area in the reference image $I_{t-1}$ based on the search result due to the accuracy priority mode; and the velocity priority mode is operative to predict the destination location of the attention pixel being the current search target in the reference image $I_{t-1}$; based on the locational relationship between the attention pixel, which was the processing target in the accuracy priority mode, and the destination pixel in the reference image $I_{t-1}$ of the attention pixel found by the accuracy priority mode search; and to search the destination block R in the area surrounding the predicted location.

According to the above aspect of the alternative Embodiment, the search element 12 performs searching on the attention pixel limited in the original image $I_t$ based on the accuracy priority mode that is accurate but takes a long time. The center of the destination block R found by such mode must represent exactly the destination of the attention pixel. Accordingly, if it is questioned where pixels in the periphery of the attention pixel are in the original image $I_t$, such pixels must be in the periphery of the pixels of the destination in the reference image $I_{t-1}$ of the attention pixel. Then, when searching for the pixels in such periphery is executed, only the periphery of the destination is searched therefor. Such mode is the velocity priority mode. According to such aspects, the search element 12 can be operative to provide a search operation having both high speed and accuracy.

Figure 25:
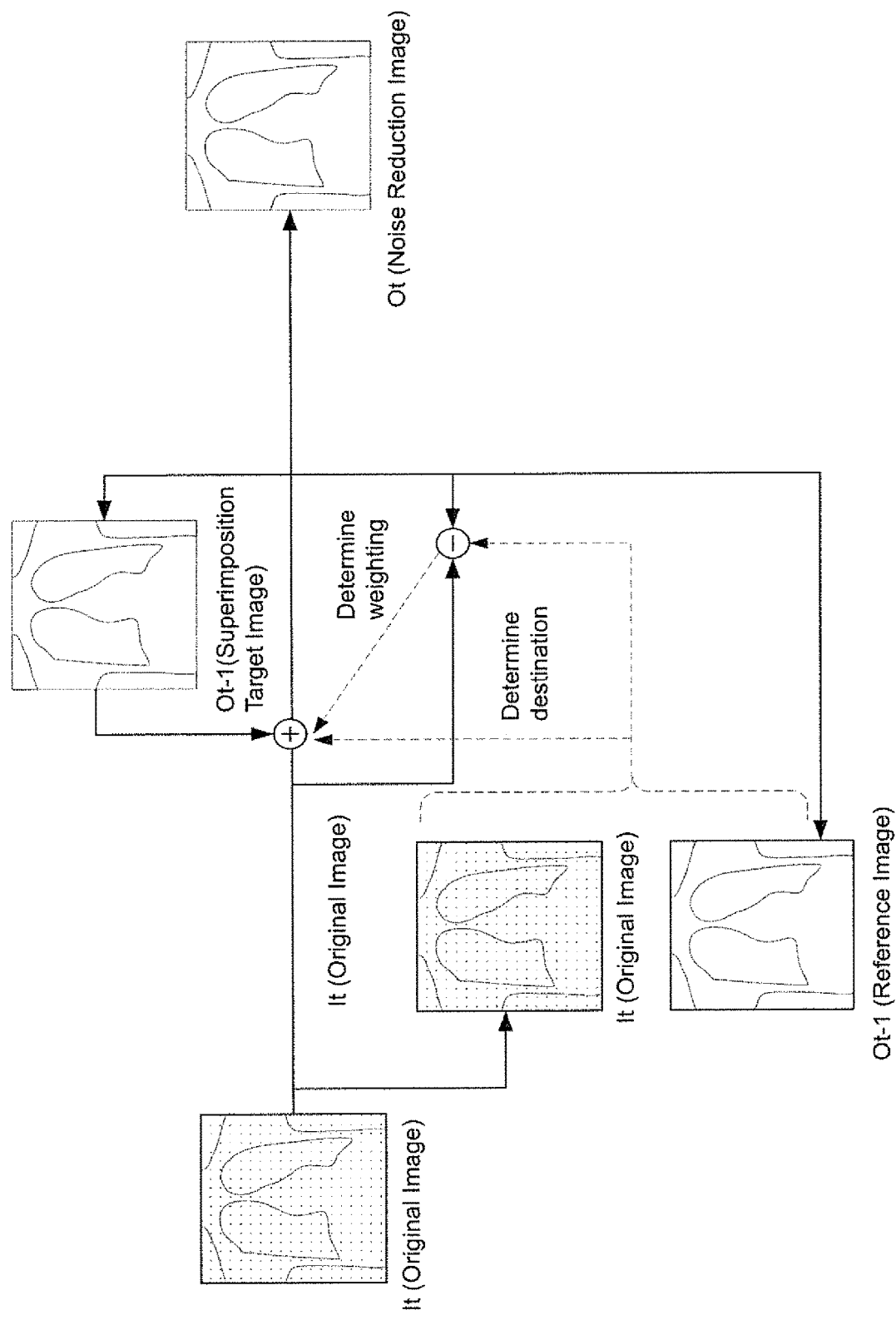
FIG. 25 is a schematic diagram illustrating a structure according to the aspect of the alternative Embodiment 1.

(B) According to the above aspect, the original image $I_t$ and the reference image $I_{t-1}$ are continuously imaged with time, but the present invention is not limited to such aspect. Referring to FIG. 25, an image $O_{t-1}$ instead of the image $I_{t-1}$ can be applied as the reference image. Such image $O_{t-1}$ is a noise reduction image relative to the image $I_{t-1}$.

Figure 26:
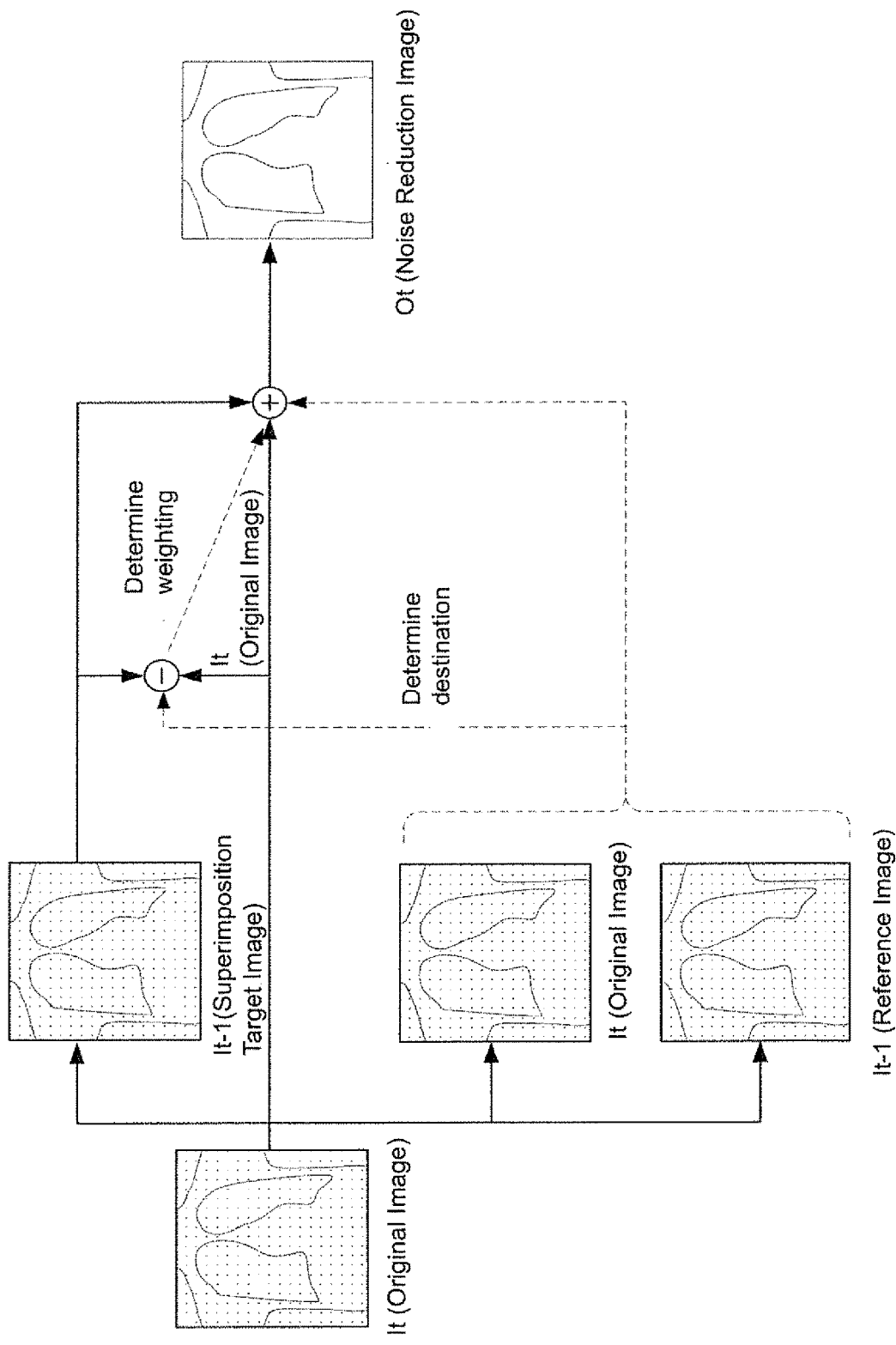
FIG. 26 is a schematic diagram illustrating a structure according to the aspect of the alternative Embodiment 1.

(C) According to the above aspect, the superimposition target image is a noise reduction image $O_{t-1}$ relative to the image $I_{t-1}$, but the present invention is not limited to such aspect. Referring to FIG. 26, an image $O_{t-1}$ instead of the image $I_{t-1}$ can be applied as the reference image. Such image $I_{t-1}$ and the original image $I_t$ are continuously imaged with time and but the image is imaged first.

Figure 27:
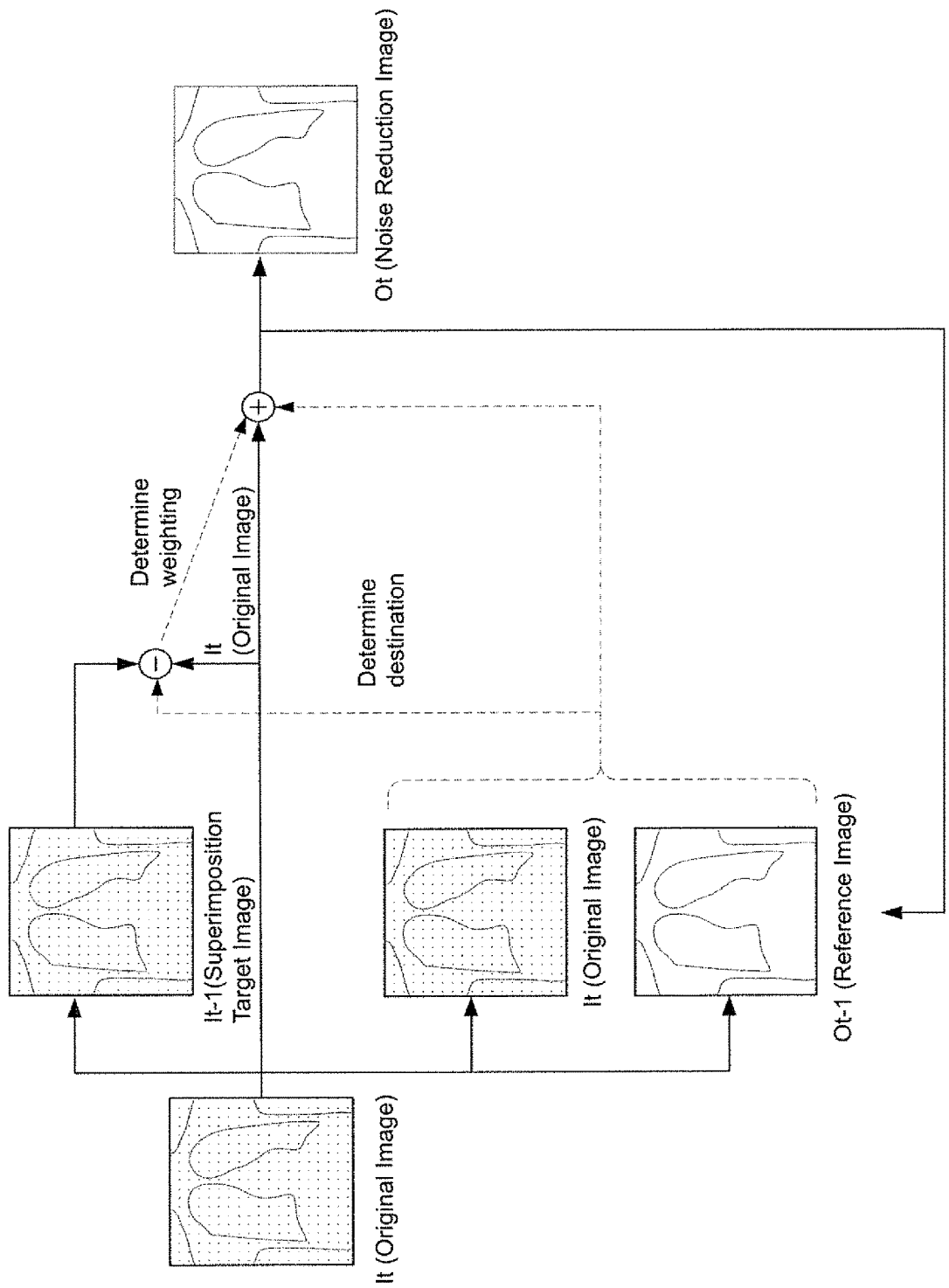
FIG. 27 is a schematic diagram illustrating a structure according to the aspect of the alternative Embodiment 1.

(D) According to the above aspect, the original image $I_t$ and the reference image $I_{t-1}$ are continuously imaged with time, and the superimposition target image is a noise reduction image $O_{t-1}$ relative to the image $I_{t-1}$, but the present invention is not limited to such aspect. Referring to FIG. 27, the image $O_{t-1}$ instead of the image $I_{t-1}$ can be applied as the reference image and the image $I_{t-1}$ instead of the image $O_{t-1}$ can be applied as the superimposition target image. Such image $O_{t-1}$ is an noise reduction image relative to the image $I_{t-1}$ and the image $I_{t-1}$ and the original image It are continuously imaged with time. The image $I_{t-1}$ is imaged earlier than the original image $I_t$.

Specifically, according to the image processing device 10 of the present invention, a superimposition target image a1 can be a noise reduction image acquired when an image imaged prior to an original image $I_t$ is image-processed and a reference image b1 can be the image imaged prior to the original image $I_t$. In addition, according to the image processing device 10 of the present invention, the superimposition target image a1 can be a noise reduction image acquired when an image imaged prior to the original image $I_t$ is image-processed and the reference image b2 can be the noise reduction image corresponding to the image imaged prior to the original image $I_t$.

Also, according to the image processing device 10 of the present invention, the superimposition target image a2 can be an image imaged prior to an original image $I_t$, and the reference image b1 can be the image imaged prior to the original image $I_t$. In addition, the superimposition target image a2 can be an image imaged prior to an original image $I_t$ and an reference image b2 can be a noise reduction image corresponding to the image imaged prior to the original image $I_t$.

Figure 28:
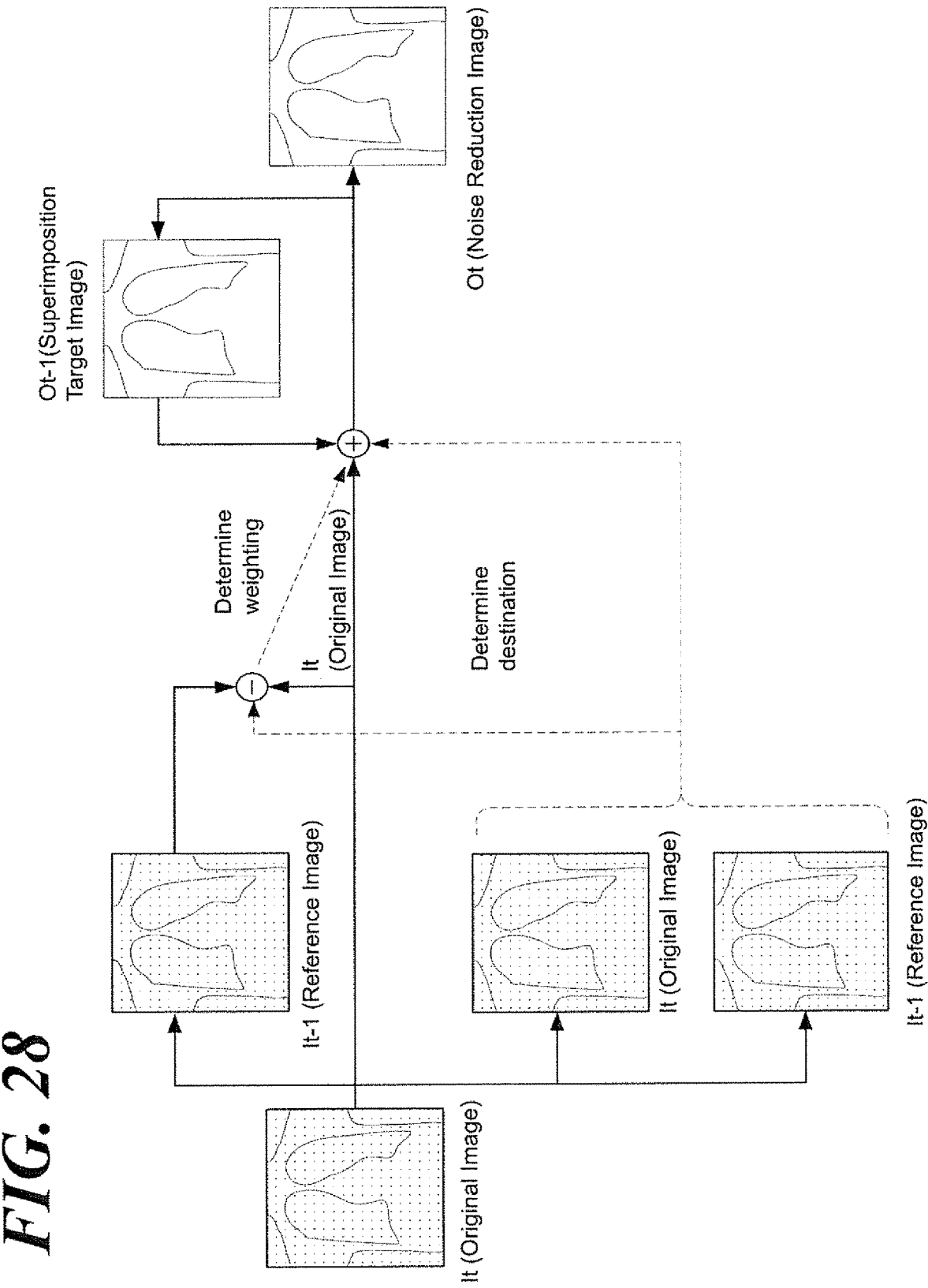
FIG. 28 is a schematic diagram illustrating a structure according to the aspect of the alternative Embodiment 1.
Figure 29:
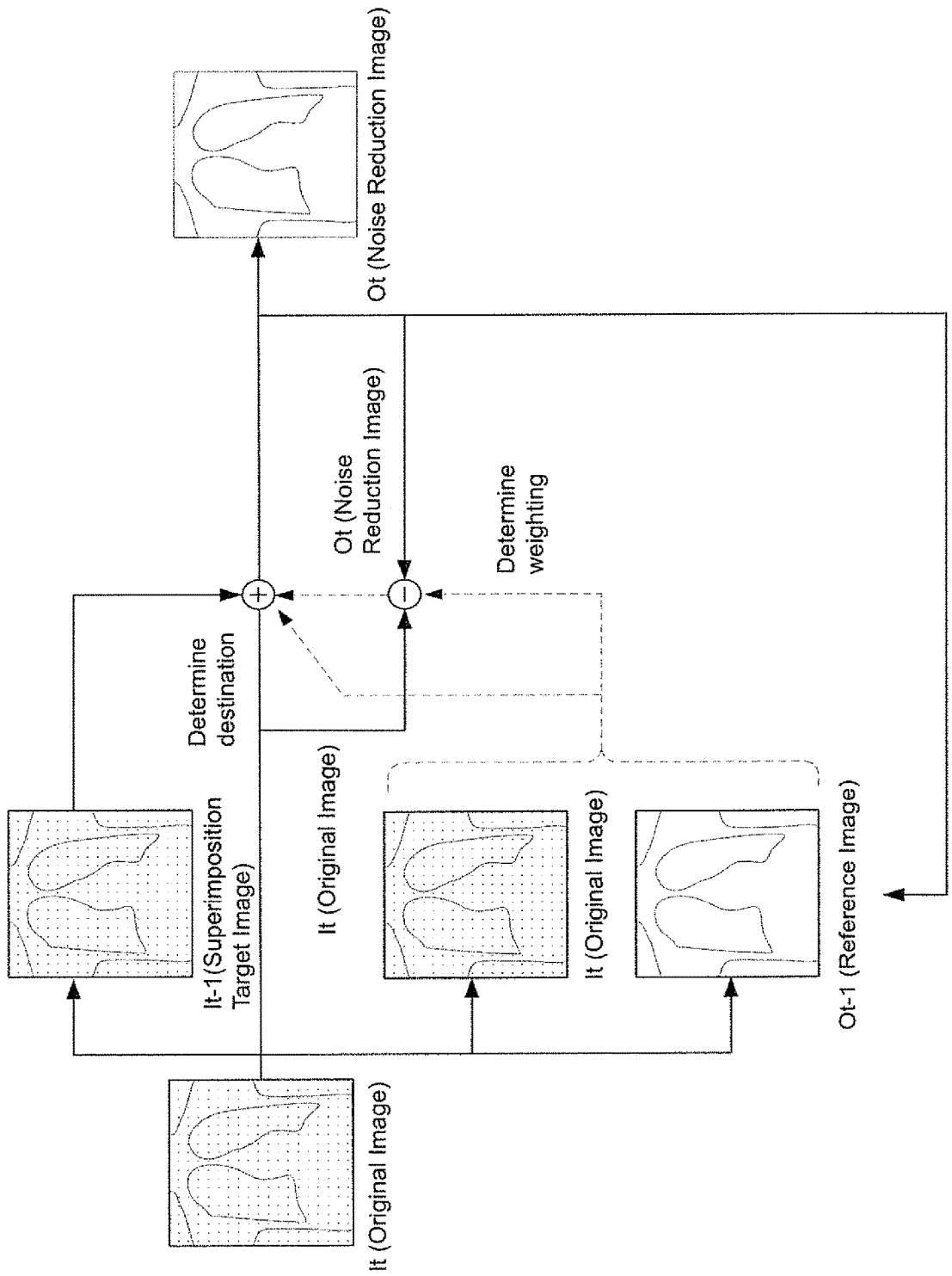
FIG. 29 is a schematic diagram illustrating a structure according to the aspect of the alternative Embodiment 1.

(E) According to the above aspect, weighting setting uses the pixel value in the target block T and the superimposition target block G, but the present invention is not limited to such aspect. Referring to FIG. 28, weighting setting can use the pixel values in the target block T and the destination block R in the reference image. Referring to FIG. 29, it is the same relative to the above alternative Embodiment (D).

As set forth above, the image processing device according to the aspect of the present invention can be brought into reality for a selected variety of aspects. Such high selectivity may contribute to increase flexibility of an image processing. The image processing device 10 continuously executes a noise reduction processing on the frame forming the live image. Any method of the four methods set forth in FIG. 2, FIG. 25, FIG. 26, FIG. 27, FIG. 28 and FIG. 29 can be applied every noise reduction processing.

Further, Alternative Embodiment

Figure 30:
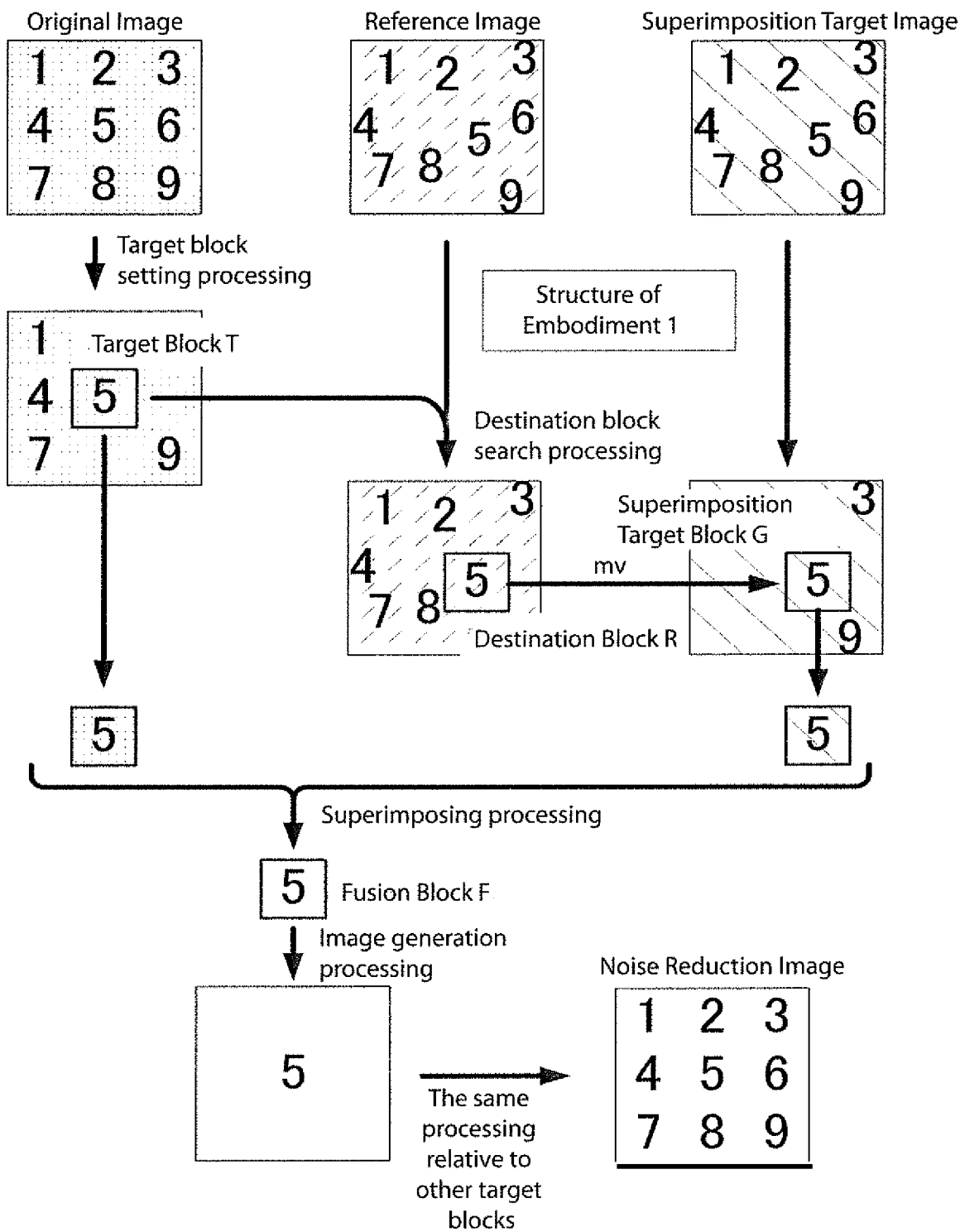
FIG. 30 is a schematic diagram illustrating a structure according to the aspect of the alternative Embodiment 1.

FIG. 30 is schematically illustrating an image processing according to the aspect of the Embodiment 1. The number 1 through 9 are imaged in the original image indicate figures imaged in the image. Even though the numbers 1 through 9 are imaged in the reference image, the imaged locations thereof are not the same as the original image. The number 1 through 9 are in the superimposition target image, the imaged locations thereof are the same as the original image. The imaging processing according to the aspect of the Embodiment 1 first sets a part of the original image as the target block T by the target setting element 11. Referring to FIG. 30, it deems that the target block T is set in the area surrounding the number 5. The search element 12 searches the same pattern in the reference image as the number 5 imaged in the target block T. An area found by searching is the destination block R. The block superimposing element 14 determines the superimposition target block G in the area of the superimposition target image corresponding to the destination block R and generates a fusion block F by superimposing the superimposition target block G to the target block T in the original image. Plural fusion blocks F are generated by executing such operation at the other location in the original image. The image generation element 15 generates a noise reduction image by multiply superimposing such fusion blocks F.

The above is the brief overview of the image processing device according to the aspect of the Embodiment 1. The inventor sets forth a variety of alternative Embodiments in which a part of the structure is alternated.

Figure 31:
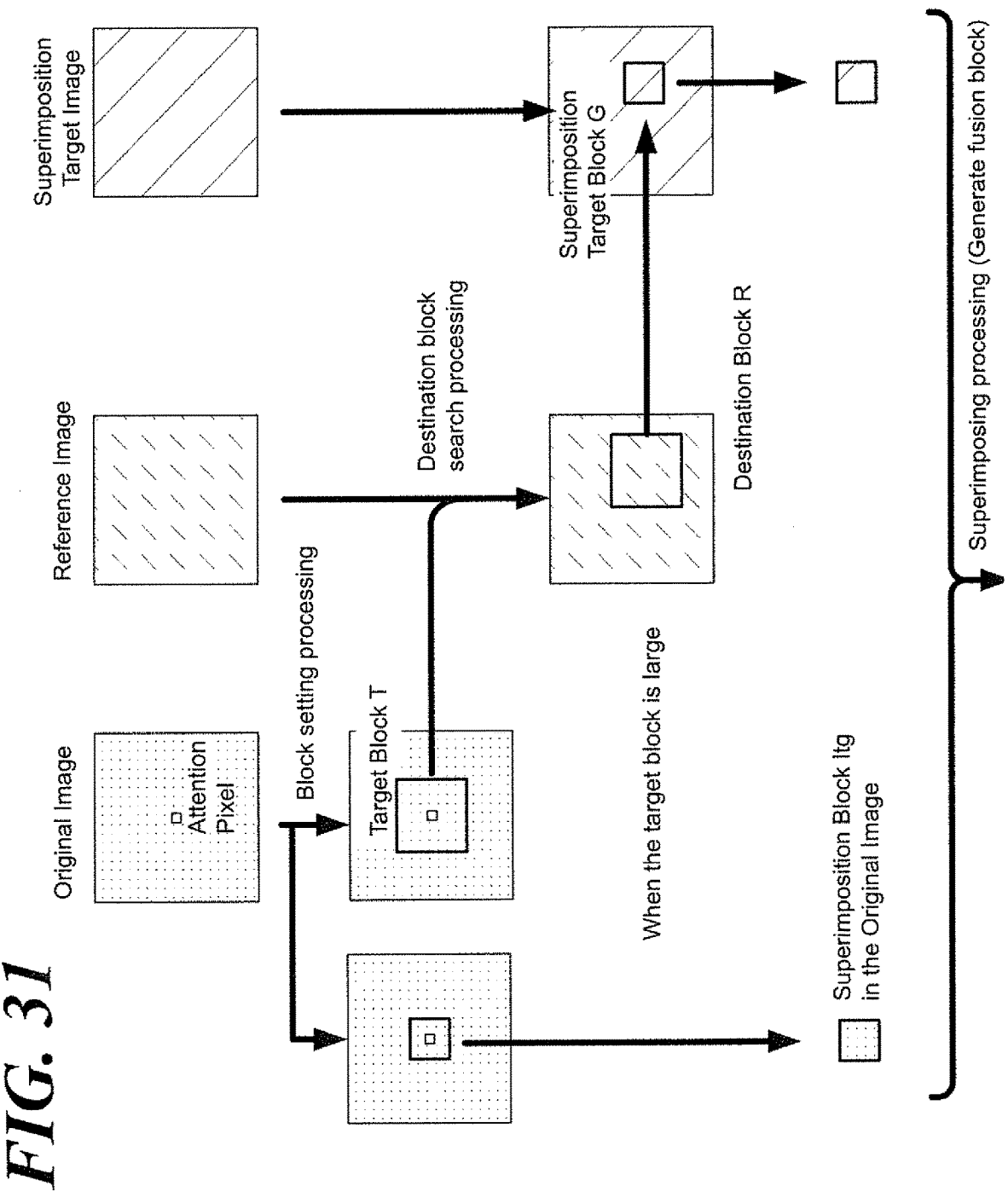
FIG. 31 is a schematic diagram illustrating a structure according to the aspect of the alternative Embodiment 1.

(1) Referring to FIG. 30, the destination block R and the superimposition target block G have the same size, but the present invention is not limited to such aspect. The destination block R can be larger than the superimposition target block G. FIG. 31 is illustrating such alternative Embodiment. The target setting element 11 sets the large target block T (the size thereof is the same as the destination block R) in the original image.

The search element 12 searches out the area having the pattern imaged in the target block T in the reference image and then sets the destination block R. The block superimposing element 14 determines the superimposition target block G in the area of the superimposition target image corresponding to the destination block R. However, the superimposition target block G has the smaller area than the area of the destination block R. Even though the destination block R and the superimposition target block G have the different size, the center of the block is in the same location in between the respective images and each block is a pixel block having the same form. The block superimposing element 14 sets the small original image superimposition block Itg in the original image (the size thereof is the same as the superimposition target block G). The original image superimposition block Itg is smaller than the target block T, but has the attention pixel in the original image as the center thereof and is the pixel block having the same form.

In fact, the original image superimposition block Itg and the superimposition target block G are pixel blocks having the same size and the same form. The block superimposing element 14 generates the fusion blocks F by superimposing the original image superimposition block Itg and the superimposition target block G. According to the aspect of the alternative Embodiment, the area of the superimposition target block G relative to the block superimposing element 14 is narrower than the areas of the target block T and the destination block R.

According to such operation, the superimposition target block can be determined by evaluating the outer area than the superimposition target block, so that generation of a fusion block F can be executed with higher reliability.

Figure 32:
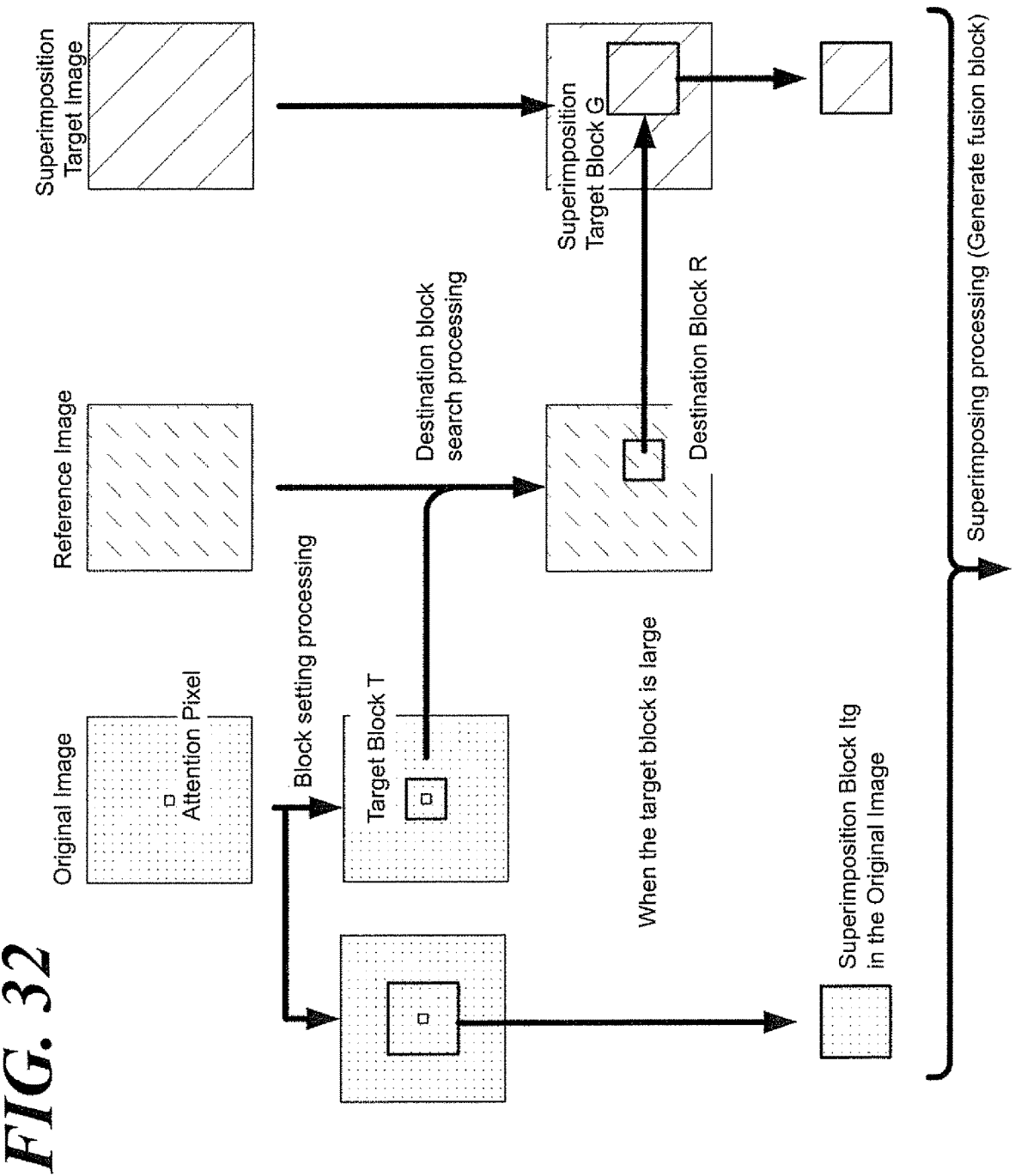
FIG. 32 is a schematic diagram illustrating a structure according to the aspect of the alternative Embodiment 1.

(2) Referring to FIG. 30, the destination block R and the superimposition target block G have the same size, but the present invention is not limited to such aspect. The superimposition target block G can be set as larger than the destination block R. FIG. 32 is illustrating such alternative Embodiment. The target setting element 11 sets the small target block T (the size thereof is the same as the destination block R) in the original image.

The search element 12 searches out the area having the pattern imaged in the target block T in the reference image and then sets the destination block R. The block superimposing element 14 determines the superimposition target block G in the area of the superimposition target image corresponding to the destination block R. However, the superimposition target block G has the larger area than the area of the destination block R. Even though the destination block R and the superimposition target block G have the different size, the center of the block is in the same location in between the respective images and each block is a pixel block having the same form. The block superimposing element 14 sets the large original image superimposition block Itg in the original image (the size thereof is the same as the superimposition target block G). The original image superimposition block Itg is larger than the target block T, but has the attention pixel in the original image as the center thereof and is the pixel block having the same form.

In fact, the original image superimposition block Itg and the superimposition target block G are pixel blocks having the same size and the same form. The block superimposing element 14 generates the fusion blocks F by superimposing the original image superimposition block Itg and the superimposition target block G. In such way, according to the aspect of the alternative Embodiment, the area of the superimposition target block G relative to the block superimposing element 14 is broader than the area of the target block T and the destination block R.

Figure 33A:
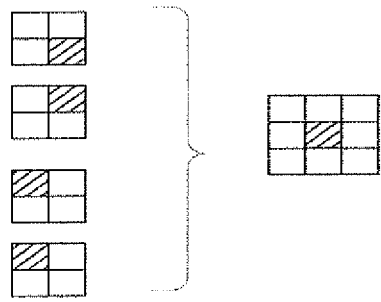
FIG. 33A, 33B are schematic diagrams illustrating a structure according to the aspect of the alternative Embodiment 1.
Figure 33B:
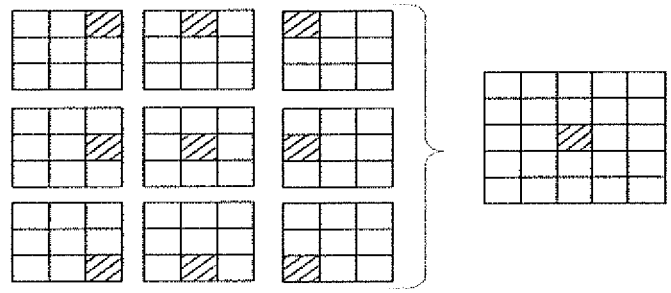

According to such operation, a noise reduction image in which more noises are removed can be generated. Because if the fusion block F is large, the number of multiply superimposed pixels increases when the noise reduction image is generated. FIG. 33 is illustrating such fact. The FIG. 33A is illustrating the case in which the fusion blocks F is small. Each fusion block F is just length 2×width 2, so that the pixel in the noise reduction image has just multiply superimposed 4 fusion blocks F. The right side of FIG. 33 is illustrating the case in which the fusion block F is large. Each fusion block F is length 3×width 3, so that the pixel in the noise reduction image has multiply superimposed 9 fusion blocks F.

When the noise is erased from the original image, the larger number of fusion blocks F, which are multiply superimposed to the pixel in the noise reduction image, is preferable. Because the larger number of the fusion blocks F is, the more averaged the noises in the pixel can be erased. Accordingly, if the fusion block F is large, the noise reduction effect can be high.

According to the aspect of the Embodiment 1, when the fusion block F is applied to be large, the target block T is adjusted to fit the size of the fusion block F. Then, the fusion block F becomes surely large, but the calculation cost of the search element 12 becomes high as long as the size of the target block increases. According to the aspect of the present alternative Embodiment, the fusion block F can be larger to increase the noise reduction effect without increasing the calculation cost due to the search element 12.

(3) Referring to FIG. 5 according to the aspect of the Embodiment 1, the search area r which is the search area for the destination block R is being set based on the location of the target block T, but the present invention is not limited to such aspect. The search area r can be determined based on the reduced image. FIG. 34 is a functional block view illustrating determination of the search area r according to the aspect of the alternative Embodiment. An image reducing element 9 reduces the original image and the reference image.

Figure 35A:
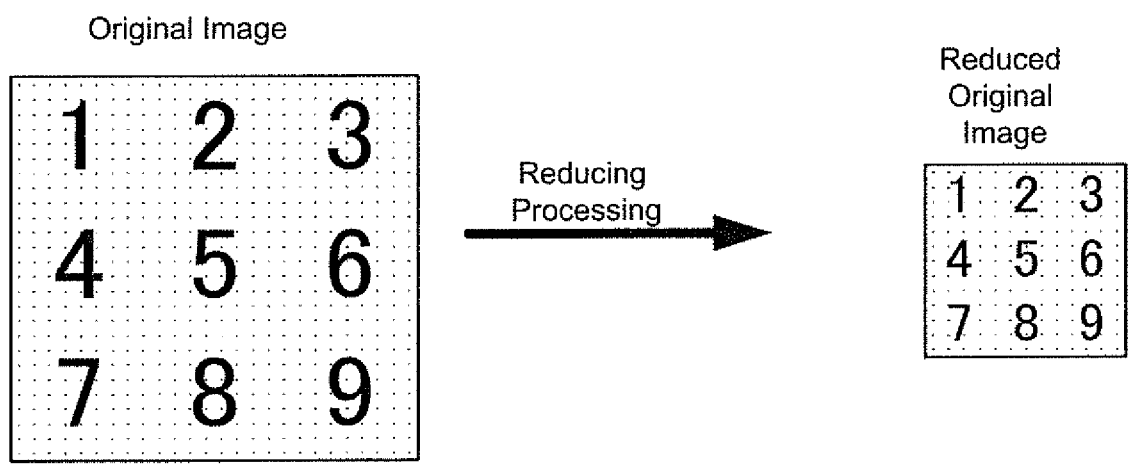
FIG. 35A, 35B are schematic diagrams illustrating a structure according to the aspect of the alternative Embodiment 1.
Figure 35B:
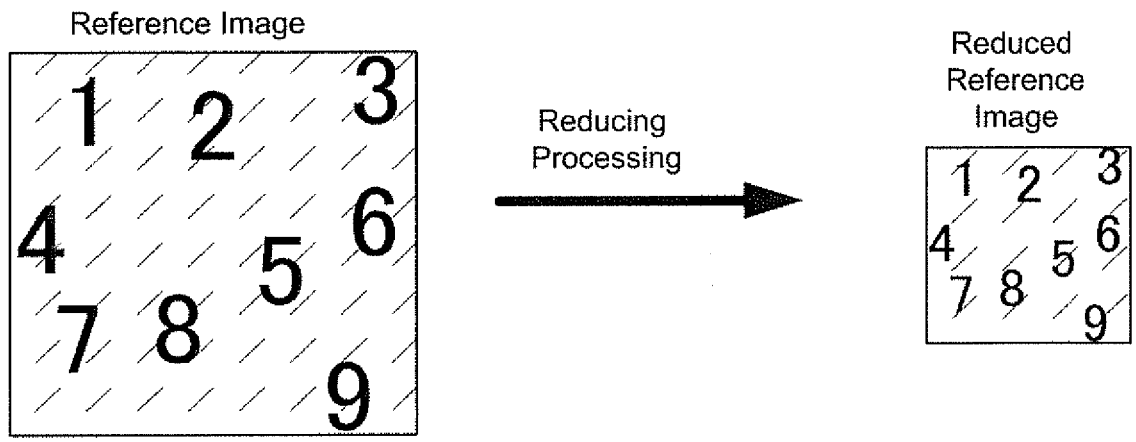

Next, referring to FIG. 34, the inventor sets forth an operation of each element. FIG. 35 is illustrating the aspect in which the image reducing element 9 reduces the original image and the reference image. Now, a reduced original image is specified as an image reduced from the original image and the reduced reference image is specified as an image reduced from the reference image. The original image and the reference image are reduced with the same reduction ratio to provide the reduced images having the same size.

Figure 36:
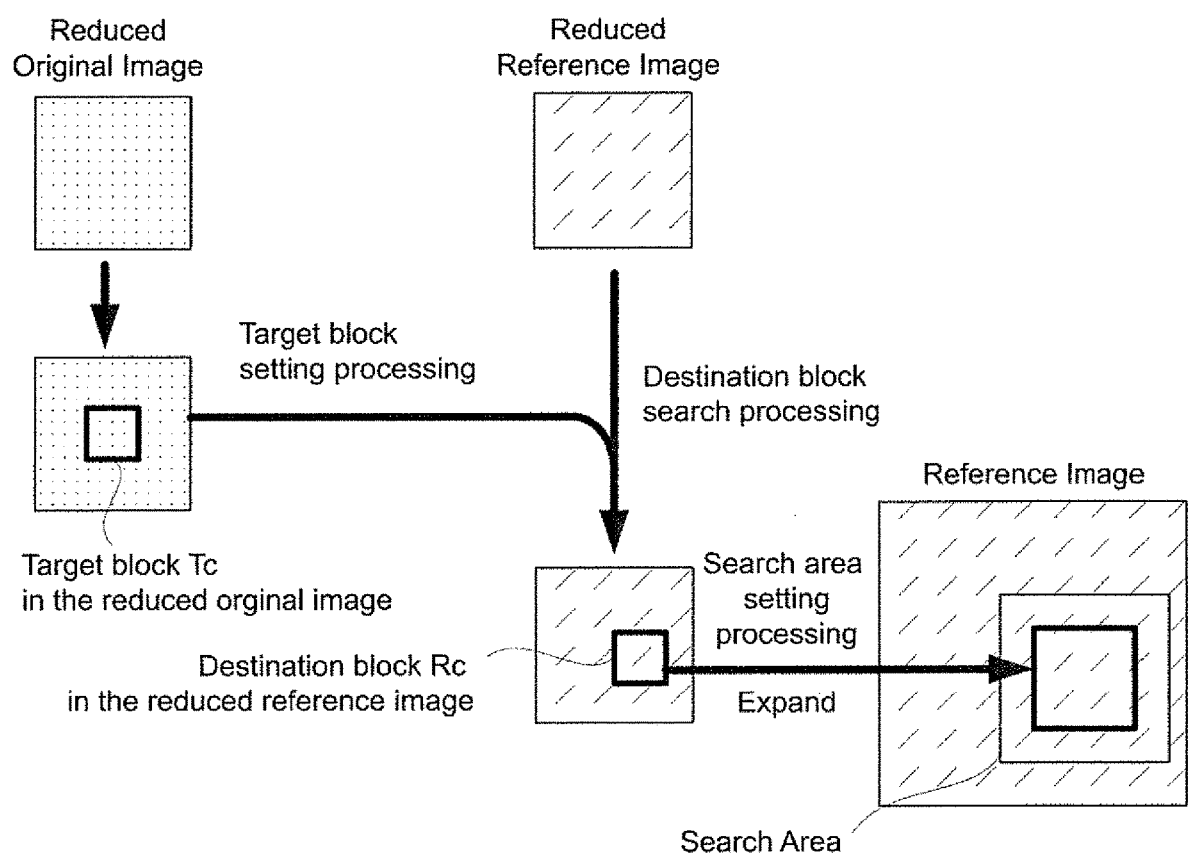
FIG. 36 is a schematic diagram illustrating a structure according to the aspect of the alternative Embodiment 1.

FIG. 36 is illustrating an operation to set the search area r in the reference image by using the reduced original image and the reduced reference image. Specifically, according to the aspect of the present alternative Embodiment, an attention pixel is set in the reduced original image and the target block Tc is set in the reduced original image corresponding to the attention pixel. At this time, a reduced image target setting element 11a executes the setting of the target block Tc in the reduced original image target block. An operation of the reduced image target setting element 11a is the same as the target setting element 11 according to the aspect of the Embodiment 1. The reduced original image target block Tc is, for example, the area having length 5 pixels×width 5 pixels in square, which is the same as the target block T taken care by the target setting element 11 according to the aspect of the Embodiment 1. Specifically, the reduced image target block setting element 11a is operable in the same way referring to FIG. 5A according to the aspect of the Embodiment 1. However, in such case, the setting of the target block Tc in the reduced original image is executed relative to the reduced original image, so that the size of the target block T relative to the image is relatively larger than the case referring to FIG. 5. The data related to the target block Tc in the reduced original image is sent to the reduced image search element 12a.

The reduced image search element 12a sets the area including the pixels in the reduced reference image corresponding to the attention pixel set in the reduced original image as the reduced image search area and searches out the destination block Rc in the reduced reference image having the pattern resembling the target block Tc i the reduced original image within such search area. The aspect searching the destination block Rc in the reduced reference image is the same as in FIG. 5 and FIG. 6 according to the aspect of the Embodiment 1. Specifically, the reduced image search element 12a is operable in the same way referring to FIG. 5 and FIG. 6 according to the aspect of the Embodiment 1. Further, in the operation of the reduced image search element 12a, the area in which the destination block Rc in the reduced reference image is searched may not be set always. In such case, searching of the destination block Rc in the reduced original image is performed on the reduced reference image having a small image size, so that the calculation cost for searching is not very big.

The data regarding the destination block Rc in the reduced reference image is sent to the search area setting element 9. The search area setting element 9 sets the search area r in the reference image before reducing based on the destination block Rc in the reduced reference image found in the reduced reference image. Accordingly, the search element 12 performs new search again on the target block T also in the area searched once by the reduced image search element 12a. In such case, the search element 12 is operable using the target block T having higher resolution the target block Tc in the reduced original image, so that more strict search on the block can be performed.

The inventor sets forth an operation of the search area setting element 9. The area corresponding to the destination block Rc in the reduced reference image should be in the reference image before reduced. At this time, such area should be an area as if the expanded destination blocks R in the reduced reference image. The search area setting element 9 sets up the search area r on the basis of the location in the reference image corresponding to the location of the destination block Rc in the reduced reference image. At this time, the search area r is set as being broader than the area (corresponding area) in the reference image corresponding to the destination block Rc in the reduced reference image. Because when the search element 12 searches the destination of the target block T in the reference image, such setting must be prepared for the case in which the destination may exist outside of the corresponding area.

The reduced image target setting element 11a, the reduced image search element 12a and the search area setting element 9 execute such operation to set the search area r in the reference image before reduced relative to allover the reduced original image while setting each pixel in the reduced original image as the attention pixel in order. The data related to relationship between each pixel of the reduced original image and the search area r is sent to the search element 12.

Each element 8, 9, 11a and 12a can be brought into reality by CPU executing a variety of programs. Each element 8, 9, 11a and 12a can be brought into reality by an individual processing device carrying out each.

Figure 37:
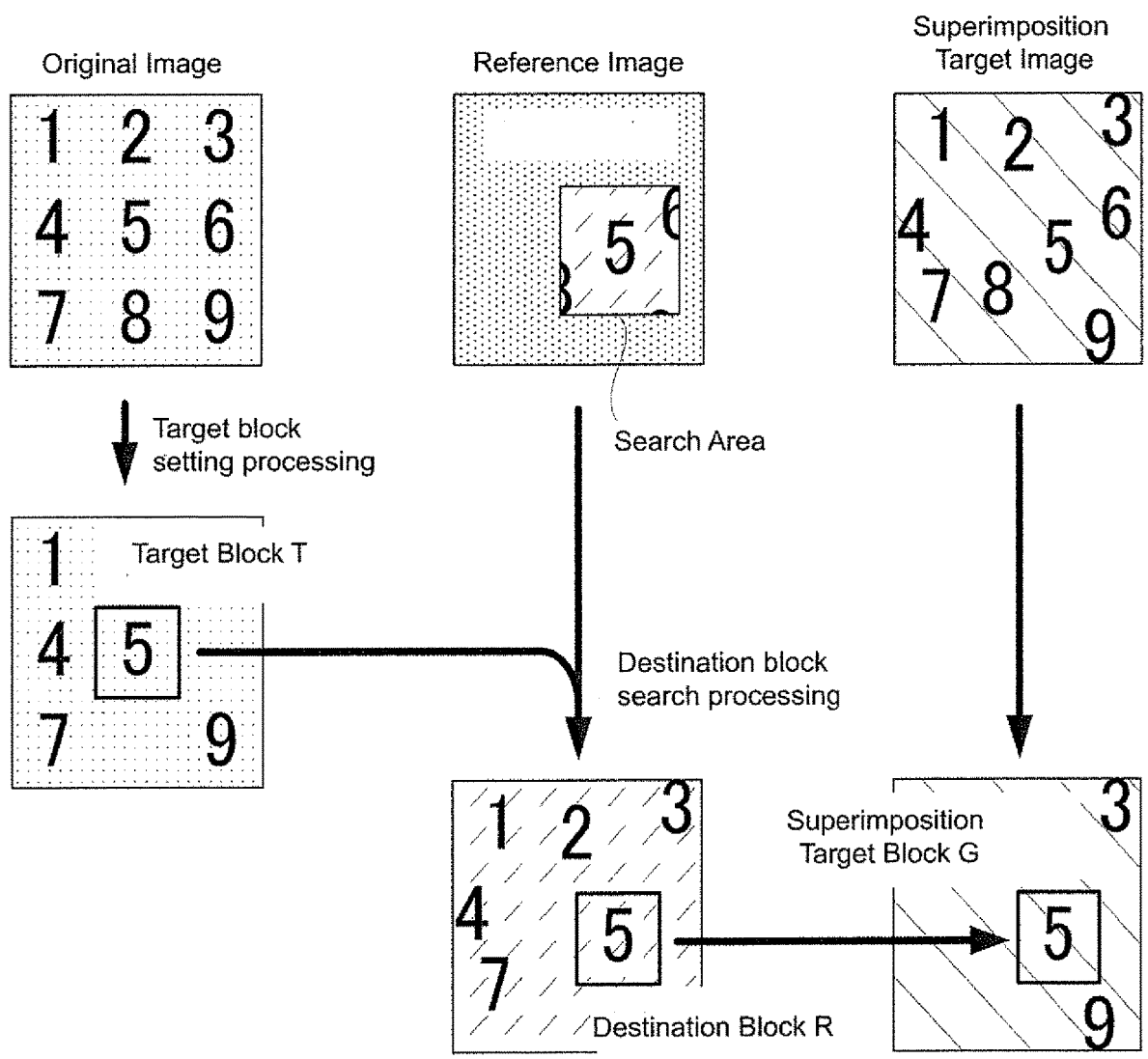
FIG. 37 is a schematic diagram illustrating a structure according to the aspect of the alternative Embodiment 1.

FIG. 37 is illustrating operations of the target setting element 11 and the search element 12 according to the aspect of the present alternative Embodiment. First, as set forth referring to FIG. 5, the target setting element 11 sets the target block T corresponding to the attention pixel in the original image. The target block T is represented as a square area including 5 pixels vertically and 5 pixels horizontally. The search element 12 receives the data related to the target block T from the target setting element 11 and calculates where the attention pixel corresponding to such target block T is located in the reduced original image. The search area r is set for each pixel of the reduced image, so that if the search element 12 could find the pixel in the reduced image to which the attention pixel corresponding to the target block T set by the target setting element 11 is corresponding, the search area r corresponding to the target block T set by the target setting element 11 can be identified. FIG. 37 is illustrating the aspect in which the search element 12 sets the search area r corresponding to the target block T in the reference image. The portion other than the search area r in the reference image is a search exclusion area and the search element 12 executes the search operation of the destination block R ignoring such area. Such aspect is the same as set forth referring to FIG. 6. The search element 12 searches out the destination block R from the search area r. The pixel block of the superimposition target image located at the same location as the destination block R in the reference image is the superimposition target block G.

Specifically, according to the aspect of the present alternative Embodiment, an image reducing element 9 that reduces the original image and the reference image to generate an reduced original image and an reduced reference image; a reduced image target setting element 11a that sets an attention pixel from pixels forming the reduced original image and an reduced original image target block Tc which is a target block in the reduced original image; a reduced image search element 12a that searches out the destination block R in the reduced reference image most resembling the target block Tc in the reduced original image from the reduced reference image; and a search area setting element 9 that sets an area in the reference image corresponding to the destination block Rc in the reduced reference image as the search area r which is the area in which the search element 12 searches the destination block R in the reference image. The image reducing elements corresponding to the image reducing means of the present invention and the reduced image target block setting means of the present invention. The reduced image search element corresponds to the reduced image search means of the present invention and the search area setting element corresponds to the search area setting means of the present invention.

According to such aspects of the present alternative Embodiment, the destination block R can be more accurately searched out from the reference image. Referring to FIG. 5 according to the aspect of the Embodiment 1, the search area r is determined by expanding the area in the reference block corresponding to the target block T in the original image. Such operation is supported by prediction in which the pattern in the target block T in the original image must be near the location of the reference image corresponding to the target block T. Such prediction may not be always right. On the other hand, according to the aspect of the present alternative Embodiment, a pattern shift in the original image can be roughly understood by actually using the reduced image. The use cost for using the reduced image is not so high. According to the aspect of the present alternative Embodiment, then after, it is figured out that the pattern in the target block T in the original image is shifted to where in the reference image. Accordingly, it is figured out the destination block R accurately as if the destination block R is being searched in the broad area of the reference image.

In addition, as set forth referring to FIG. 36, the search area r is directly determined by one set of the reduced images (reduced original image and reduced reference image), but the present alternative Embodiment is not limited to such aspect. The search area r can be determined stepwise by using one set of reduced original images having a different scale. According to such structure, the search area r in the reduced reference image is determined by repeating operations illustrated in FIG. 37 and FIG. 37 in turn from the smallest reduced image. The search area in the reduced original image target block Tc relative to the second smallest reduced image set is determined based on the smallest reduced image set. Such operation is repeated while changing the reducing scale and the search area r is determined at last relative to the image set of the images (the original image and the reference image) before being reduced. The size of the target block Tc in the reduced original image can be the same as the target block T. In such way, the destination block R can be accurately figured out as if the destination block R is being searched in the broader area of the reference image.

Figure 38:
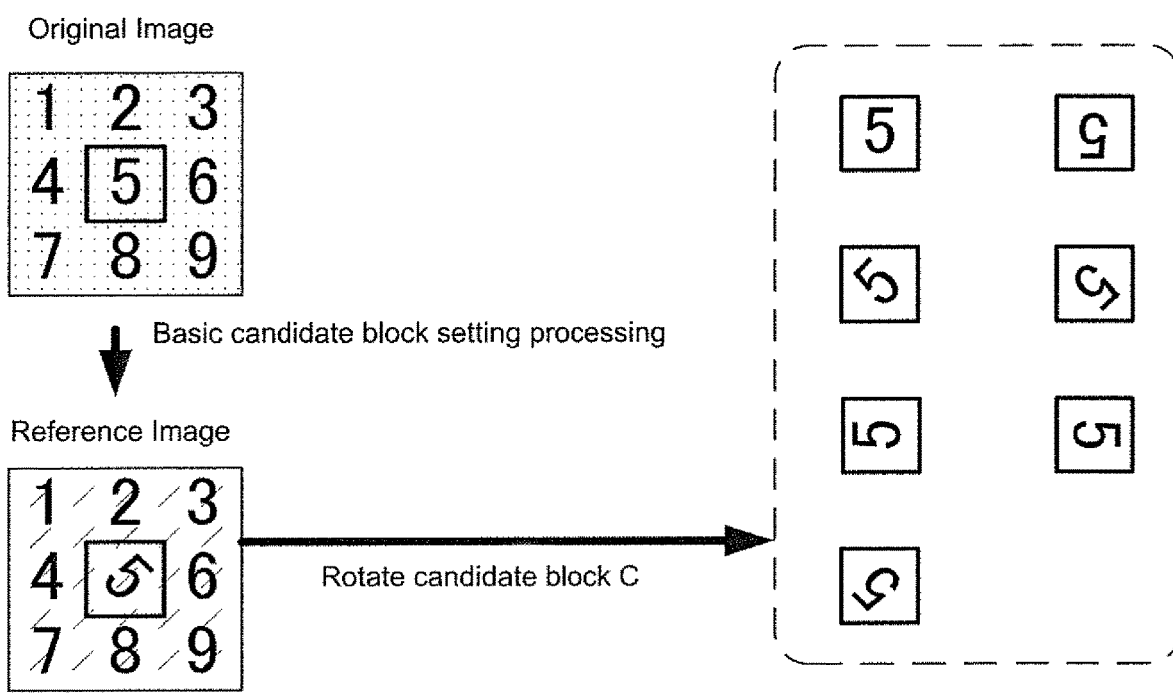
FIG. 38 is a schematic diagram illustrating a structure according to the aspect of the alternative Embodiment 1.

(4) According to the aspect of the Embodiment 1, given the pattern of the target block T in the original image is not rotated in the reference image and shifts, the likelihood of rotation of the pattern of the target block T in the reference image can be considered in the aspect. In such aspect, plural target blocks T should be applied relative to one attention pixel. FIG. 38 is illustrating an operation of the target setting element 11 according to the aspect of the present alternative Embodiment. Referring to FIG. 38, first, the search element 12 sets the candidate block C as the candidate of the destination block R as set forth referring to FIG. 35. The candidate block C set at this time is referred as a basic candidate block, and the operation at this time is referred as a basic candidate block setting processing.

The search element 12 generates a new candidate block by rotating the pattern imaged in the basic candidate block around the attention pixel as a center thereof with the predetermined rotation angle. A block generated at this time is referred as a rotation candidate block Cr. Referring to FIG. 38, for example, 7 kinds of rotation candidate block Cr are generated by repeating operations to rotate some basic candidate block 45° clockwise. For example, the rotation angle of the basic candidate block can be set as 15° to generate 23 kinds of rotation candidate block Cr or further smaller one time rotation angle can be set to generate much more rotation candidate block Cr.

Figure 39:
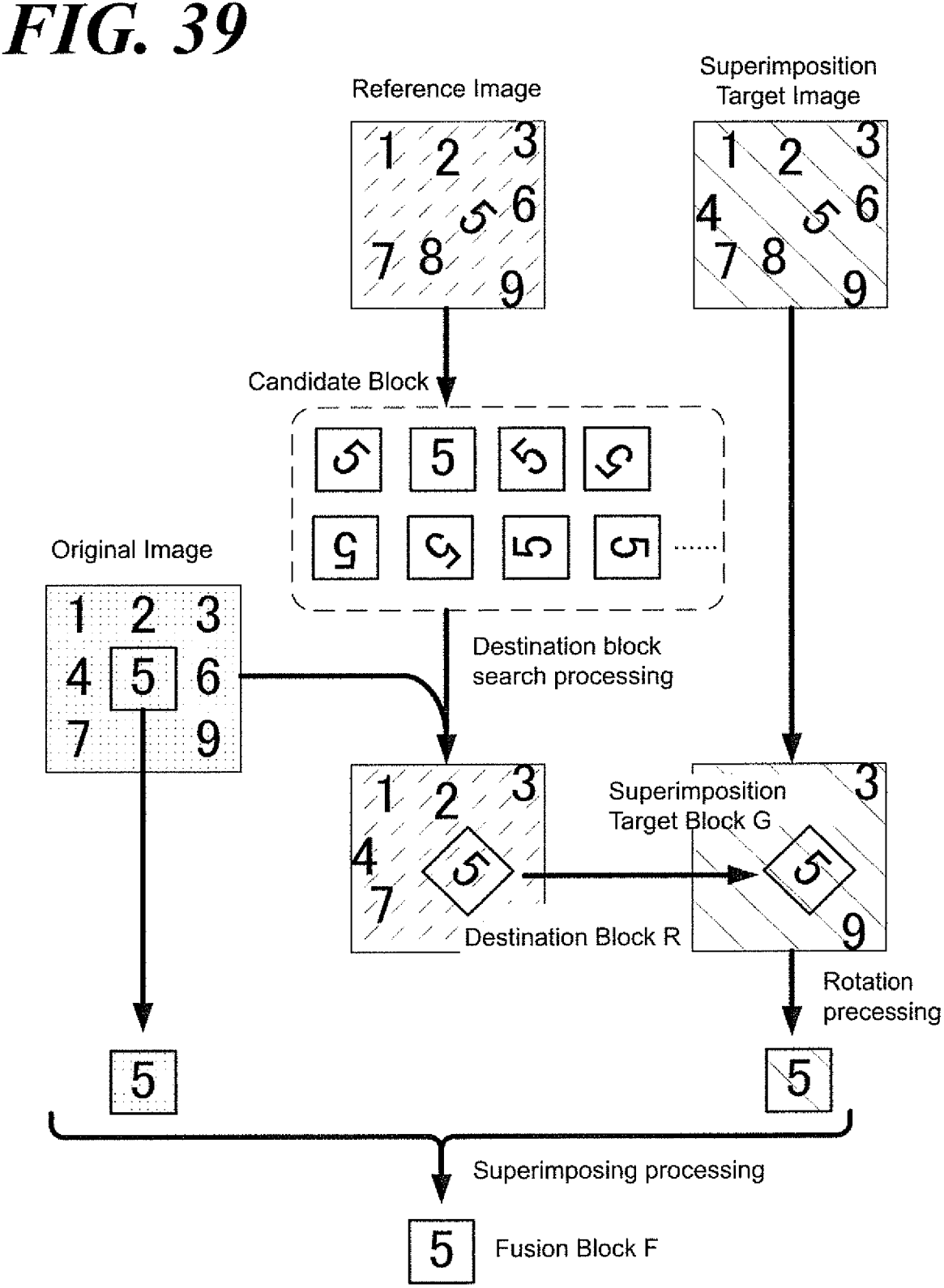
FIG. 39 is a schematic diagram illustrating a structure according to the aspect of the alternative Embodiment 1.
Figure 41:
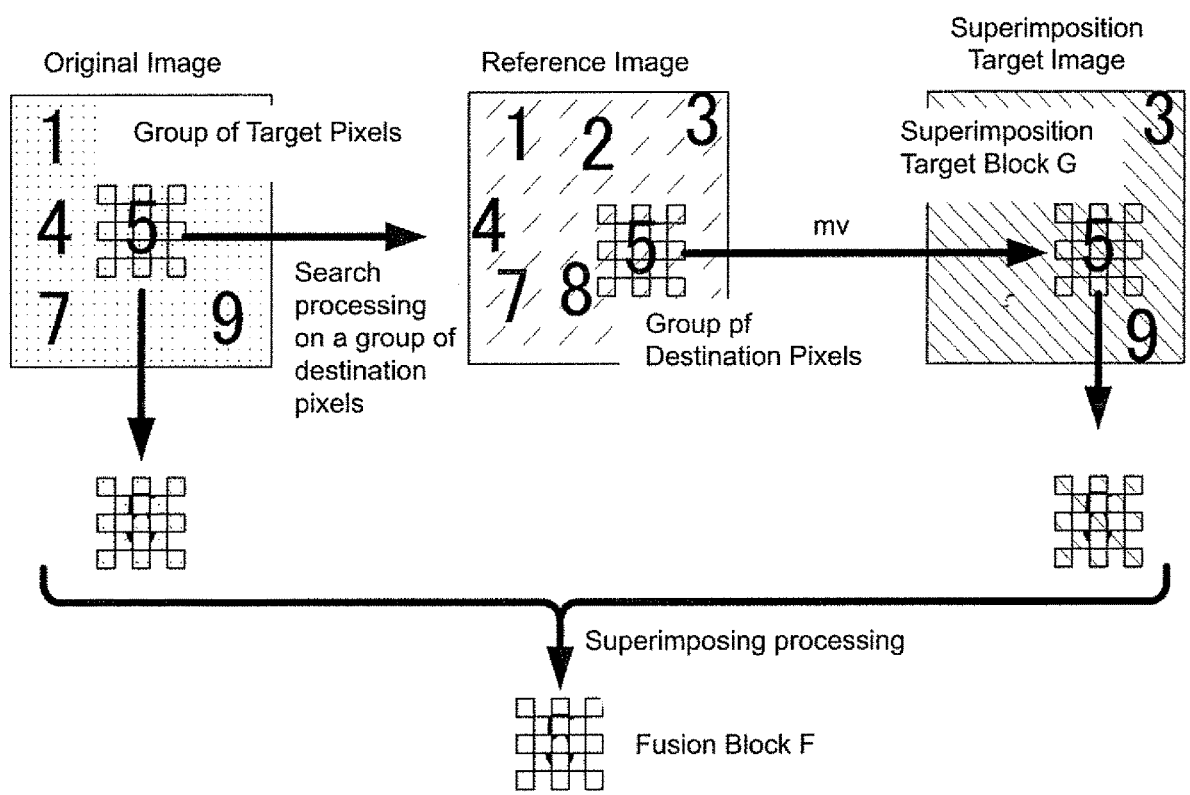
FIG. 41 is a schematic diagram illustrating a structure according to the aspect of the alternative Embodiment 1.

FIG. 39 is illustrating the aspect in which the search element 12 is executing search processing based on 8 kinds of candidate block (one basic block and 7 rotated blocks). Such operation is the same as the operation set forth referring to FIG. 6. A different point from FIG. 6 is that the variation S(C) of 8 candidate blocks C relative to one target block T is calculated. Specifically, according to the aspect of the present alternative Embodiment, the calculation operation for the variation S(C) increases 8 times corresponding to that the candidate block C increased 8 times. The search element 12 obtains the variation S(C) relative to each combination of the candidate block C and the target block T and searches the combination having the least variation S(C) to set such combination as the destination block R. The rotated pattern in the target block T is imaged in the destination block R. The pixel block of the superimposition target image located at the same location as the destination block R in the reference image is the superimposition target block G. The rotated pattern in the target block T is imaged also in the superimposition target block G.

If the superimposition target block G and the target block T are superimposed as-is, the rotated patterns are imaged doubled each other. The block superimposing element 14 performs a rotation processing on the superimposition target block G considering such point and then the superimposition target block G after processed is superimposed to the target block T. At this time, the block superimposing element 14 recognizes the rotation angle based on the destination block R which the search element 12 determines from 8 kinds of candidate block. For example, referring to FIG. 39, the rotation candidate block Cr which is provided by rotating the basic candidate block 45° counterclockwise is determined as the destination block R, so that the block superimposing element 14 can adjust the face of the superimposition target block G to the face of the target block T by rotating the superimposition target block G 45° counterclockwise.

According to the aspect of the present alternative Embodiment, the search element 12 can determine resemblance relative to each rotated candidate block C when the destination block R most resembling the target block is searched out from candidate blocks C in the reference image.

According to the aspect of the present alternative Embodiment, even if the image rotates between the original image and the reference image, the destination of the pattern can be adequately calculated.

(5) Referring to FIG. 6, according to the aspect of the Embodiment 1, the search element 12 calculates the variation S(C), but the present invention is not limited to such aspect. The variation S(C) can be calculated from following each formula.

$S=(\alpha \cdot \Sigma(|Ti-Ci|)^{\beta})^{\gamma}$ Wherein, $\alpha$, $\beta$, $\gamma$ are any coefficients.

$S=(\alpha \cdot \Sigma(|Ti-Ci|)^{2\beta})^{\gamma}$ Wherein, $\alpha$, $\gamma$ are any coefficients and $2\beta$ is an even number.

$S=(a \cdot (|\Sigma Ti - \Sigma Ci|)^{\beta})^{\gamma}$ Wherein, $\alpha$, $\beta$, $\gamma$ are any coefficients.

$S=(\alpha \cdot (\Sigma Ti - \Sigma Ci)^{2\beta})^{\gamma}$ Wherein, $\alpha$, $\gamma$ are any coefficients and $2\beta$ is an even number.

Further, the variation S(C) can be also calculated by using the normalized cross-correlation function, the mutual information, the conditional entropy, the joint entropy and so forth.

(6) Referring to FIG. 2, FIG. 25, FIG. 26, FIG. 27, FIG. 28, FIG. 29, the reference image is $I_{t-1}$ or $O_{t-1}$, and the superimposition target image is $T_{t-1}$ or $O_{t-1}$, but the present invention is not limited to such aspect. The reference image can be $I_{t-2}$. $I_{t-3}$ which are the input images before $I_{t-1}$, and also can be $O_{t-2}$, $O_{t-3}$ which are the output images before Such fact is the same as the superimposition target image.

(7) Referring to FIG. 5, according to the aspect of the Embodiment 1, the search area r which is the search area for the destination block R is being set based on the location of the target block T, but the present invention is not limited to such aspect. Referring to the middle of FIG. 40, the form of the target block T can be a rectangular. In addition, the form of the target block T can be the rotated square target block T according to the aspect of the Embodiment 1

Further, according to the aspect of the Embodiment 1, the target block T has no enclave, but referring to the lower side of FIG. 40, the target block T can have the enclave. Specifically, a group of pixels consisting of strip-shape areas elongating in the horizontal direction, which is arranged in the vertical direction, can be applied instead of the target block T according to the aspect of the Embodiment 1, or a group of pixels consisting of strip-shape areas elongating in the vertical direction, which is arranged in the horizontal direction, can be applied instead of the target block T according to the aspect of the Embodiment 1. In addition, a group of pixels, in which pixels are arranged in checkered pattern, can be applied instead of the target block T according to the aspect of the Embodiment 1.

Referring to the lower side of FIG. 40, if the search operation is executed using a group of pixels having an enclave, the calculation cost due to the search element 12 can be cut. Because the number of pixels subject to calculation is smaller than the number thereof in the case of searching by using the target block T filled with pixels. In such case, the fusion blocks F have the enclaves, but the fusion blocks F can be added while overlapping in the image one after the other along setting the target blocks T one after the other, so that the noise reduction image with no enclave can be generated at the end.

In addition, also the target block T can be set excluding a part of the periphery pixels enclosing the attention pixel. Also in such case, the fusion blocks F have the excluded pixels, but the fusion blocks F can be added while overlapping in the image one after the other along setting the target blocks T one after the other, so that the noise reduction image with no excluded pixels can be generated at the end. Even in such aspect, the calculation cost due to the search element 12 can be cut.

Figure 42:
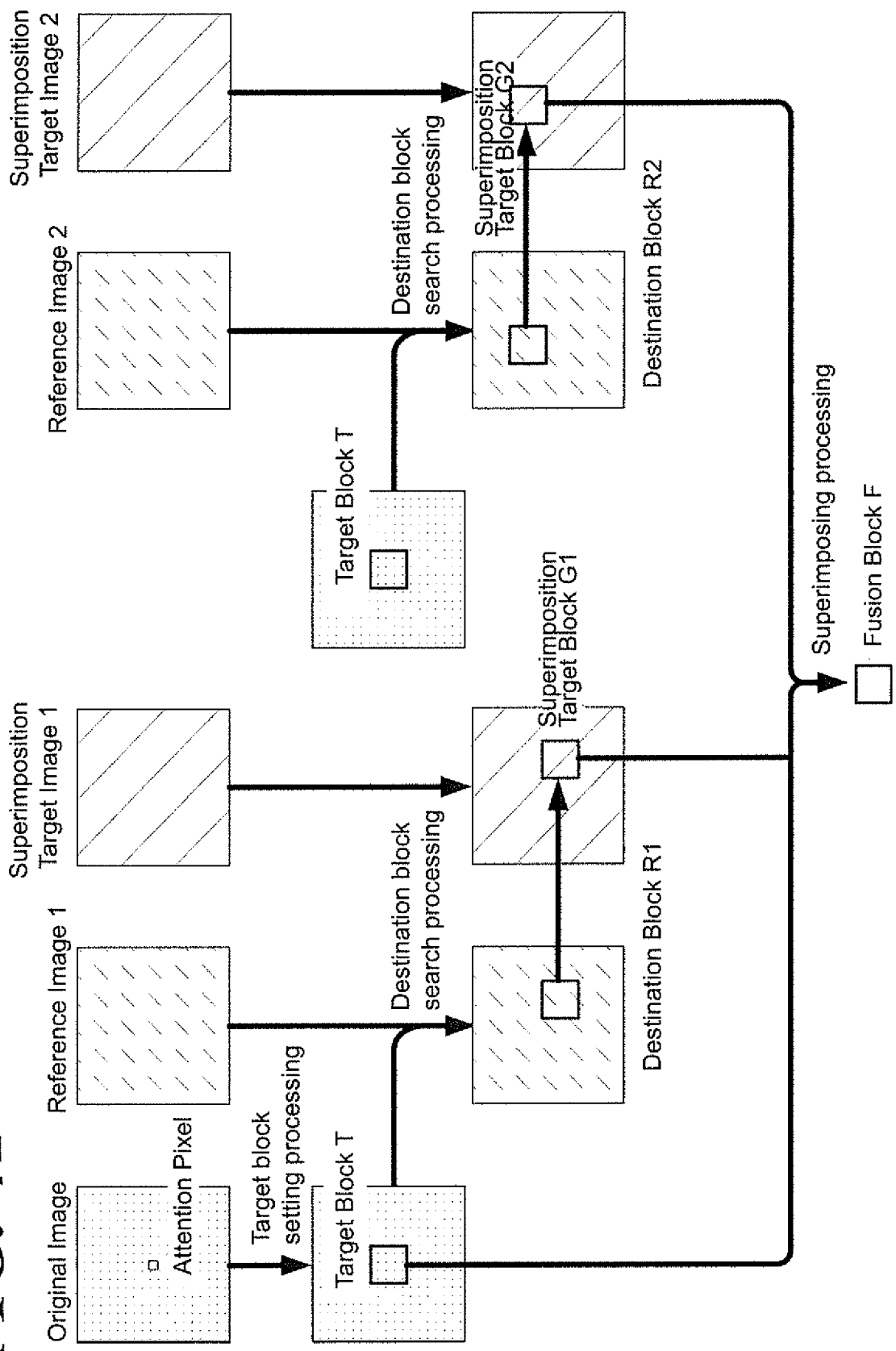
FIG. 42 is a schematic diagram illustrating a structure according to the aspect of the alternative Embodiment 1.

(8) According to the aspect of the Embodiment 1, one reference image and one superimposition target image per one original image is prepared, but the present invention is not limited to such aspect. Plural reference images and plural superimposition target images per one original image can be prepared. FIG. 42 is illustrating one example of such aspect. Referring to FIG. 42, setting of the superimposition target block G relative to the target block T in the original image is performed on the different superimposition target image and the single fusion block F can be generated from the target block T and plural superimposition target blocks G Referring to FIG. 42, the superimposition target block G is first set between the original image and the reference image 1 (e.g., the image $I_{t-1}$) and the superimposition target image 1 (e.g., $O_{t-1}$) as well as set forth referring to FIG. 30. At this time, the superimposition target block G is the superimposition target block G1. Referring to FIG. 42, the superimposition target block G is set between the original image and the reference image 2 (e.g., the image $I_{t-2}$) and the superimposition target image 2 (e.g., $O_{t-2}$) as well as set forth referring to FIG. 30. At this time, the superimposition target block G is the superimposition target block G2. Such two settings of the superimposition target block G is executed relative to the same attention pixel in the original image.

The target block T and the superimposition target block G1 and the superimposition target block G2 are sent to the block superimposing element 14. The block superimposing element 14 averages each received block and superimposes to generate the fusion block F.

A median filter as the generation method of the fusion block F executed by the block superimposing element 14 can be applied. Specifically, the block superimposing element 14 extracts the pixel in the same location as the target block T, the superimposition target block G1 and the superimposition target block G2 and compare each other when the pixel value at the location of the fusion block F is determined. The block superimposing element 14 determines the pixel having an intermediate value among the pixels originated from the target block T, the superimposition target block G1 and the superimposition target block G2, and determines the value thereof as the pixel value at the location thereof of the fusion block F. The block superimposing element 14 performs such operation on the allover fusion block F and completes the fusion block F. The noise components imaged in the image has an extreme pixel value in many cases. The purpose of using the median filter is that the noise components would not be succeeded by the fusion block F.

In such way, the search element 12 according to the aspect of the present alternative Embodiment 1 searches out the destination block R1 and R2 among respective images of plural reference images which are different each other, and the block superimposing element 14 generates the fusion block F by superimposing respective target blocks T, corresponding to each block of the destination blocks R1, R2 searched out in each reference image, to the target blocks in the original image.

According to such aspect, the noise can be cut based on the plural superimposition target images, so that a higher noise removing effect can be expected.

In addition, referring to FIG. 42, two sets of the reference image and the superimposition target image are prepared, but the present invention is not limited to such aspect. The same processing can be executed among more than 3 sets. In such case, the fusion block F can be generated by superimposing more than 3 superimposition target block G1, G2, G3, . . . to the target block T.

Figure 43:
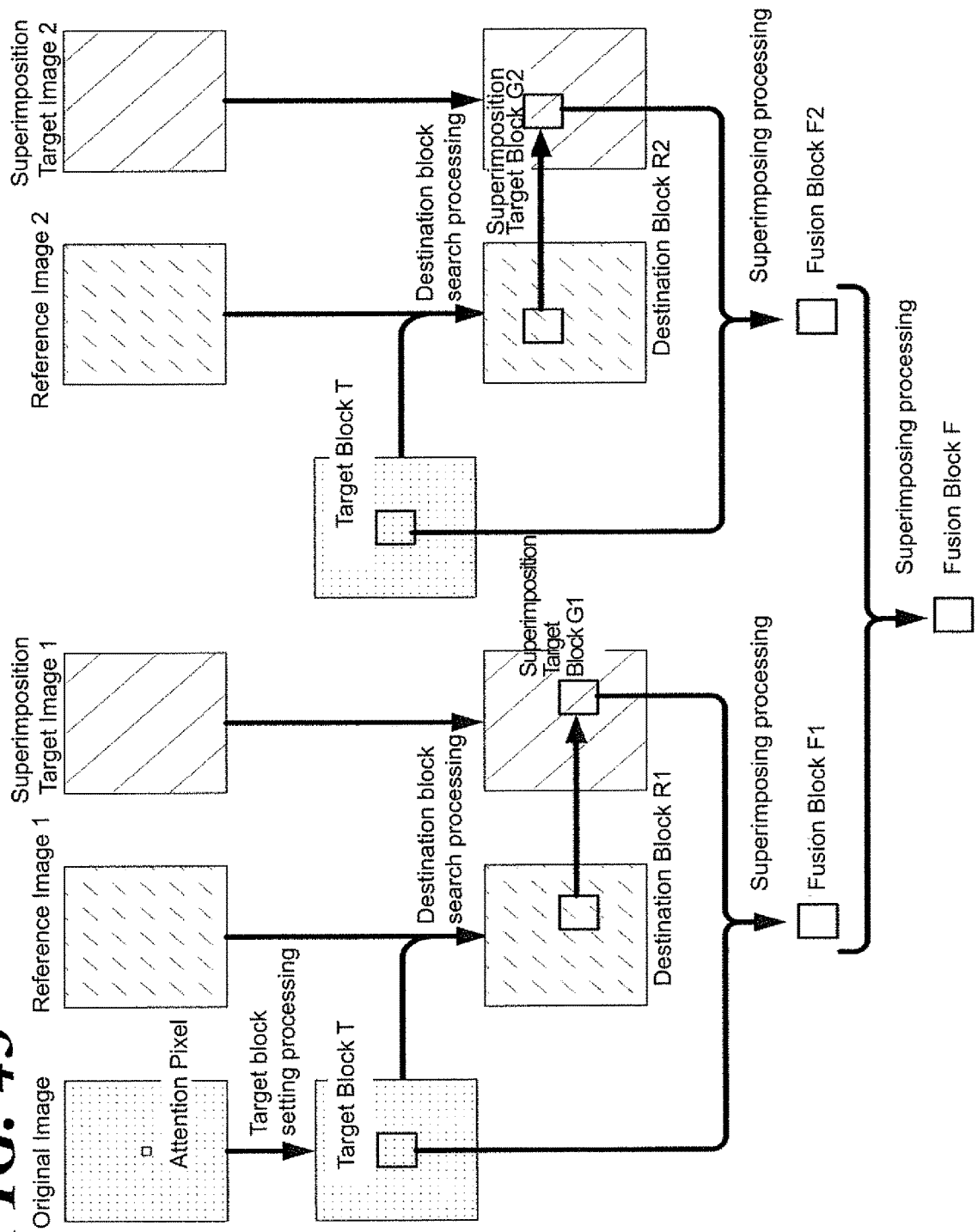
FIG. 43 is a schematic diagram illustrating a structure according to the aspect of the alternative Embodiment 1.

(9) According to the aspect of the Embodiment 1, one reference image and one superimposition target image per one original image is prepared, but the present invention is not limited to such aspect. Plural reference images and plural superimposition target images per one original image can be prepared. FIG. 43 is illustrating one example of such aspect. Referring to FIG. 43, setting of the superimposition target block G relative to the target block Tin the original image is performed on the different superimposition target image and the fusion block F can be generated from the target block T and plural superimposition target blocks G And according to the aspect of the present alternative Embodiment, the generated plural fusion blocks F are superimposed to generate the single fusion block F. The fusion block F generated in such way is the final fusion block F relative to the attention pixel in the original image and can be a basis of the noise reduction image.

Referring to FIG. 43, the fusion block F is first generated between the original image and the reference image 1 (e.g., the image $I_{t-1}$) and the superimposition target image 1 (e.g., $O_{t-1}$) as well as set forth referring to FIG. 30. The fusion block F at this time is referred as the fusion block F1. And referring to FIG. 43, the fusion block F is generated between the original image and the reference image 2 (e.g., the image $I_{t-2}$) and the superimposition target image 2 (e.g., $O_{t-2}$) as well as set forth referring to FIG. 30. The fusion block F at this time is referred as the fusion block F2. Such 2 fusion blocks F are generated relative to the same attention pixel in the original image.

The respective fusion blocks F are set out to the block superimposing element 14. The block superimposing element 14 averages each received fusion block F and superimposes to generate the single fusion block F.

A median filter as the generation method of the fusion block F executed by the block superimposing element 14 can be applied. Specifically, the block superimposing element 14 extracts the pixel in the same location as the respective fusion blocks F, and compare each other when the pixel value at some location of the respective fusion blocks F are determined. The block superimposing element 14 determines the pixel having an intermediate value among the pixels originated from each fusion block F and determines the value thereof as the pixel value of the pixel at the right location of the final fusion block F. The block superimposing element 14 performs such operation on the allover fusion block F and completes the final fusion block F. However, referring to FIG. 43, only 2 fusion blocks F allowed to be superimposed exist, so that the operation using the median filter is not feasible. To apply the median filter, at least 3 reference images and at least 3 superimposition target image corresponding thereto must be generated. The noise components imaged in the image has an extreme pixel value in many cases. The purpose of using the median filter is that the noise components would not be succeeded by the fusion block F.

In such way, the search element 12, according to the aspect of the present alternative Embodiment, searches out the destination block R1, R2 among respective images of plural reference images which are different each other; and the block superimposing element 14 generates the plural fusion blocks F1, F2 by superimposing the respective superimposing target blocks G1, G2, corresponding to each block of the destination blocks R1, R2 searched out in each reference image, to the target blocks T in the original image, and generates the final fusion block F by superimposing the plural fusion blocks F1, F2 each other.

According to such aspect, the noise can be cut based on the plural superimposition target images, so that a higher noise removing effect can be expected.

In addition, referring to FIG. 43, two sets of the reference image and the superimposition target image are prepared, but the aspect of the present alternative Embodiment is not limited to such aspect. The same processing can be executed among at least 3 sets. In such case, the final fusion block F can be generated by superimposing at least 3 superimposition fusion blocks F1, F2, F3 and so on.

(10) With regard to the candidate block in the reference image corresponding to the target block T in the original image and the target block T, the vector editing element 17 according to the aspect of the Embodiment 1 transforms the vector in the vector map mv to zero vector as an measures; when no shift relative to the subject image imaged in both blocks or when the subject image is originally not imaged in both blocks, when the shift is determined because of selecting the destination block R most resembling the target block T even though originally no shift takes place; but additionally fluctuation of vectors can be corrected instead of such function or by addition to such function.

While imaging a video, the image inside thereof keeps moving. The moving direction of such image should be aligned almost in the same direction from pixel-unit standpoint. An object is imaged in the video is not like small freely moving particle and is a fluoroscopy image of a large figure like the subject image. The entire portion of the image least likely shift in the same direction, but the shift of the image between adjacent pixels is almost the same in a microscopic view of the original image.

Figures 44A, 44B:
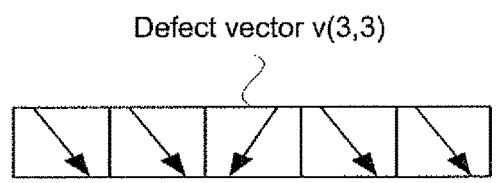
FIG. 44A, 44B are schematic diagrams illustrating a structure according to the aspect of the alternative Embodiment 1.

FIG. 44 is illustrating a vector map mv generated by the vector calculation element 13. The vector map mv is mapping the vector indicating each pixel forming the original image shifts to where in the reference image. When extracts a part of the vector map mv, resembling vectors each other are located in the adjacent pixel each other as was expected. Referring to FIG. 44, based on the further close observation, it is observed that just one pixel having a vector in the different direction among the array of pixels having well resembling vector each other is imaged. Such vector should inherently face the same direction as the adjacent pixel. However, the vector calculation element 13 was not able to calculate correctly the direction of the vector due to an effect of the noise component included in the original image or the reference image. Such vector is referred as a defect vector.

Figure 45:
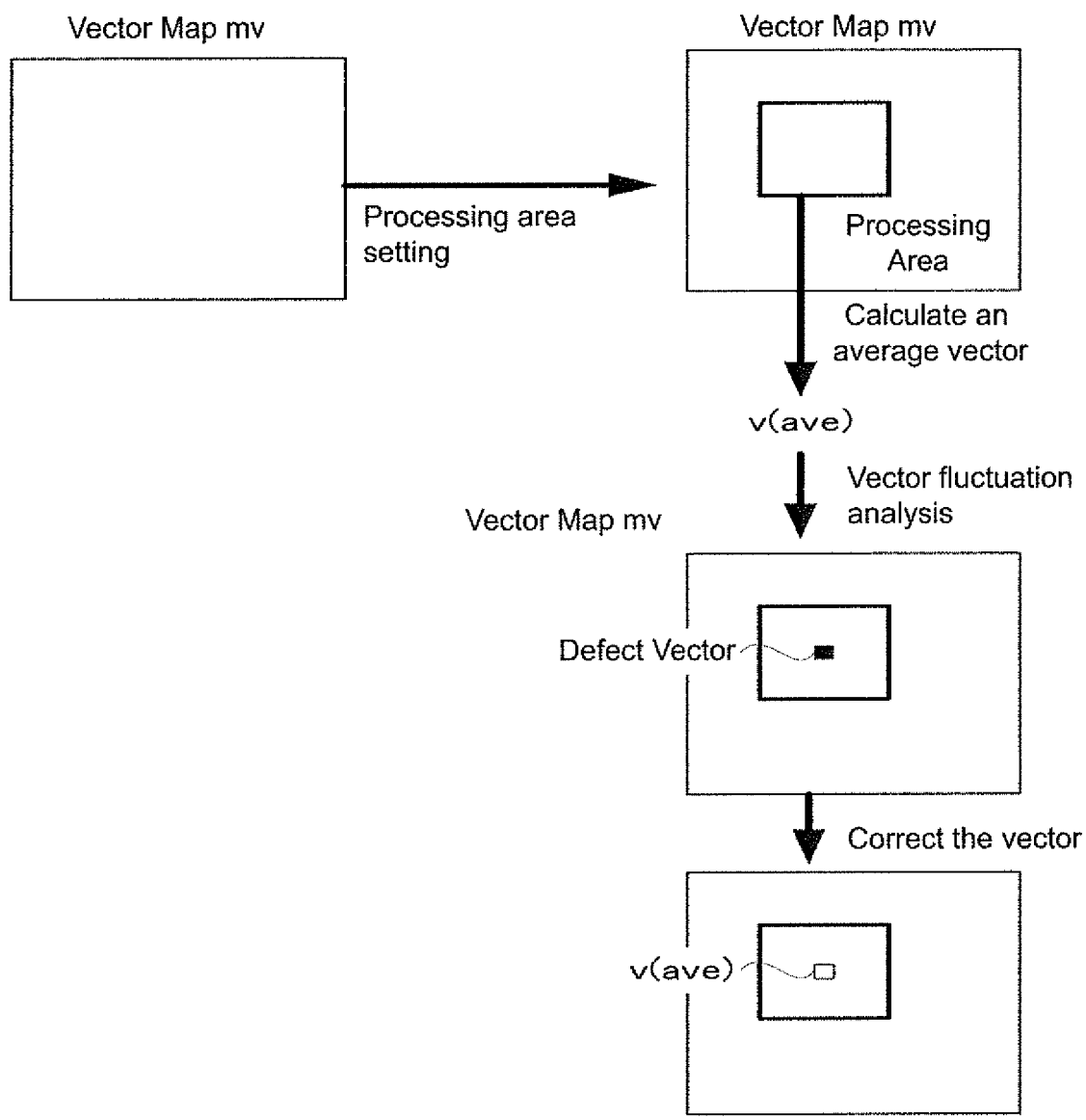
FIG. 45 is a schematic diagram illustrating a structure according to the aspect of the alternative Embodiment 1.

According to the aspect of the present alternative Embodiment, such defect vector can be erased by correction. Referring to FIG. 45, the vector editing element 17 sets a processing area in a part of the vector map mv. Such processing area is set as narrow as all vectors in such area can be predicted as almost the same. The vector editing element 17 calculates an average vector v(ave) by averaging vectors relative to pixels in the processing area. And the vector editing element 17 compares the average vector v(ave) and the vector of pixels in the processing area each other to search out the defect vector in the processing area. Such operation is referred as a vector fluctuation analysis.

Hereafter, the inventor sets forth the detail a vector fluctuation analysis. The X-component of the average vector v(ave) is $X_{ave}$ and the Y-component is $Y_{ave}$. A vector in the processing area is the vector v(i), wherein i is a value between 1 and N. Accordingly, N is the number of vectors in the processing area. The X-component of the vector v(i) is X and the Y-component is Y. The vector editing element 17 acquires an acceptable fluctuation amount relative to the X-component and the Y-component based on such data. The acceptable fluctuation amount can be calculated based on the following mathematical formula.

Mathematical Formula 1

$$KX = X_{ave} \pm n\sqrt{\frac{\sum_{i=1}^{N}(X_i - X_{ave})^2}{N}}$$

$$KY = Y_{ave} \pm n\sqrt{\frac{\sum_{i=1}^{N}(Y_i - Y_{ave})^2}{N}}$$

The vector editing element 17 determines the vector v(i) as a defect vector when the X-component of the vector v(i) is out of the acceptable fluctuation amount KX or the Y-component is out of the acceptable fluctuation amount KX with regard to such vector v(i) in the processing area. And then, the vector editing element 17 replaces the defect vector with the average vector v(ave).

Specifically, according to the aspect of the present alternative Embodiment, the vector editing element 17 executes an edition to change the destination block R corresponding to the target block T so that the destination of such pixels can be in-place in the location which is the location shifted the same distance and in the same direction as the shift of the periphery pixels by editing the vector map mv, when the destination in the reference image relative to respective pixels of each pixel forming the original image is recognized by understanding to where the attention pixel shifted in the reference image relative to the respective target blocks T based on the locational relationship between the target block T and the destination block R output from the search element 12 and the shifting direction and the shifted distance of some pixel in the original image are far away from the pixel in the periphery of such pixel.

In such aspect, the effects of the noise components, overlapping the original image and the reference image, appeared in the vector map mv decreases, so that the superimposition target block G in the superimposition target image can be more accurately determined.

(11) According to the aspect of the Embodiment 1, referring to FIG. 30, the single destination block R is recognized by the reference image, but the present invention is not limited to such aspect. Plural destination blocks R can be recognized by the reference image.

Figure 46:
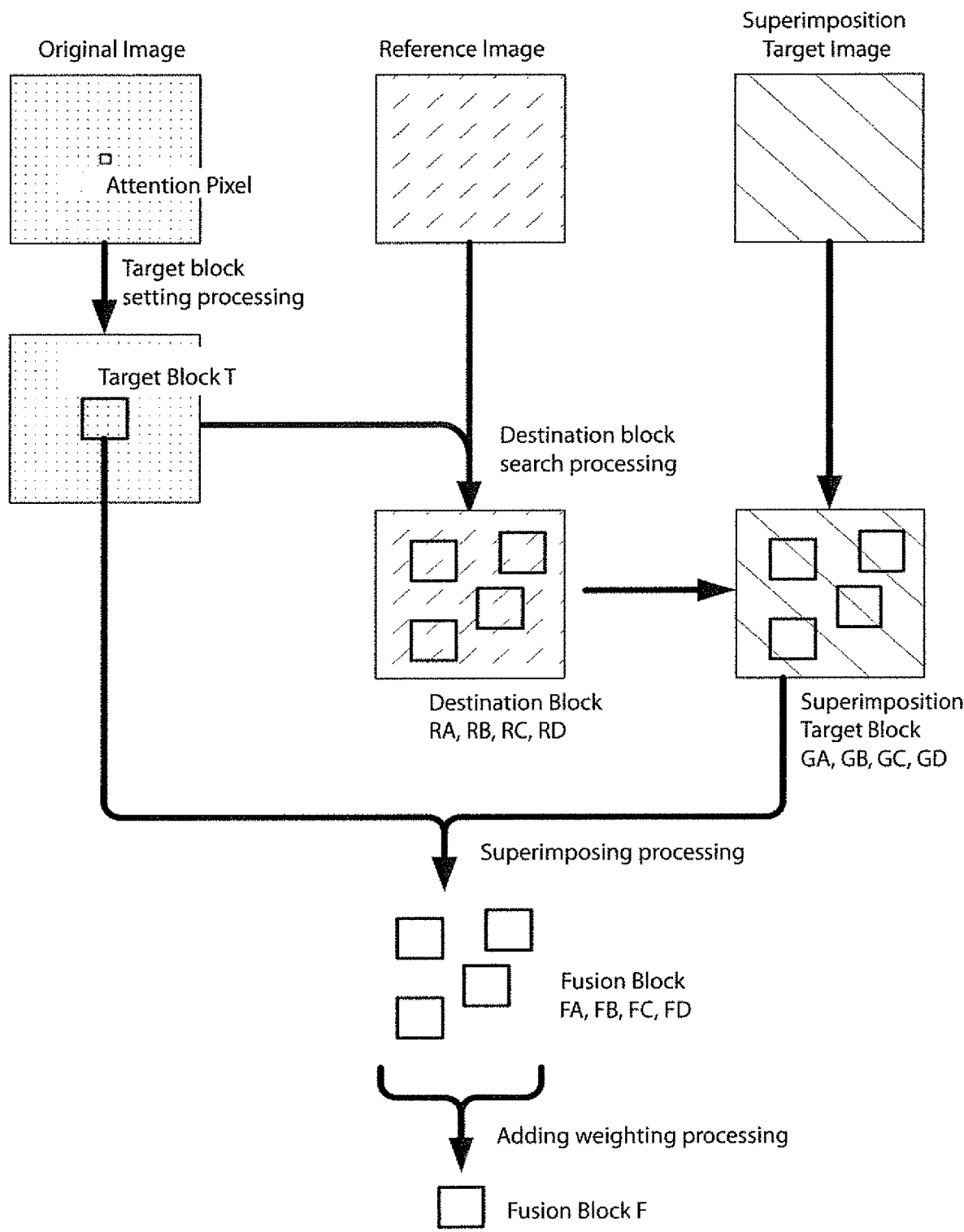
FIG. 46 is a schematic diagram illustrating a structure according to the aspect of the alternative Embodiment 1.

FIG. 46 is illustration the structure according to the aspect of the present alternative Embodiment. The search element 12 searches where the target block T set by the target setting element 11 has shifted in the reference image. At this time, the search element 12 determines a candidate block, which most resembles the target block T, as the destination block RA among the plural candidate blocks. And the search element 12 determines a candidate block, which second most resembles, as the destination block RB and a candidate block, which third most resembles, as the destination block RC. And a candidate block, which fourth most resembles, is determined as the destination block RD.

In such way, referring to FIG. 30, the search element 12 selects just one destination block R from the reference image, but the search element 12, according to the aspect of the present alternative Embodiment, selects 4 destination blocks R from the reference image. The block superimposing element 14 determines the superimposition target blocks GA, GB, GC and GD in the area of the superimposition target image corresponding to the destination blocks RA, RB. RC and RD and generates plural fusion blocks FA, FB, FC and FD by superimposing the target block T in the original image to each superimposition target block GA, GB, GC and GD. And the block superimposing element 14 superimposes fusion blocks FA, FB, FC and FD to generate the final fusion block F.

And when superimposing fusion blocks FA, FB, FC and FD, the block superimposing element 14 refers the variation S(R) of the destination blocks RA, RB, RC and RD. Such variation S(R) was calculated when the destination block RA, RB, RC and RD were still candidate blocks (referring to FIG. 6) and if the variation S(R) of each destination block RA, RB, RC and RD are respectively SA, SB, SC and SD, SA<SB<SC<SD is complete.

The block superimposing element 14 superimposes by adding weighting to the fusion blocks FA, FB, FC, FD based on the variation SA, SB, SC, SD as the more resembling, the darker in the final fusion block F. For example, the final fusion block $F_{final}$ can be formed based on the following mathematical formula.

$$F_{final}=(SA^{-1} \cdot FA+SB^{-1} \cdot FB+SC^{-1} \cdot FC+SD^{-1} \cdot FD)/(SA^{-1}+SB^{-1}+SC^{-1}+SD^{-1})$$

However, FA, FB, FC, FD represent each fusion block FA, FB, FC, FD and SA, SB, SC, SD represent each variation corresponding to each fusion block FA, FB, FC, FD. $(SA^{-1}+SB^{-1}+SC^{-1}+SD^{-1})$ is a constant for normalization.

Specifically, the search element 12 according to the aspect of the present alternative Embodiment searches out plural destination blocks in the reference image; and the block superimposing element 14 generates the plural fusion blocks FA, FB, FC, FD by superimposing the respective superimposition target blocks GA, GB, GC, GD, corresponding to each block of the plural destination blocks RA, RB, RC, RD searched out in each reference image, to the target blocks in the original image, and generates the final fusion block F by superimposing the plural fusion blocks FA, FB, FC, FD each other.

According to such aspect, the noise can be reduced based on the plural superimposition target blocks G, so that a higher noise removing effect can be expected.

In addition, referring to FIG. 46, 4 destination blocks RA, RB, RC and RD are being set, the setting number of the destination block can be increased or decreased. In such case, according to increase or decrease of the destination block, the number of the superimposition target block increases or decreases.

(12) Referring to FIG. 6, the variation S(C) is calculated from the pixels forming the target block T and the candidate block C, but the present invention is not limited to such aspect. The variation S(C) can be calculated considering displacement of both blocks. When the location of the target block T in the original image and the location of the candidate block C in the reference image are too much apart, it is too hard to deem that both blocks resemble. Because when imaging the video, it is deemed that the location in which the subject image in each frame is imaged resembles each other. According to the aspect of the present alternative Embodiment, the variation S(C) can be calculated considering such fact.

The search element 12 according to the aspect of the present alternative Embodiment can calculate the variation S(C) based on the following mathematical formula.

$$S = \sum_{i=0}^{24} |Ti - Ci| + \omega|v(t)| \quad \text{Mathematical Formula 2}$$

However, ω is a constant, v(t) is a vector of the pixel in the vector map corresponding to the attention pixel in the original image.

Specifically, the search element 12 according to the aspect of the present alternative Embodiment authenticates, on a priority basis, the candidate block C close to the location in the reference image corresponding to the target block T in the original image as the destination block R, when the destination block R most resembling the target block T is searched out from candidate blocks C for the destination block R in the reference image.

In such way, the candidate block C most close to the location of the target block T in the reference image is authenticated as the destination block R on a priority basis. According to the aspect of the present alternative Embodiment, the more realistic search for a target block T can become available.

(13) According to the aspect of the Embodiment 1, the fusion block F is equally superimposed to generate the noise reduction image, but the present invention is not limited to such aspect. The fusion block F is superimposed to generate the noise reduction image while weighting the fusion block F. First, the inventor sets forth the structure according to the aspect of the Embodiment 1 to set forth such alternative Embodiment. Referring to FIG. 47, an original image, a reference image and the superimposition target image are provided. The number "5" is imaged in the center of the original image and the number "5" is imaged out of the center of the reference image. The number "5" in the superimposition target image is imaged at the same location as the reference image.

Figure 48:
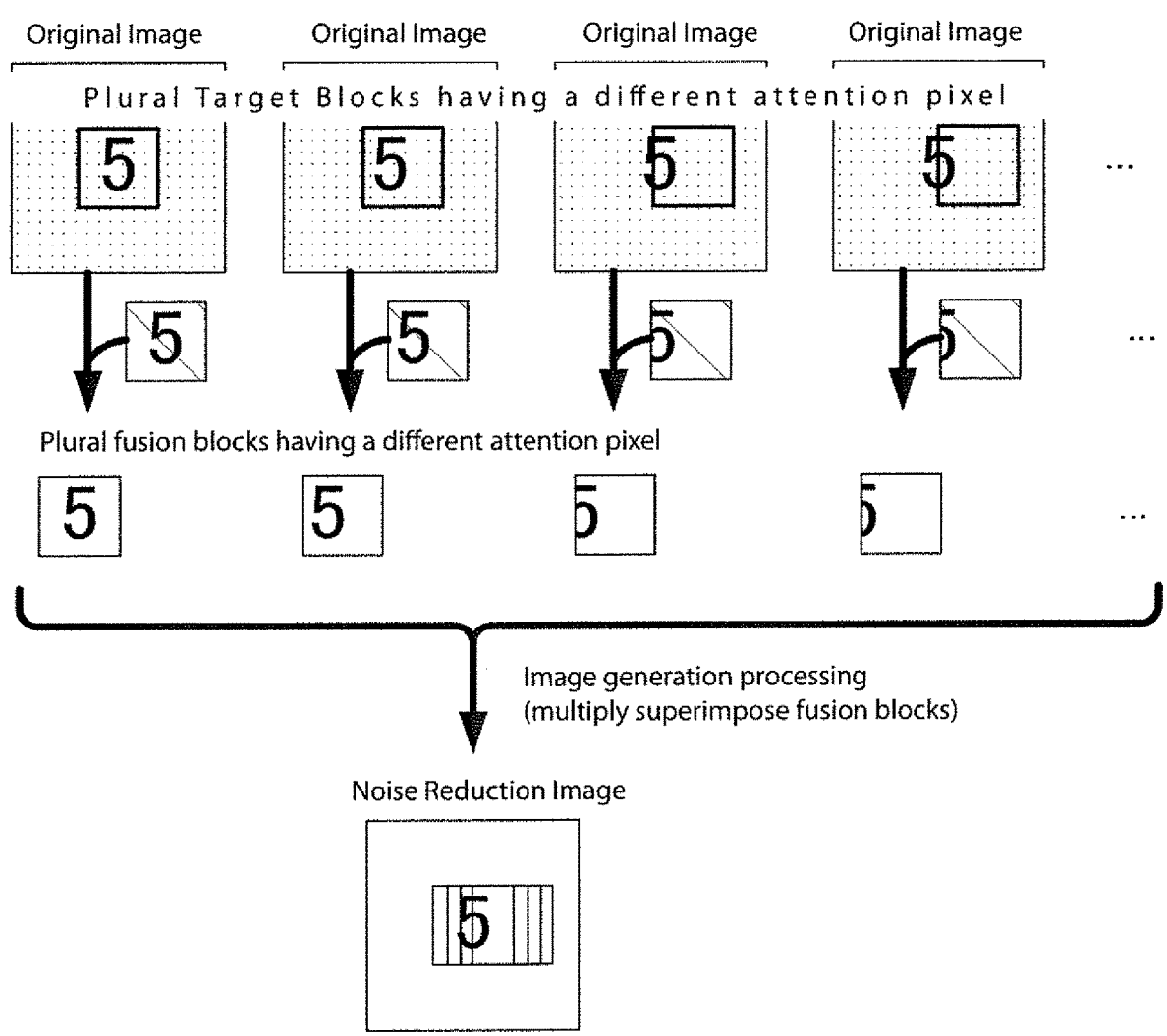
FIG. 48 is a schematic diagram illustrating a structure according to the aspect of the alternative Embodiment 1.

Referring to FIG. 48, according to the aspect of the Embodiment 1, the target block T is set one after the other while changing the attention pixel and the corresponding fusion block F is calculated. And each fusion block F is multiply superimposed with the same weighting to generate the noise reduction image.

Figure 49:
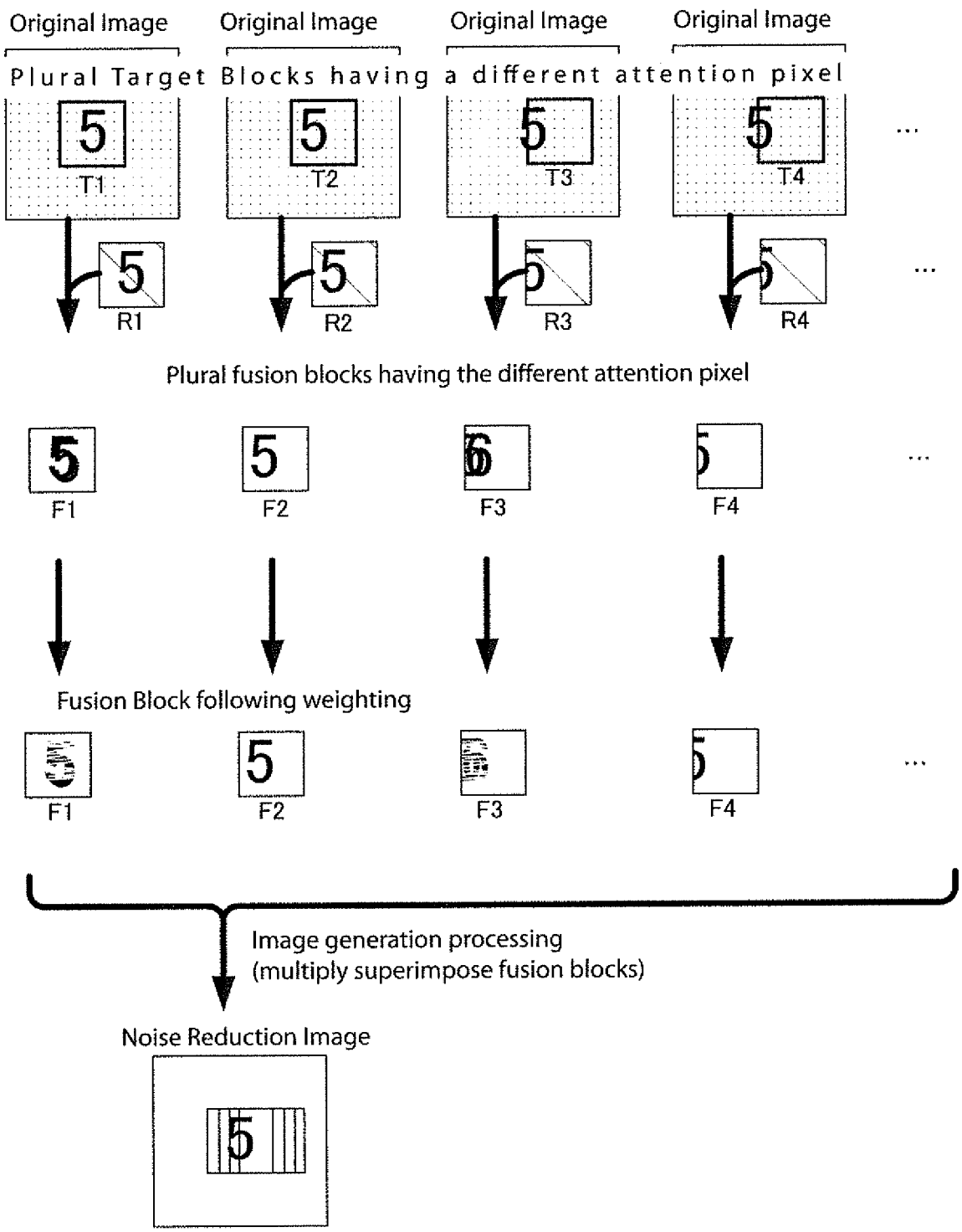
FIG. 49 is a schematic diagram illustrating a structure according to the aspect of the alternative Embodiment 1.

Referring to FIG. 49, according to the aspect of the present alternative Embodiment, operation-wise the operation until the fusion block F is generated one after the other while changing the attention pixel is the same as the aspect of the Embodiment 1. When compare the fusion block F generated at this time, it is notified that the images have not been superimposed well in some fusion block F. Depending on the target block T as the basis of the fusion block f, the image "5" in the reference image may not be well superimposed or the noise reduction may not be satisfactory relative to the fusion block. Therefore, according to the aspect of the present alternative Embodiment, the blocks are multiply superimposed skipping the so-to-speak generation-failed fusion block F to eliminate an effect of failure on the noise reduction image.

When superimposing the fusion blocks F, the block superimposing element 14 refers the variation S(R) of the destination blocks R which is the basis of each fusion block F. Such variation S(R) was calculated when the destination block R was still a candidate block (referring to FIG. 6) and as trend the higher failure level is, the higher the value is.

The block superimposing element 14 multiply superimposes by adding weighting to the fusion blocks F based on the variation S(R) as the higher the success level is, the darker in the final fusion block F. Specifically, 25 fusion blocks F1-F25 are multiply superimposes relative to the pixels forming the noise reduction image. Such pixels can be obtained, for example, as follows.

$$a=(S1^{-1} \cdot F1 + S2^{-1} \cdot F2 + \ldots + S25^{-1} \cdot F25)/(S1^{-1} + S2^{-1} + \ldots + S25^{-1})$$

However, S1, S2, ..., S25 represent each variation corresponding to the fusion blocks F1-F25. $(S1^{-1} + S2^{-1} + \ldots + S25_{-1})$ is a constant for normalization.

Specifically, the image generation element 15 according to the present invention generates a noise reduction image by adding fusion blocks F1-F25 being overlapped while weighting so as to image the higher variation S(R) of the fusion block, the thinner to be in the noise reduction image, based on the variation S(R)1-S(R)25 indicating the degree of difference between the patterns imaged in the target blocks T1-T25, which are the origin of the fusion blocks F1-F25, and the destination blocks R1-R25.

According to such aspect, the fusion block F failed to be superimposed never strongly affects the noise reduction image. In addition, according to such aspect which is different from the aspect in which the failed fusion blocks F are completely skipped, the failed fusion block F to be superimposed appears thin in the noise reduction image, so that the number of the fusion blocks F to be multiply superimposed to pixels forming the noise reduction image cannot be decreased and capability of noise reduction can be damaged minimum.

Figure 50:
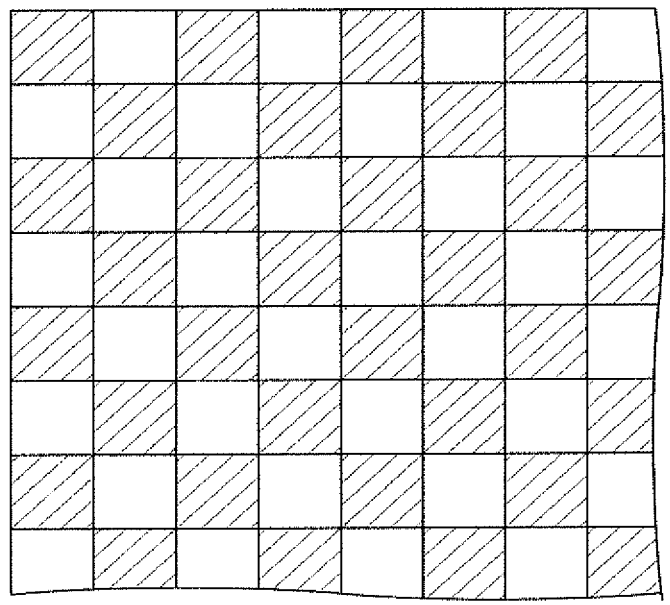
FIG. 50 is a schematic diagram illustrating a structure according to the aspect of the alternative Embodiment 1.

(14) According to the aspect of the Embodiment 1, the target block T is set for all pixels forming the original image, but the present invention is not limited to such aspect. Referring to FIG. 50, the target block T can be set only the part of pixels (the pixel indicated by the diagonal lines) forming the original image. Specifically, according to the aspect of the present alternative Embodiment, the target setting element 11 is operative to distinguish the pixel setting the pixels in the original image as the attention pixel and the pixel not-setting. Referring to FIG. 50, the pixels designating the attention pixel are arranged in the checker pattern, so that the setting number for the attention pixel can be half. According to such aspect, the calculation cost for generation operation of the fusion block F can be reduced.

(15) The present invention can be applied to the structure having the aspect of plural above alternative Embodiments.

Field of the Invention

As set forth above, the above invention is suitable for medicinal field.

REFERENCE OF SIGNS

11 Target setting element (Target setting means)
12 Search element (Search means)
14 Block superimposing element (Superimposing means)
15 image generation element (Image generation means)
17 Vector editing element (Editing means)

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. An image processing device for processing a sequence of images, the images including a reference image and an original image, the reference image being captured prior to the original image, the device comprising a processor configured to:

set a target block in the original image, the target block including an attention pixel and periphery pixels of said attention pixel among pixels;

search out a destination block most resembling said target block in the reference image;

generate a fusion block by superimposing a superimposition target block in a superimposition target image to the target block in the original image, the superimposition target image acquired through a noise reduction of the reference image; and generate a noise reduction image having reduced noises being imaged in said original image by superimposing a plurality of respective said fusion blocks in the original image one after the other along with setting a plurality of respective said target blocks one after the other while changing a location of the attention pixel so that the location of the fusion block is the same as the location of the target block in the original image.

2. The image processing device according to claim 1, wherein the processor is further configured to:
divide the pixel value of the pixel in the image by an integrating number indicating how many times said fusion blocks are added following an adding while overlapping said fusion blocks.

3. The image processing device according to claim 1, wherein the processor is further configured to:
superimpose pixels of said target block in said original image and corresponding pixels of said superimposition target block in said superimposition target image by weighting individually every pixel forming said fusion block, and weighting of superimposition is changed so that said superimposition target block cannot be gradually succeeded by said fusion block in accordance with increase of the absolute value of a difference between the pixel value of the pixel belonging to said target block and the pixel value of the corresponding pixels of the superimposition target block or the destination block.

4. The image processing device according to claim 1, wherein the processor is further configured to:
superimpose pixels of said target block in said original image and said superimposition target block in said superimposition target image by weighting individually every pixel forming said fusion block, and weighting of superimposition is changed so that said superimposition target block cannot be gradually succeeded by said fusion block in accordance with increase of the absolute value of a difference between the pixel value in said target block and pixel value of corresponding pixels of the superimposition target block or the destination block.

5. The image processing device according to claim 1, wherein the processor is further configured to:
set a location block in the location of said target block in said reference image and overwrites an output so that the destination block searched out becomes said location block, if said destination block does not significantly resemble said target block compared to said location block.

6. The image processing device according to claim 1, wherein the processor is further configured to:
search based on two modes including an accuracy priority mode that searches a destination block relative to some attention pixel over a large area of said reference image, and a velocity priority mode that searches the destination block relative to the attention pixel different from the attention pixel that is a target to be processed by said accuracy priority mode based on the search result of said accuracy priority mode in a narrow area of said reference image; and
wherein said velocity priority mode searches the destination block over the area enclosing a predicted location that is a predicted destination location of the attention pixel currently being a search target in said reference image is predicted, based on a locational relationship between the attention pixel that is the target to be processed by said accuracy priority mode and the pixels of the destination in said reference image of said attention pixel found by the search due to said accuracy priority mode.

7. The image processing device according to claim 1, wherein:
an area of said superimposition target block is narrower than an area of said target block and said destination block.

8. The image processing device according to claim 1, wherein:
an area of said superimposition target block is broader than an area of said target block and said destination block.

9. The image processing device according to claim 1, wherein the processor is further configured to:
generates a reduced original image and a reduced reference image by reducing said original image and said reference image;
set said attention pixel from pixels forming the original image and a reduced original image target block that is a target block in the reduced original image;
search out a reduced reference image destination block most resembling said reduced original image target block from said reduced reference images; and
set up a search area, wherein searching out said destination block in said the reference image is based on the location in said reference image corresponding to a location of said reduced reference image destination block in said search area.

10. The image processing device according to claim 1, wherein the processor is further configured to:
determine a resemblance also relative to a plurality of respective rotated candidate blocks when said destination block is searched out from candidate blocks for said destination block in said reference image.

11. The image processing device according to claim 1, wherein:
the target block includes an enclave.

12. The image processing device according to claim 1, wherein:
the target block excludes a part of said periphery pixels surrounding said attention pixel.

13. The image processing device according to claim 1, wherein the processor is further configured to:
search out a destination block from a respective plural reference images that are different from each other, and
generate said fusion block by superimposing the respective superimposition target blocks corresponding to each block of the destination blocks searched out in said respective reference images to said target blocks in said original image.

14. The image processing device according to claim 1, wherein the processor is further configured to:
search out a destination block from respective different plural reference images that are different from each other; and
generate the plural fusion blocks by superimposing the respective superimposition target blocks corresponding to each block of the destination blocks searched out in the respective reference images to said target blocks in said original image, and generates a final fusion block by superimposing the plural fusion blocks to each other.

15. The image processing device according to claim 1, wherein the processor is further configured to:
execute an edition to change said destination block corresponding to said target block so that a destination of certain pixels is in-place in the location that is the location shifted the same distance and in the same direction as the shift of the periphery pixels, if some pixel in said original image is apart from the periphery pixels of a certain pixel in the shifting direction and the shifted distance when the destination said the reference image relative to respective pixels of each pixel forming said original image is recognized by understanding to where the attention pixel shifted in said reference image relative to said respective target blocks based on a locational relationship between said target block and said destination block.

16. The image processing device according to claim 1, wherein the processor is further configured to:
search out plural destination blocks from said reference image, and
generate plural fusion blocks by superimposing the respective superimposition target blocks corresponding to each block of the plural destination blocks searched out in the reference image to said target blocks in said original image, and generates a final fusion block by superimposing the plural fusion blocks to each other.

17. The image processing device according to claim 1, wherein the processor is further configured to:
authenticate, on a priority basis, a candidate block close to the location in said reference image corresponding to said target block in said original image as said destination block when the destination block is searched out from a plurality of candidate blocks for the destination block in said reference image.

18. The image processing device according to claim 1, wherein the processor is further configured to:
add selected said fusion blocks being overlapped while weighting so that a higher variation level a respective fusion block has, the thinner is said image that is generated based on the variation level indicating a degree of difference between patterns imaged in the target block and the destination block that are the origin of said selected fusion block.

19. The image processing device according to claim 1, wherein the processor is further configured to:
set the target block while distinguishing the pixel to be set as said attention pixel in the pixels in said original image and the pixel not to be set therefor.

* * * * *